United States Patent [19]
Suzuki et al.

[11] Patent Number: 5,140,435
[45] Date of Patent: Aug. 18, 1992

[54] VIDEO SIGNAL FRAME SEARCH APPARATUS FOR SELECTION OF A DESIRED FRAME

[75] Inventors: Tsuyoshi Suzuki, Tokyo; Nobuyoshi Iizuka, Isehara; Atsushi Suganuma, Yokohama, all of Japan

[73] Assignee: Victor Company of Japan, Ltd., Yokohama, Japan

[21] Appl. No.: 425,279

[22] Filed: Oct. 23, 1989

[30] Foreign Application Priority Data

| Oct. 24, 1988 | [JP] | Japan | 63-267891 |
| Oct. 24, 1988 | [JP] | Japan | 63-267892 |
| Oct. 28, 1988 | [JP] | Japan | 63-272425 |
| Mar. 31, 1989 | [JP] | Japan | 1-83751 |
| Mar. 31, 1989 | [JP] | Japan | 1-83754 |
| Mar. 31, 1989 | [JP] | Japan | 1-83757 |

[51] Int. Cl.$^5$ .................. H04N 5/782; G11B 15/52
[52] U.S. Cl. ....................... 358/335; 360/72.1; 360/72.2
[58] Field of Search ............ 360/72.2, 35.1, 13, 360/14.1, 14.2, 14.3, 72.1, 33.1; 358/335, 244, 244.1, 244.2, 311

[56] References Cited

U.S. PATENT DOCUMENTS

| 4,308,563 | 12/1981 | Gohda et al. | 360/14.2 |
| 4,367,499 | 1/1983 | Hoshino et al. | 360/72.2 |
| 4,499,509 | 2/1985 | Gohda et al. | 360/14.2 |
| 4,549,231 | 10/1985 | Namiki | 360/14.2 |
| 4,591,931 | 5/1986 | Baumeister | 360/72.2 |
| 4,612,569 | 9/1986 | Ichinose | 360/14.1 |

FOREIGN PATENT DOCUMENTS 2179192 2/1987 United Kingdom .

Primary Examiner—Roy N. Envall, Jr.
Assistant Examiner—Huy Nguyen
Attorney, Agent, or Firm—Lowe, Price, LeBlanc & Becker

[57] ABSTRACT

A video signal frame search apparatus for selecting a frame from a video signal recorded on a magnetic tape, e.g. for supplying the frame to a video printer, is based on a system controller which controls playback and rewind operations of a VTR during a frame search operation. When a desired frame is displayed during such a frame search operation, actuation of a switch by the user causes a plurality of frames adjcent to and including the desired frame to be stored in a memory and then displayed simultaneously, enabling the user to specify to the system controller the precise position of the desired frame.

10 Claims, 35 Drawing Sheets

FIG. 11
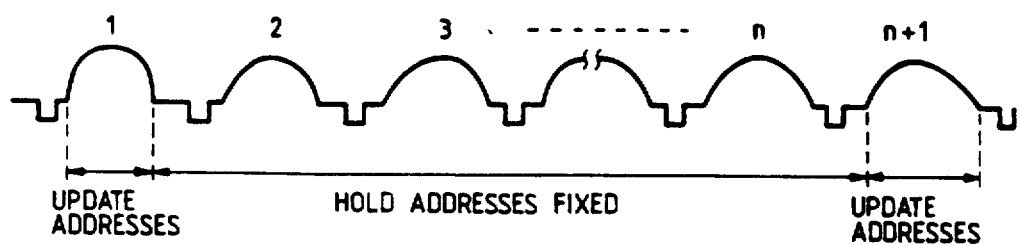
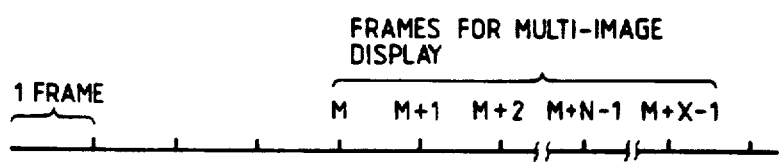
FIG. 12A
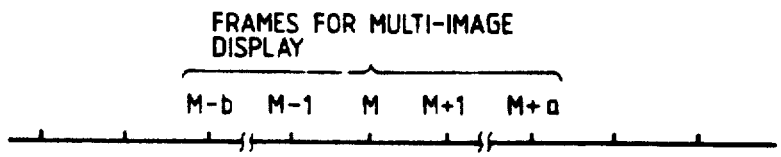
FIG. 12B

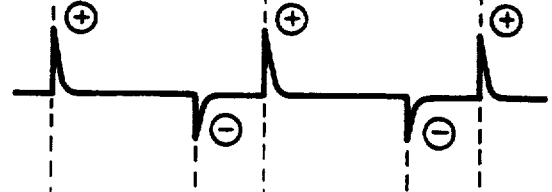
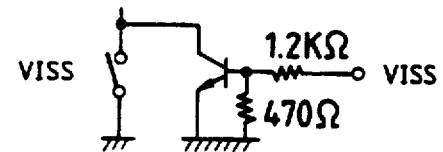
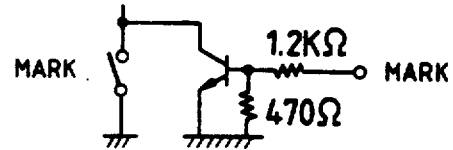
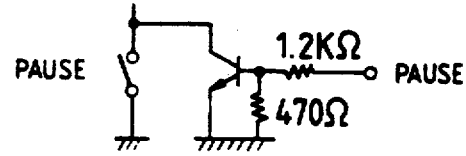
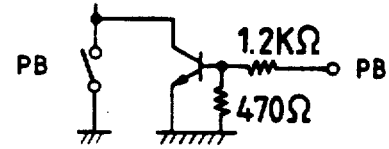
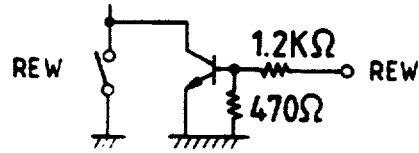
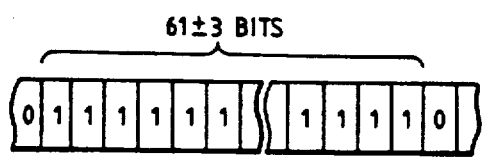

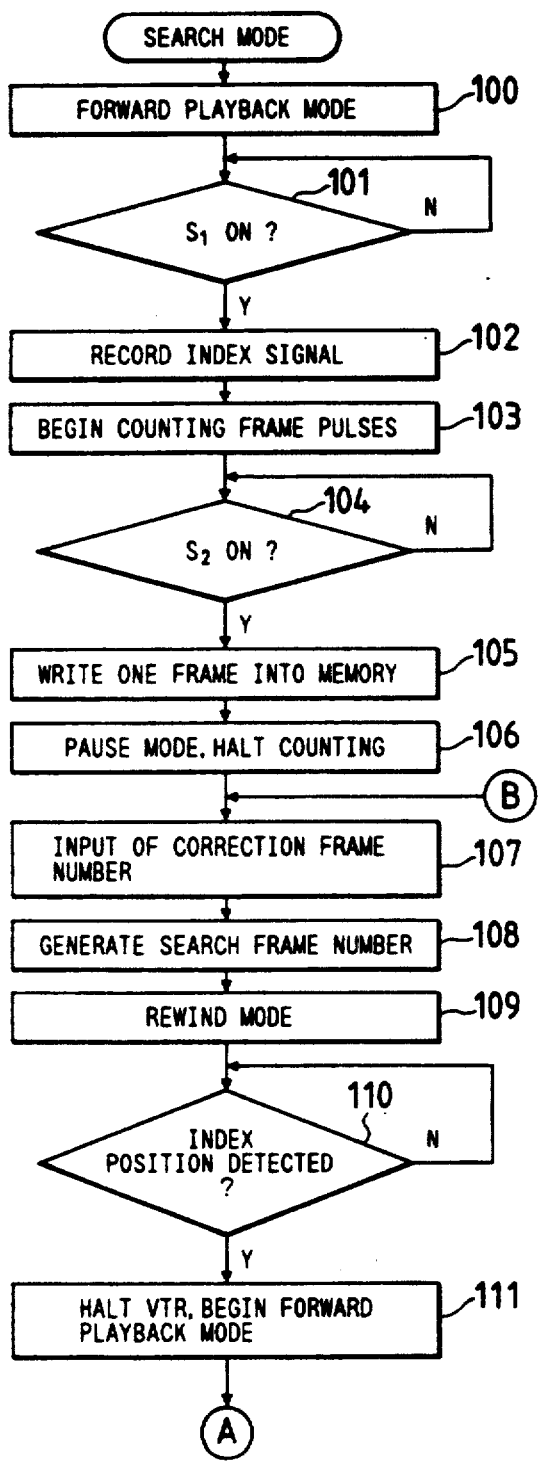
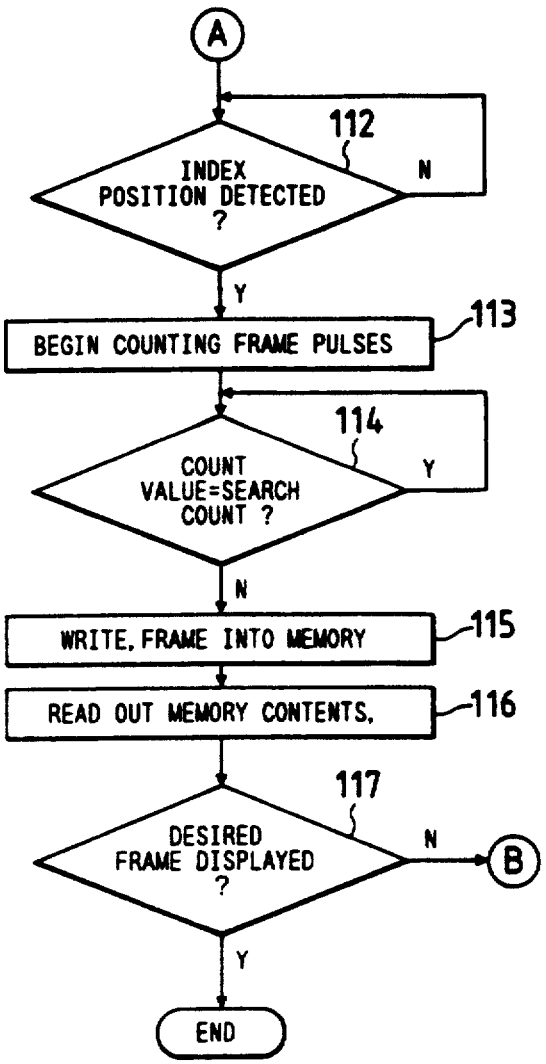
FIG. 18

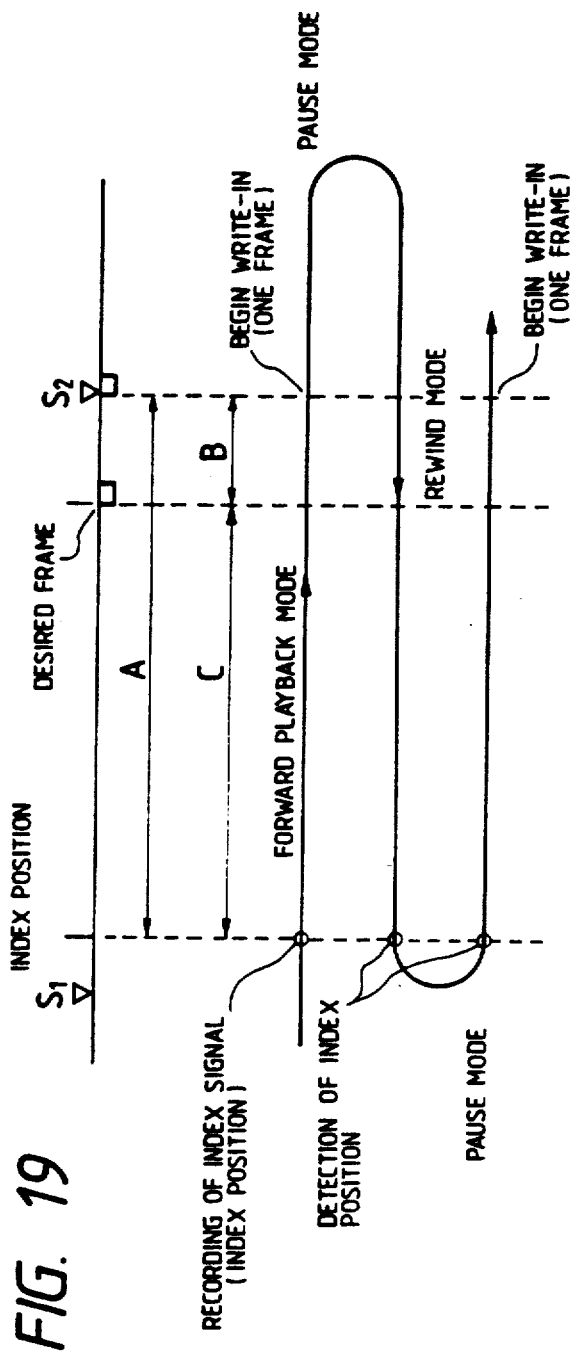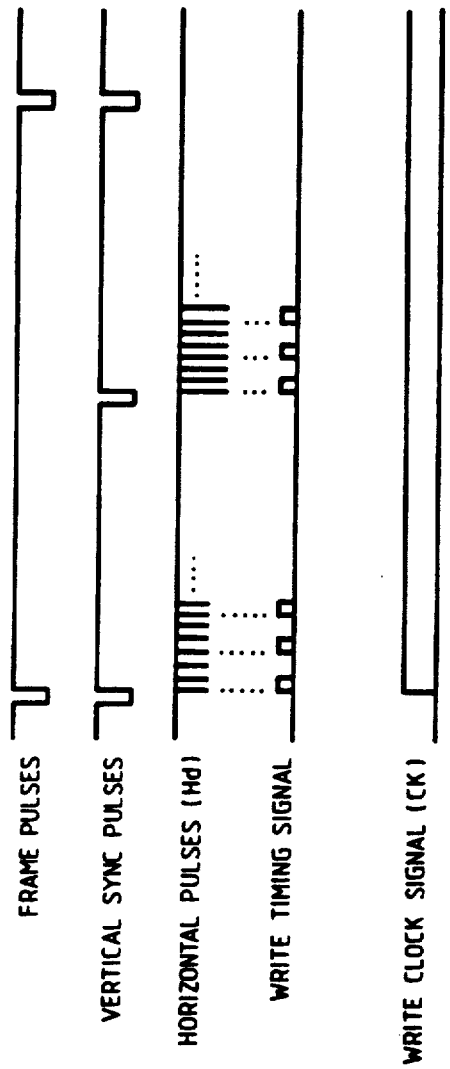

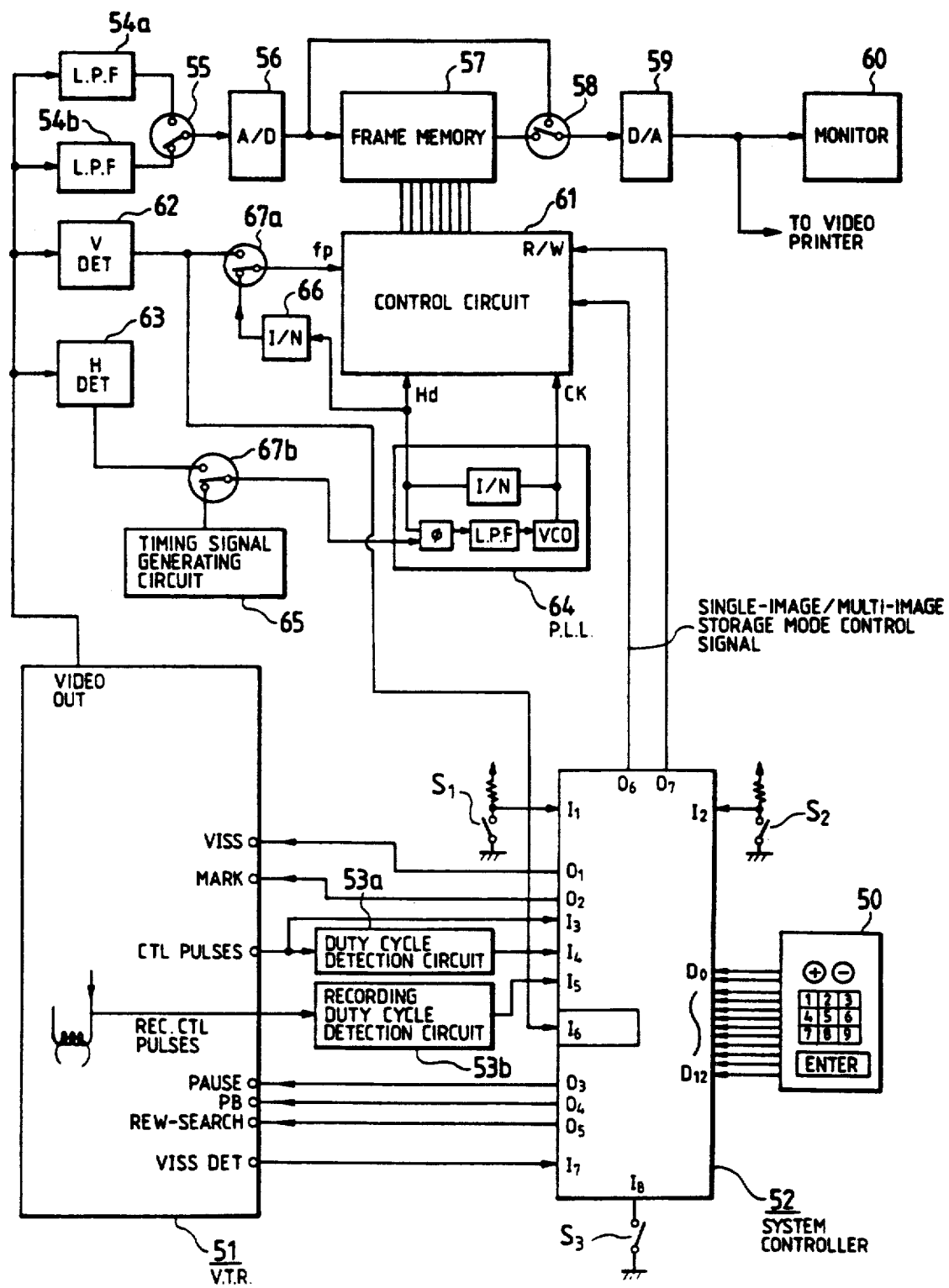

FIG. 22
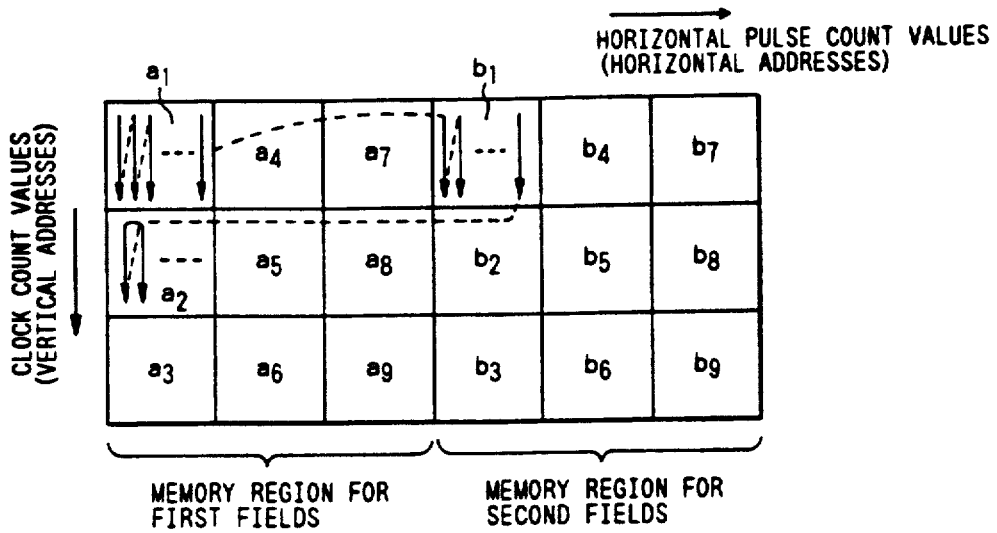
FIG. 23
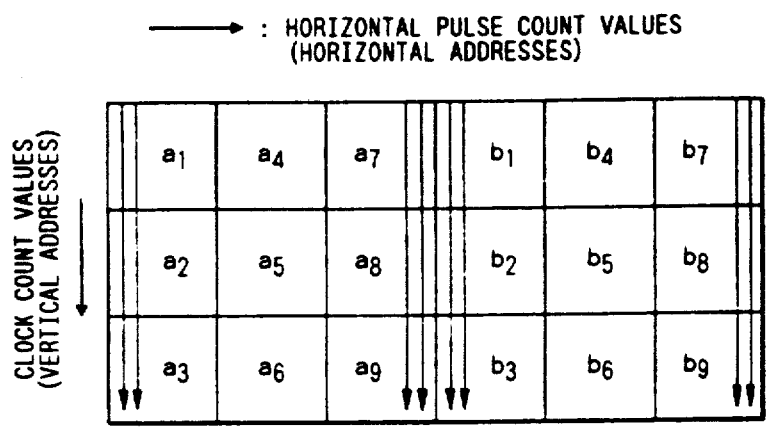
FIG. 24
| $F_1$ | $F_2$ | $F_3$ |
|---|---|---|
| $F_4$ | $F_5$ | $F_6$ |
| $F_7$ | $F_8$ | $F_9$ |

FIG. 25A
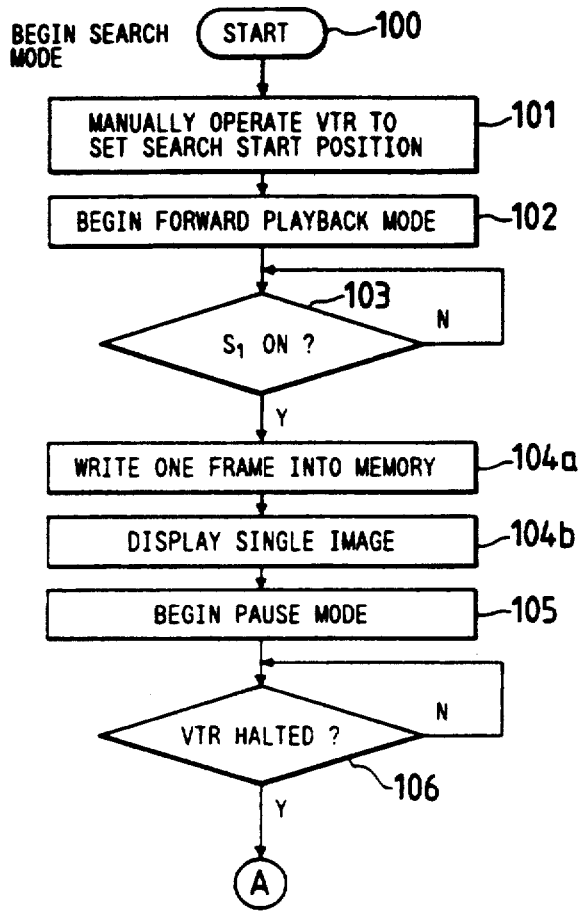
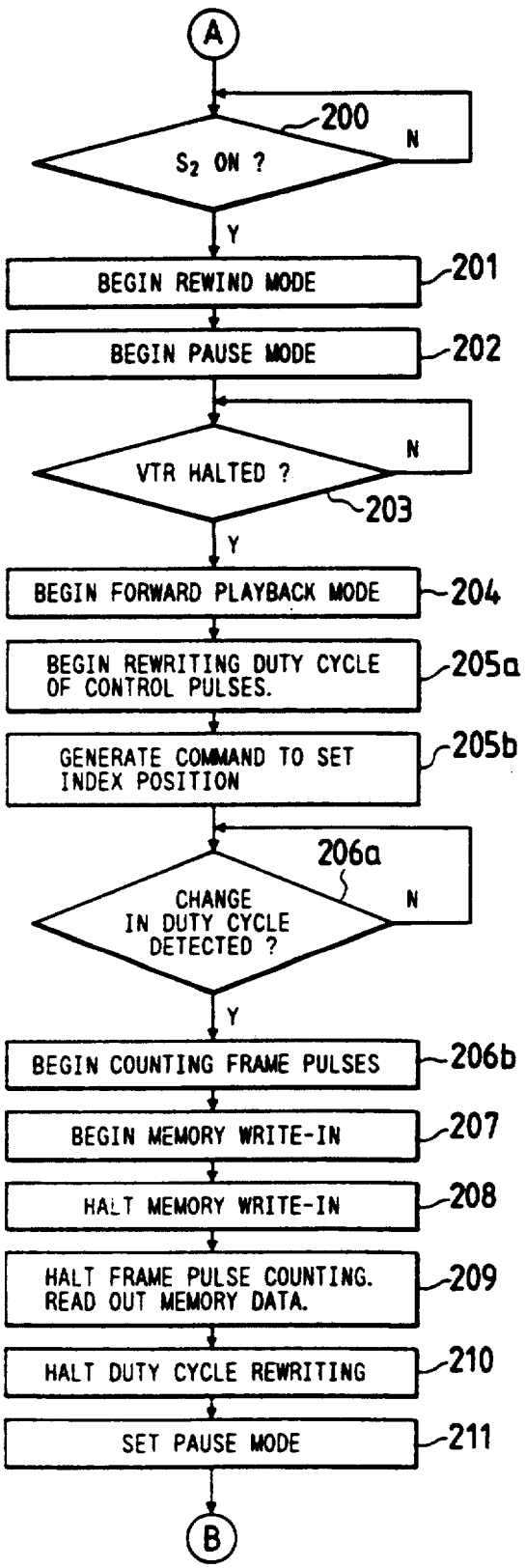

FIG. 25C
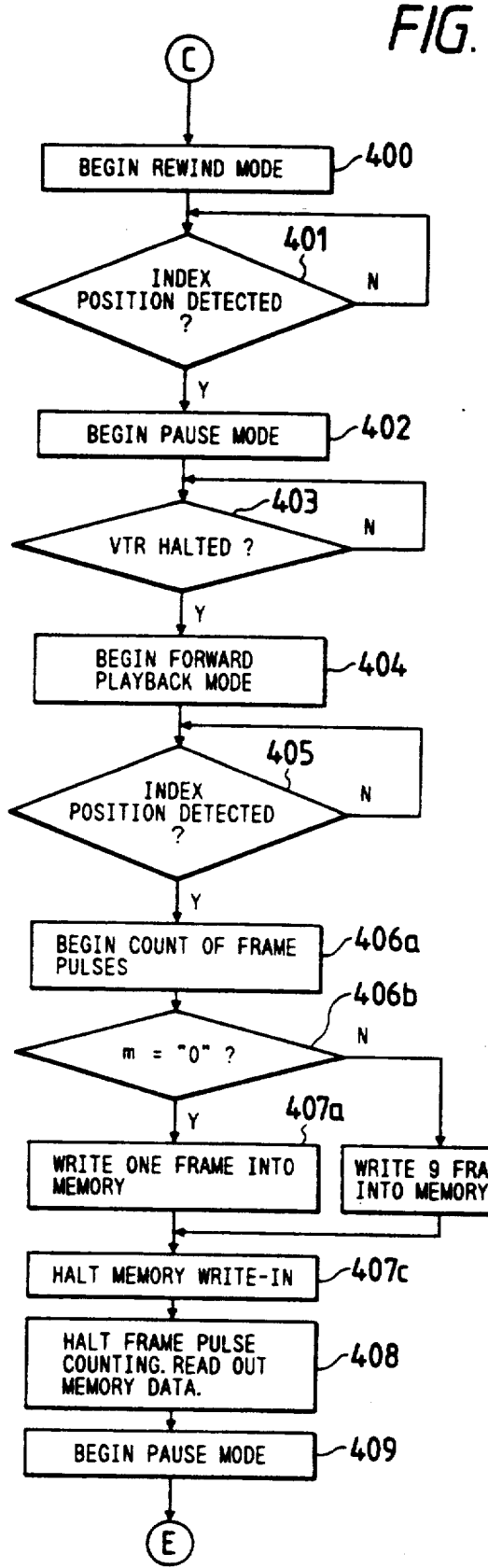
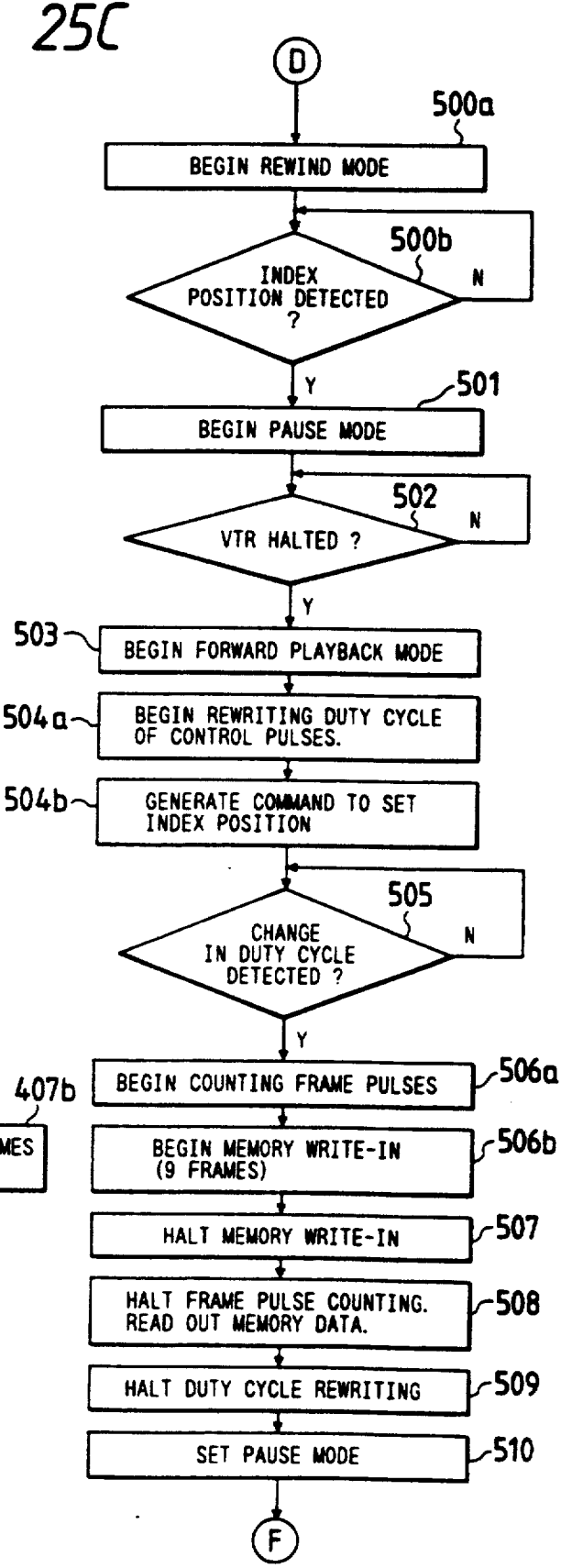

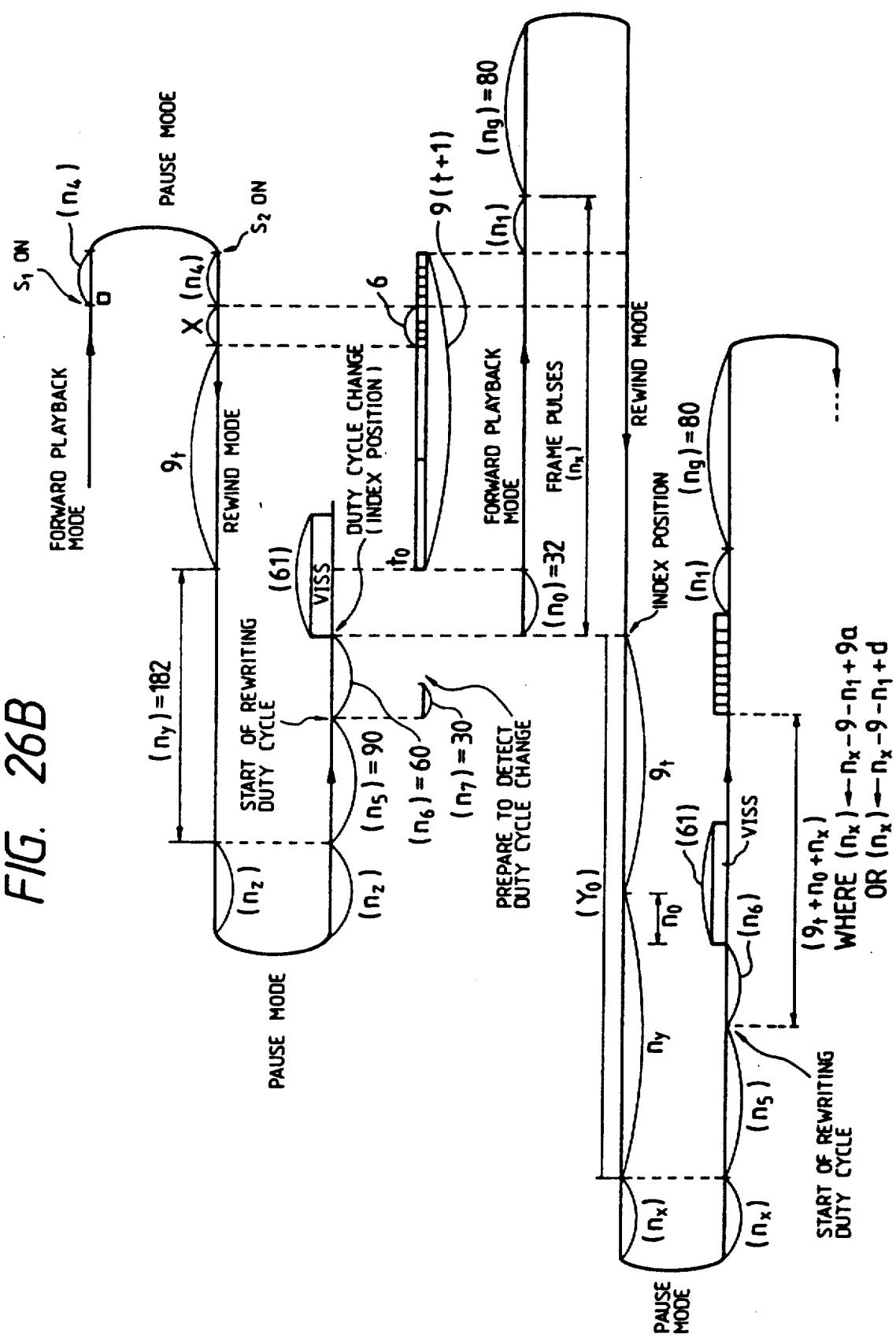

FIG. 31A
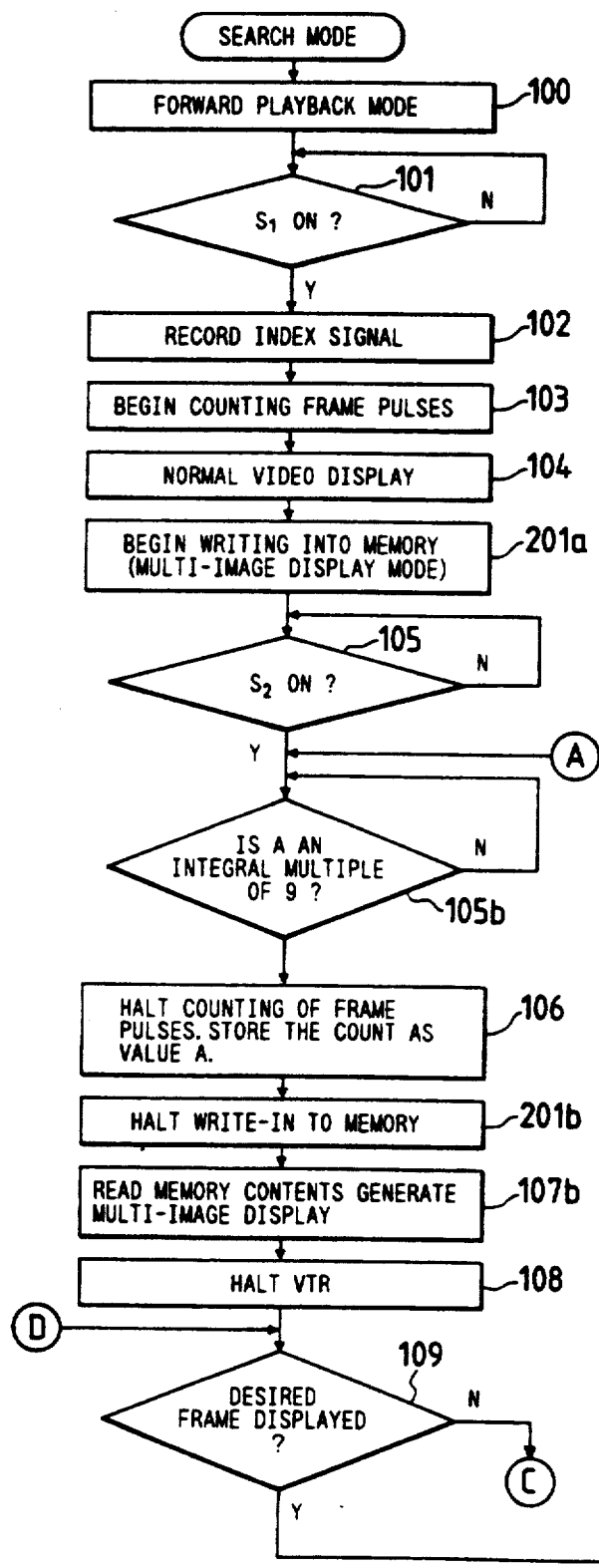
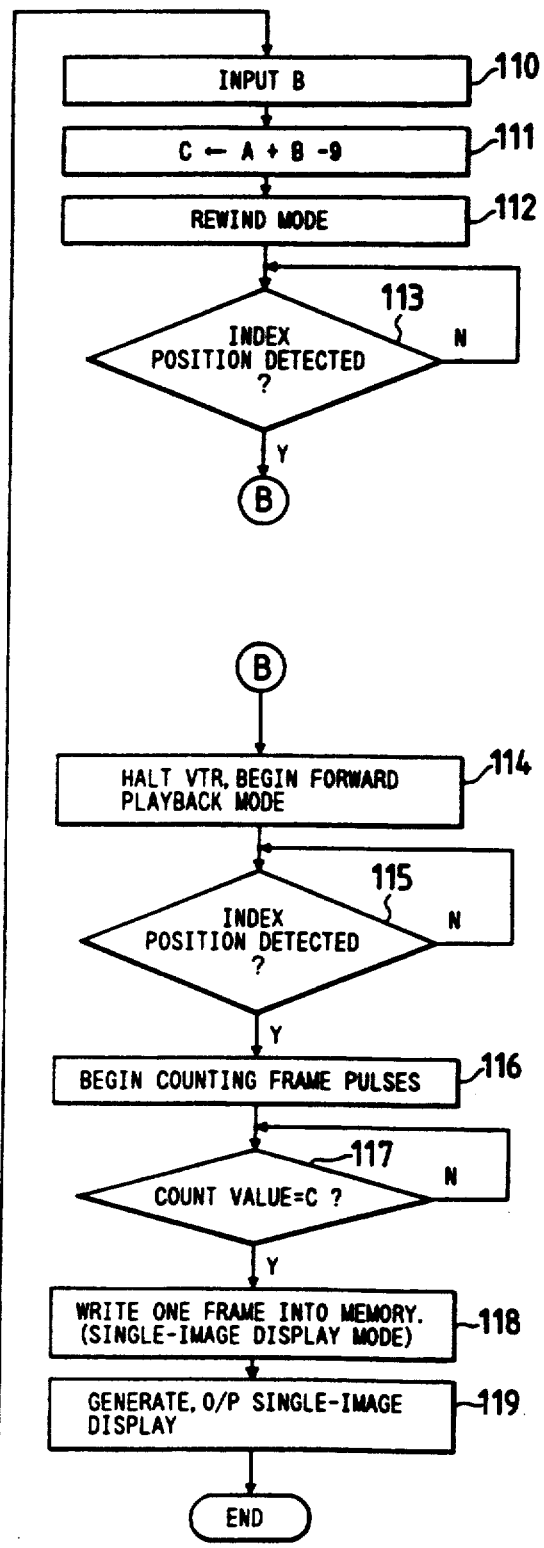

FIG. 33A

| $a_1$ $F_6$ | $a_4$ $F_9$ | $a_7$ $F_3$ | $b_1$ $F_6$ | $b_4$ $F_9$ | $b_7$ $F_3$ |
|---|---|---|---|---|---|
| $a_2$ $F_7$ | $a_5$ $F_1$ | $a_8$ $F_4$ | $b_2$ $F_7$ | $b_5$ $F_1$ | $b_8$ $F_4$ |
| $a_3$ $F_8$ | $a_6$ $F_2$ | $a_9$ $F_5$ | $b_3$ $F_8$ | $b_6$ $F_2$ | $b_9$ $F_5$ |

FINAL ADDRESSES FOR WRITE-IN ARE $a_4, b_4$

FIG. 33B

| $F_6$ | $F_7$ | $F_8$ |
|---|---|---|
| $F_9$ | $F_1$ | $F_2$ |
| $F_3$ | $F_4$ | $F_5$ |

INITIAL ADDRESSES FOR READ-OUT ARE $a_1, b_1$

FIG. 33C

| $F_1$ | $F_2$ | $F_3$ |
|---|---|---|
| $F_4$ | $F_5$ | $F_6$ |
| $F_7$ | $F_8$ | $F_9$ |

INITIAL ADDRESSES FOR READ-OUT ARE $a_5, b_5$

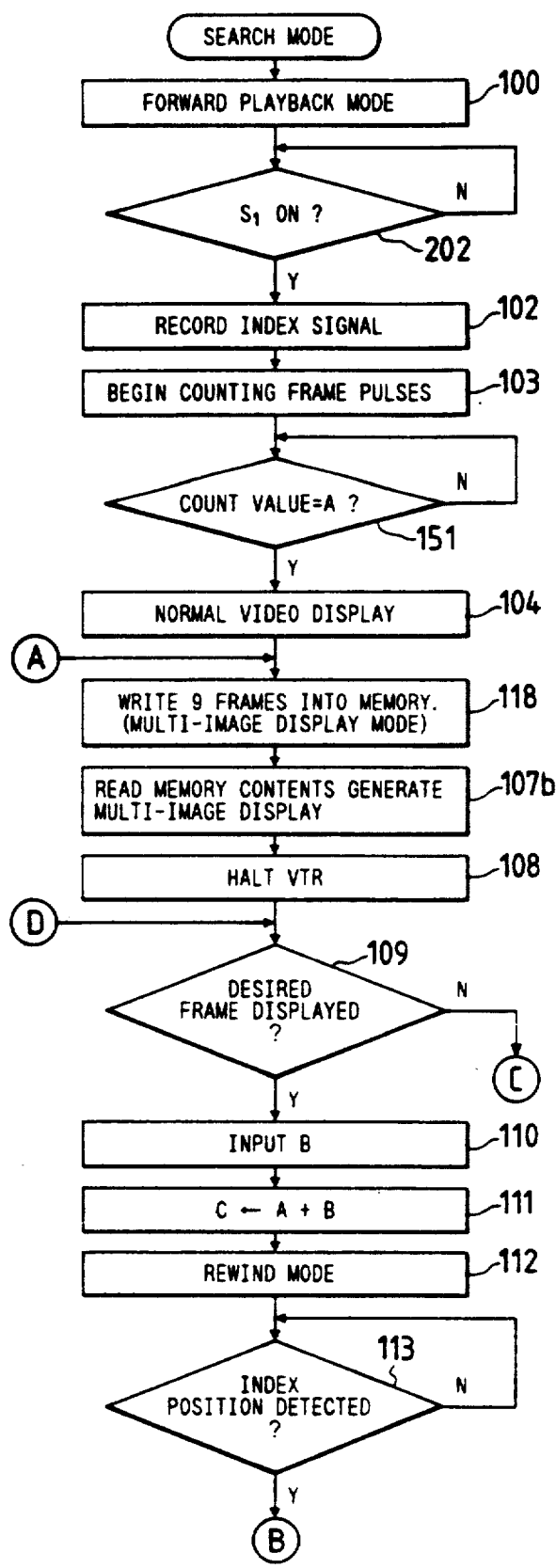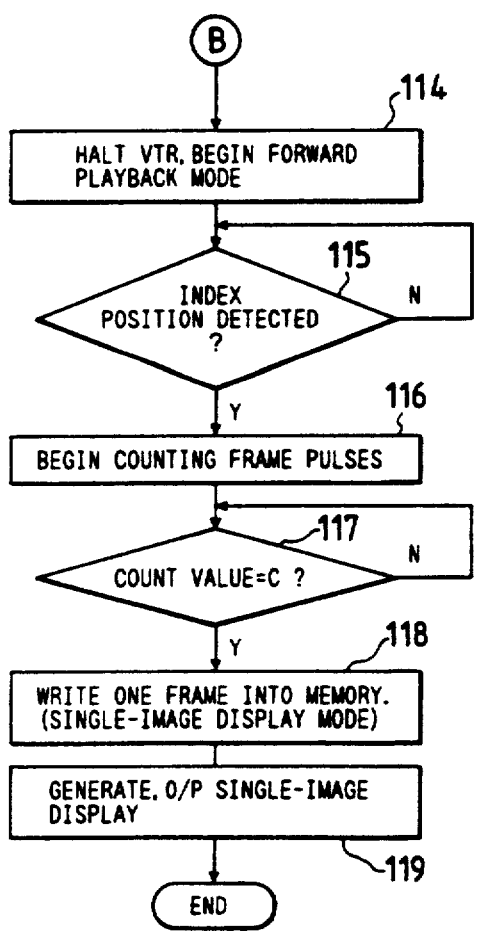
FIG. 34A

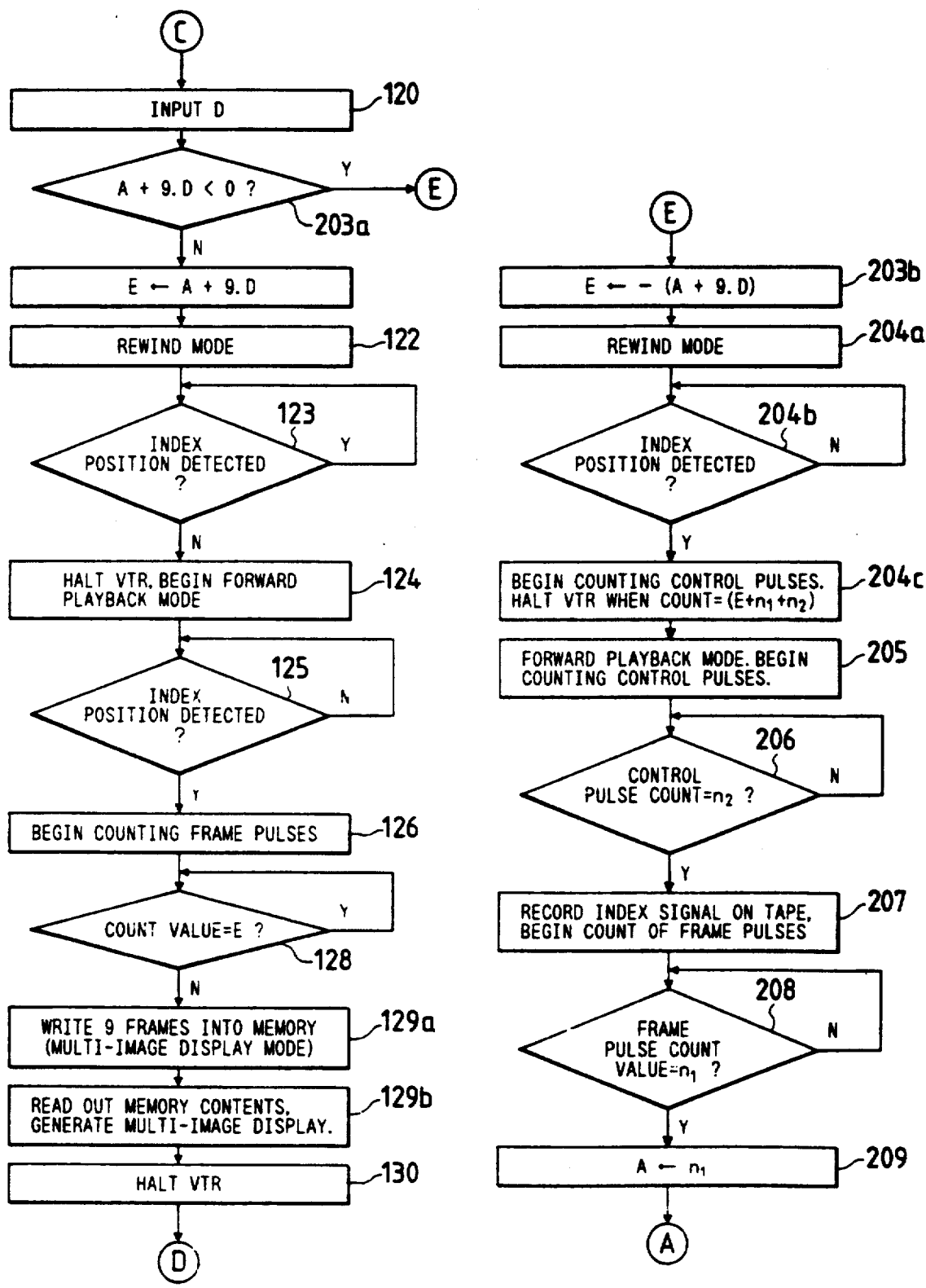

VIDEO SIGNAL FRAME SEARCH APPARATUS FOR SELECTION OF A DESIRED FRAME

BACKGROUND OF THE INVENTION

1. Prior Art Technology

The present invention relates to a video signal frame search apparatus for enabling a specific frame (or field) of a video signal recorded on a magnetic tape of a VTR (Video Tape Recorder) to be specified by a user, and for the specified frame to be searched for and subsequently outputted to a video printer apparatus to be printed.

2. Prior Art Technology

A video printer apparatus can be utilized to print a single selected frame of a video signal that is produced by playback operation of a VTR. In the following specification and in the appended claims unless stated otherwise, the term "frame" is to be understood as signifying a field of a video signal in the case of a video signal which is not of field interlace format, and to signify a frame of a video signal in the case of a video signal which is of field interlace format with 2 fields per frame. In recent years, video printers have reached a high level of technology. Generally, the video printer apparatus includes a frame memory, an analog/digital (A/D) converter circuit for converting an input analog video signal (e.g. produced during playback operation of a VTR) to digital data form to be stored in the frame memory, and a digital/analog (D/A) converter circuit for converting video data values read out from the frame memory into analog signal form, to be supplied to a printer head. In the case of a printer having a color printing capability, the R, G and B information contained in an input video signal is also converted to digital data which are stored in the frame memory. Use of such a frame memory is generally essential, since the printing speed is very low, by comparison with the frame rate of a video signal. Various methods of differing complexity have been proposed for selecting a desired frame which is to be printed, from the stream of successive frames of the input video signal. One simple method is to provide a "memory" switch on the video printer apparatus, and to supply the playback video signal directly to the video printer apparatus and also to a monitor for displaying the video images. An example of a circuit arrangement for achieving this is shown in FIG. 5. In that case, the user observes the monitor display during video signal playback, and actuates the "memory" switch when it is judged that the position of the desired frame has been reached. The contents of the first frame to occur following the switch actuation (i.e. two successive fields, in the case of the usual field-interlace video signal) are then stored in the frame memory. Successive horizontal scanning lines of the data stored in the memory are then read out and supplied to the printer head, to print out the desired frame.

The above arrangement has the disadvantage that since successive frames appear on the display at a high frequency (e.g. 30 frames/second), it is almost impossible for the user to accurately select a specific frame by actuating the "memory" switch while observing the video display, so that the time of switch actuation will inevitably overshoot the timing of the desired frame by a substantial amount. Thus the user will in general have to make a number of successive trial attempts at printing out a desired frame, so that excessive time will be required in order to obtain satisfactory results.

Alternatively, it is possible to set the VTR in an operating mode in which successive frames are successively displayed during relatively long intervals on the monitor display (e.g. a step-advancement playback mode) and, when a point is reached at which a desired frame appears on the display, to set the VTR in the "still" playback mode of operation to produce a stationary picture on the monitor, and to then supply the playback video signal to the video printer apparatus. The desired frame can thereby be printed out. This method can be utilized with a video printer apparatus which does not include a frame memory.

However this method has the disadvantage that the video signal that is produced from a VTR during the "still" playback mode has a substantially lower signal/-noise ratio than the playback signal that is obtained during normal-speed operation. The reasons for this are illustrated in FIG. 6. As shown, the video signal is recorded on successive tracks which are aligned at a fixed angle with respect to the direction of elongation of the magnetic tape, and are produced by successive scans across the tape by the magnetic heads of the rotating head cylinder during recording. An audio track extends along one side of the tape, i.e. along the longitudonal direction of the tape, while a control track having control pulses recorded thereon (described hereinafter) extends along the opposite side of the tape as shown. During normal-speed playback operation, the magnetic heads traverse the same paths as during recording, along these tracks. However during "still" playback operation, since movement of the magnetic tape is halted, the paths on the tape that are scanned by the rotating magnetic heads do not accurately coincide with the recorded tracks. As a result, the aforementioned reduction of the S/N ratio occurs during "still" mode playback, and hence the picture quality that is obtained by print-out using such a playback signal will be inferior to that which is obtainable by using a playback signal that is generated during normal-speed playback operation.

In the case of an industrial-use VTR which is provided with a VITC signal recording function, frame serial numbers (sometimes referred to as frame addresses) can be recorded on the magnetic tape for respective frames, with the frame serial data being inserted into the vertical blanking intervals of the recorded video signal. These frame serial numbers can be utilized by a frame search apparatus. However in order to print out a specific desired frame, in the prior art, it has been essential for the user to be aware of the exact frame serial number of that frame, whereas in general the user will only be capable of specifying a frame number which approximates to that of the desired frame. Thus even in the case of an industrial-use VTR having such a frame serial number function, it has not been possible for the user to easily and conveniently specify that a specific frame is to be searched for and outputted to a video printer.

Furthermore, a normal domestic-use VTR is not provided with such a frame serial number function, and a frame search apparatus which executes writing of frame serial numbers on the magnetic tape, for use with a domestic-use VTR, would be complex and expensive to produce.

SUMMARY OF THE INVENTION

It is an objective of the present invention to overcome the disadvantages of the prior art as set out above, by providing a video signal frame search apparatus for use in conjunction with a VTR and a video printer apparatus whereby a user can easily and accurately specify a desired frame or field of a video signal recorded on a magnetic tape, to be searched for and printed out by the video printer apparatus.

It is moreover an objective of the present invention to provide such a video signal frame search apparatus, whereby data representing a desired frame that is to be printed by the video printer apparatus are obtained from the VTR while a playback video signal is being is produced with the VTR operating in a normal forward playback mode of operation, so that a high S/N ratio is obtained for the video signal and hence a satisfactory level of quality is obtained for the printed image.

To achieve the above objectives, a video signal frame search apparatus according to the present invention is based on a system controller, e.g. a programmed microcomputer, which is coupled to control a VTR for forward playback and rewind (or reverse playback) operation, and a frame memory whose write-in operations are controlled by the system controller. In one embodiment, when a desired frame appears on a monitor display during playback operation, actuation of a search switch by the user causes the controller to store into the memory a set of consecutive frames which include the desired frames. These are then read out and displayed, and the user can then input to the controller (e.g. via a keyboard) a number which designates the exact position of the desired frame within the time-serial stream of frames of the playback video signal. The controller can then rewind the magnetic tape by a specific amount, then when playback of the desired frame begins, store that frame into the memory. The desired frame can thereafter be read out and transferred to a video printer.

One embodiment of the invention is a video signal frame search apparatus operable for controlling a video tape recorder to select a desired one of a plurality of successive video signal frames recorded on a magnetic tape, and comprises memory means, control circuit means coupled to the memory means and to the video tape recorder, for controlling read and write operations of the memory means and for controlling movement of the magnetic tape by the video tape recorder, the control circuit also comprising means for measuring amounts of movement of the magnetic tape in a forward playback direction and in a reverse direction, in units of frames, externally operable input means for inputting data to the control circuit means, and an externally operable search switch, coupled to the control circuit means;

in which the control circuit means is operable for executing a frame search operation by successively:

(a) controlling the video tape recorder to set the magnetic tape in the forward playback direction of movement;

(b) in response to actuation of the search switch, controlling the video tape recorder to halt movement of the magnetic tape, then to move the magnetic tape in the reverse direction by an amount corresponding to a first predetermined number of frames;

(c) controlling the video tape recorder to move the magnetic tape in the forward playback by an amount corresponding to a second predetermined number of frames, then controlling write-in to the frame memory of data representing X successive frames where X is a fixed integer, with movement of the magnetic tape then being halted, the data being thereafter read out repetitively from the frame memory to simultaneously display the X frames by video monitor means;

(d) in response to input of a frame designation number from the input means representing a position of the desired frame within the X frames, controlling the video tape recorder for movement of the magnetic tape in the reverse direction by a number of frames that is computed based upon the frame designation number; (e) controlling the video tape recorder for movement of the magnetic tape in the forward playback direction by a number of frames that is computed based upon the frame designation number, and writing an immediately succeeding frame into the frame memory as the desired frame, wherein said index signal is recorded by modifying a duty cycle of control pulses which are recorded on a control track of said magnetic tape, and said index position is defined by a change in said duty cycle.

Another embodiment comprises memory means, control circuit means coupled to the memory means and the video tape recorder, for controlling read and write operations of the memory means, for controlling movement of the magnetic tape by the video tape recorder, the control circuit further comprising means for measuring amounts of movement of the magnetic tape in a forward playback direction and in a reverse direction, in units of frames, first externally operable input means for inputting frame serial numbers to the control circuit means, second externally operable input means for inputting frame designation numbers to the control circuit means, and frame serial number detection means for detecting and supplying to the control circuit means frame serial numbers from a playback video signal of the magnetic tape; in which the control circuit means is operable for executing a frame search operation by successively:

(a) in response to input of a specified frame serial number from the first input means, controlling the video tape recorder for movement of the magnetic tape in the forward playback direction;

(b) computing a difference between a detected frame serial number supplied from the frame serial number detection means and a predetermined value and, if the difference exceeds the predetermined value, controlling the video tape recorder for rapid movement of the magnetic tape for a time duration determined in accordance with the magnitude of the difference and in a direction determined in accordance with the polarity of the difference, and thereafter repeating steps (a) and (b), and if the difference is no greater than the predetermined value, controlling the video tape recorder for forward playback movement of the magnetic tape while detection of successive ones of the frame serial numbers is executed;

(c) when coincidence between the specified frame serial number and a detected frame serial number occurs, controlling write-in to the frame memory of data representing X successive frames where X is a fixed integer, with movement of the magnetic tape then being halted, the data being thereafter read out repetitively from the frame memory to simultaneously display the X frames by video monitor means;

(d) in response to input of a frame designation number from the input means representing a position within the X frames, computing a frame serial number corresponding to the desired frame, based on the inputted frame designation number;

(e) controlling the video tape recorder for movement of the magnetic tape in the reverse direction by a number of frames that is computed based upon the frame designation number; and (f) controlling the video tape recorder for movement of the magnetic tape in the forward playback direction by a number of frames that is computed based on the frame designation number, and writing an immediately succeeding frame into the frame memory as the desired frame, wherein said index signal is recorded by modifying a duty cycle of control pulses which are recorded on a control track of said magnetic tape, and said index position is defined by a change in said duty cycle.

BRIEF DESCRIPTION OF THE DRAWINGS

FIG. 11 is a timing diagram for illustrating a method of controlling addresses of a frame memory in order to store video data for a multi-image display, which is an alternative method to that used in the embodiments of FIGS. 7 and 10;

FIGS. 12A, 12B are timing diagrams for illustrating two possible methods of establishing frames of a video signal which are to constitute a multi-image display, in the embodiments of FIGS. 7 and 10;

FIGS. 16A to 16F are timing diagrams for assistance in describing an operation of recording a VISS index signal on a control track of a magnetic tape;

FIG. 17A illustrates the prescribed format of a VISS index signal;

FIG. 17B is a circuit diagram showing an arrangement for connecting a video signal frame search apparatus according to the present invention to the control switches of a commercially available model of VTR, as used in the embodiment of FIG. 15;

FIG. 18 is a flow chart for describing the operation of the embodiment of FIG. 15;

FIG. 19 is a conceptual diagram for describing control of magnetic tape movement by the VTR, in the embodiment of FIG. 15;

FIG. 20 is a is a system block diagram of an eighth embodiment of a video signal frame search apparatus according to the present invention, which is combined with a VTR;

FIGS. 21A to 21E are timing diagrams for describing control of a frame memory in the eighth embodiment;

FIG. 22 illustrates write-in operations to respective regions of the frame memory assigned to frames of a multi-image display, in the eighth embodiment;

FIG. 23 is a diagram corresponding to FIG. 22, for the case of memory read-out;

FIG. 24 illustrates the format in which respective frames of a multi-image display appear on a monitor display, in the eighth embodiment;

FIGS. 26A and 26B are conceptual diagrams for describing control of magnetic tape movement by the VTR, with the eighth embodiment;

FIGS. 31A and 31B constitute a flow chart for describing the operation of an eleventh embodiment of the invention, having the configuration shown in FIG. 20;

FIGS. 33A to 33C are diagrams for illustrating an alternative method of controlling write-in and read-out of the frame memory of the eleventh embodiment, in multi-image display operation;

FIG. FIGS. 34A and 34B constitute a flow chart for describing the operation of a twelfth embodiment of the invention, having the configuration shown in FIG. 20;

DESCRIPTION OF PREFERRED EMBODIMENTS

Figure 1:
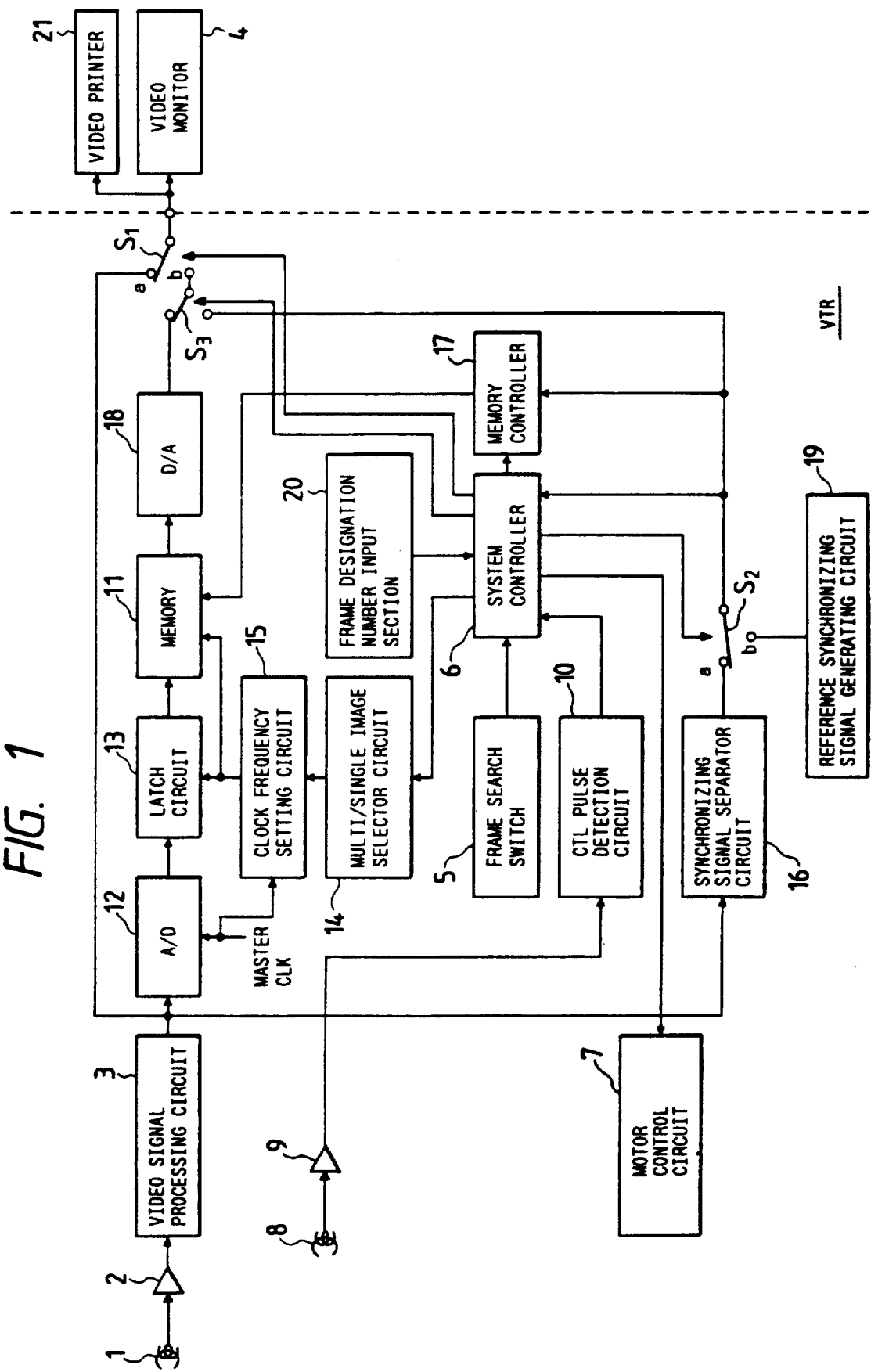
FIG. 1 is a system block diagram of a first embodiment of a video signal frame search apparatus according to the present invention, which is combined with a VTR apparatus.

FIG. 1 is a system block diagram of a first embodiment of a video signal frame search apparatus according to the present invention, which is combined with a VTR. Only a video head 1, a preamplifier 2, video signal processing circuit 3, control head 8, preamplifier 9, and capstant motor control circuit 7 of the VTR are shown in the drawing. An output signal produced from the video head 1 which scans a magnetic tape (not shown in the drawing) during playback operation of the VTR is amplified and then processed by the video signal processing circuit 3 to obtain a playback composite video signal, which is supplied to an A/D converter circuit 12 and to one input of a switch S1. Numeral 5 denotes a memory switch, which is used to select a desired frame of a playback video signal, and 6 denotes a system control circuit. The capstan motor control circuit 7 controls tape drive operations of the VTR. Numeral 11 denotes a frame memory capable of storing digital data of one frame of the playback video signal, 13 denotes a latch circuit, 18 a digital/analog (D/A) converter circuit for converting digital data read out from the frame memory 11 to analog signal form, and 14 denotes a multi/single image selection circuit for selecting either memory operation for write-in or read-out of either a single frame or a plurality of successive frames. The above components function in combination for producing signals whereby a single frame of a playback video signalis stored in memory and displayed, or a plurality of frames are displayed simultaneously as a multi-image display (i.e. a set of miniature images) on a television monitor 4. A normal television receiver can be used as the monitor 4, by appropriately converting the output video signal from the apparatus, however for simplicity of description it will be assumed that an output video signal from the apparatus is supplied directly to the video monitor 4. The set of frames thus appearing on the multi-image display extend from a postion (along the time axis of the playback video signal) which is prior to that of a desired frame which is to be printed out by a video printer 21, to a position subsequent to the desired frame.

A frame designation number input section 20a, the system controller 6, the capstan motor control circuit 7, and the frame memory 11 function in combination for executing signal processing to produce signals whereby a desired frame is selected from the multi-image display, the magnetic tape of the VTR is moved in the reverse direction until the position of the desired frame is reached, and the playback video signal is then produced for that frame. The video data for that frame are converted to analog form and transferred by the switch S1 to the video printer 21 and the video monitor 4. The frame designation number input section 20a includes a keyboard whereby a frame designation number that is in the range from 1 to 9 can be inputted by the user, for specifying the position at which a desired frame appears on a 9-picture multi-image display, as described hereinafter.

Figure 2:
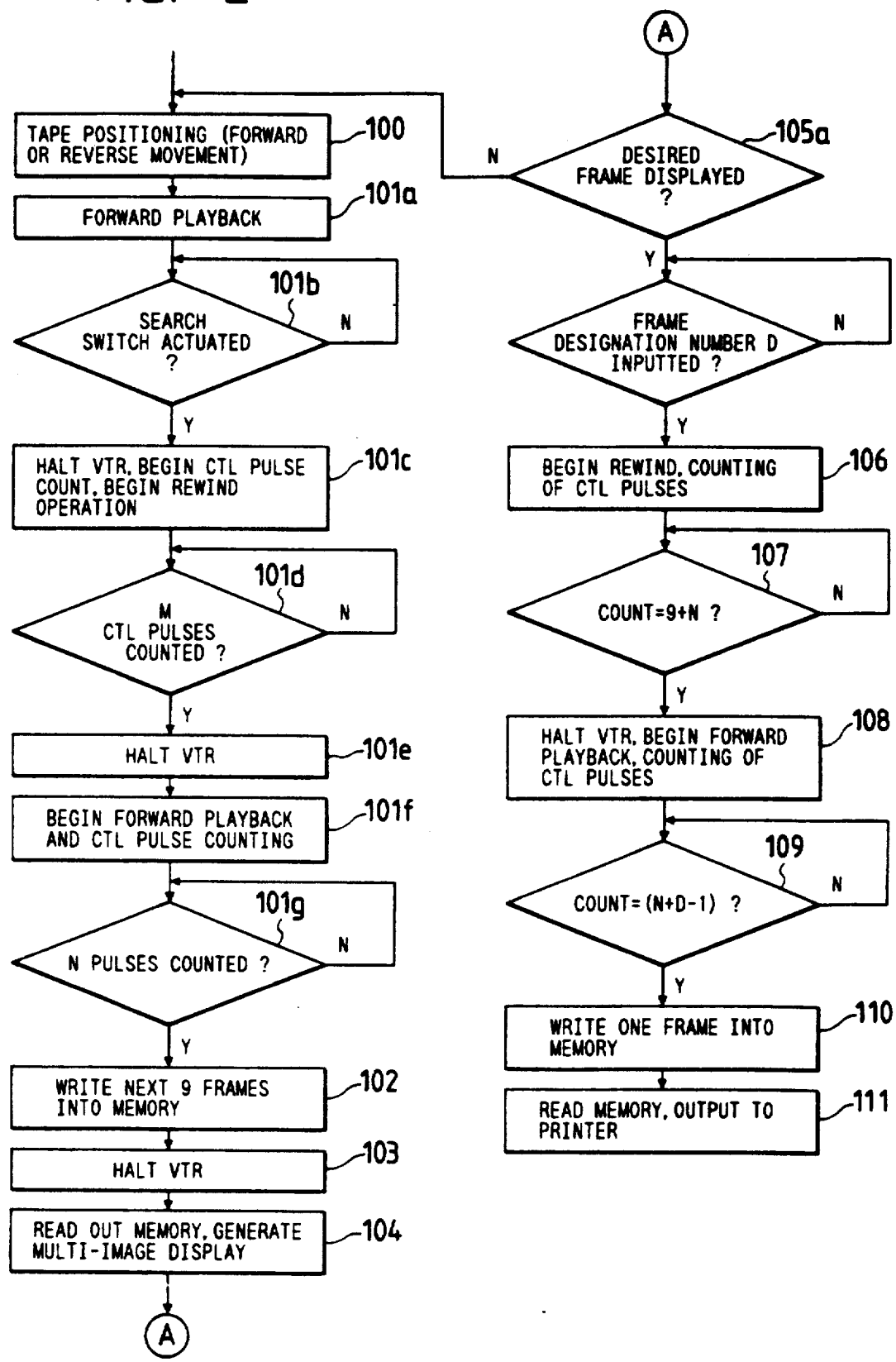
FIG. 2 is a flow chart for describing the operation of the embodiment of FIG. 1.
Figure 3:
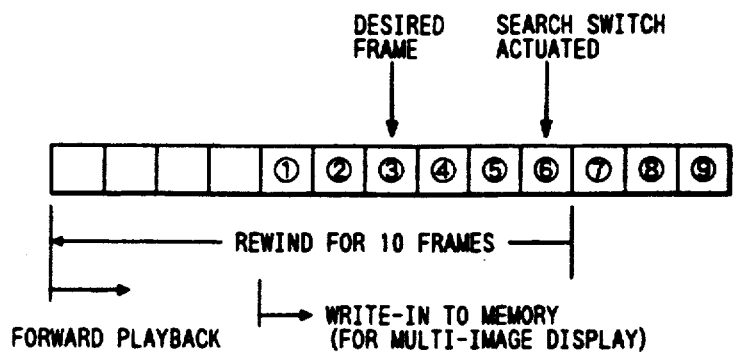
FIG. 3 is a diagram for illustrating control of movement of a magnetic tape during operation of the embodiment of FIG. 1.
Figure 5:
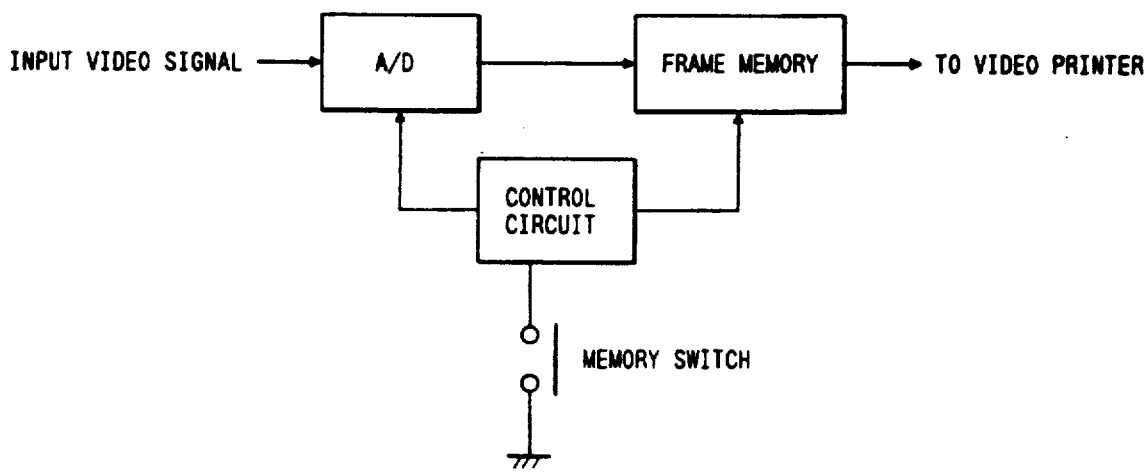
FIG. 5 is a simple block diagram for describing a prior art method of specifying a frame of a video signal to be transferred to a video printer.
Figure 6:
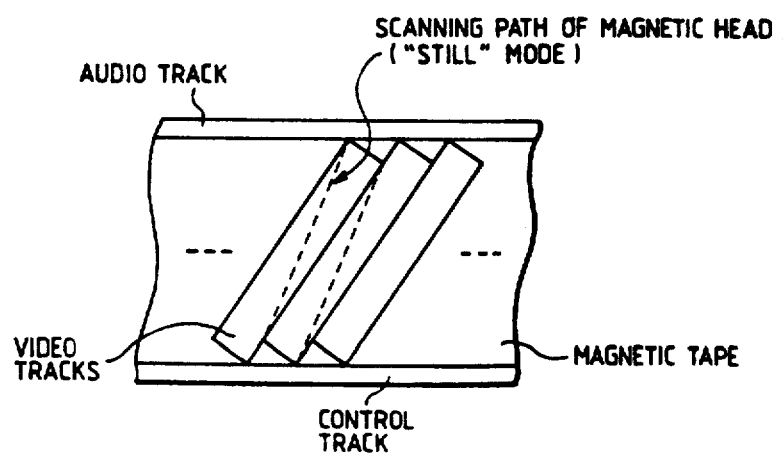
FIG. 6 is a diagram illustrating a configuration of tracks of a magnetic tape of a domestic-use VTR.

The above will be described in more detail in the following, referring to FIG. 1 and also to an operation flow chart shown in FIG. 2. The flow chart of FIG. 2 illustrates the overall functioning of the apparatus when a search is executed for a desired frame, and includes manual control operations of the VTR which are performed by the user when necessary. For simplicity of description, components used for setting the apparatus in a frame search mode are omitted from the drawing. Normally, the system controller 6 controls the switch S1 to be held its "a" position, to thereby transfer the output video signal from the video signal processing circuit 3 directly to the video printer 21, to provide a normal video image display. Prior to beginning a frame search operation, the user operates the controls of the VTR to move the magnetic tape to a position that is prior to the playback position of the desired frame, i.e. first sets the VTR in a rewind or reverse playback mode if necessary until a suitable position is reached (step 100). The VTR is then set in frame search mode, whereupon the forward playback mode of the VTR is established by the system controller 6, with switch S1 still at the "a" position. (step 101a). Thereafter, when the desired frame appears on the video monitor 4, the user actuates the switch 5, which is detected by the system controller 6 (step 101b). The system controller 6 responds by issuing a control signal for halting the capstan motor of the VTR (101c). Generally speaking, as illustrated in FIG. 3, the user will in practice actuate the frame search switch 5 at a point in time when the desired frame has been overshot, by two or three frames. After halting the VTR at this point, the system controller 6 outputs a control signal to the capstan motor control circuit 7 whereby the magnetic tape is set in a rewind mode or a reverse playback mode of operation, and counting of control pulses is started. (step 101c in FIG. 2). On the magnetic tape, the video signal is recorded as successive tracks which are oriented obliquely with respect to the longitudonal direction of the tape, while as described above, the control pulses are recorded along a control track which extends along one side of the tape, as shown in FIG. 6. These control pulses are utilized during forward playback of a VTR for phase control of the servo control system of the capstan motor which drives the magnetic tape. In this embodiment, these control pulses are also amplified in a preamplifier 9 and detected by a control pulse detection circuit 10, with the resultant output pulses being supplied to the system controller 6 to be counted by an internal counter. In a domestic-use VTR, the control pulses correspond to respective frames of the recorded video signal, i.e. are produced at the frame rate (½ of the field frequency) during playback operation, and in synchronism with the vertical blanking intervals. Counting of control pulses by the system controller 6 is initiated when the "rewind" command is issued in step 101c, and is halted when a specific number M of control pulses (designated as CTL pulses in FIG. 2) corresponding to a fixed number of frames, has been counted. In this embodiment, the count value M is 10, and when this value is reached, the tape rewind operation is halted by a command signal from the system controller 6 (step 101e). The system controller 6 then issues a "forward playback" command signal to the capstan motor control circuit 7, whereby playback of the portion of magnetic tape that has been moved backward by the rewind operation is started (step 101f), with control pulses being counted. When the count value reaches a fixed value N, which in this embodiment is 4 (step 101g), the succeeding 9 frames of the playback video signal are written into the memory 11 (step 102). In this condition, a control signal from the controller 6 causes the multi-/single image selector circuit to control the operation of the clock frequency setting circuit such that a multi-image mode of memory write-in is utilized, with only one of every three data values from the A/D converter 12 and one in every three horizontal scanning lines consisting of these data values are written into the frame memory 11, as described hereinafter. At this time, switch S2 is set to its "a" position, so that synchronizing signals produced from the synchronizing signal separator circuit 16 are supplied to the system controller 6 and memory controller 17 for timing control purposes during memory write-in.

The above process of rewinding the magnetic tape by 10 frames, then executing playback, is illustrated in FIG. 3, in which it is assumed that the frame designated as 3 is the one which is desired to be printed, and the frame designated as 6 is that which is being produced as the playback video signal at the instant when the frame search switch 5 was actuated. As a result of this playback operation, control pulses are again supplied from the control head 8 via the preamplifier 9 and control pulse detection circuit 10 to the system controller 6 and are counted. When the fixed number N has been counted, i.e. corresponding to 4 frames, the system controller 6 issues command signals for executing a multi-image memory write-in operation. In this condition, switch S2 is set to the "a" position, and the synchronizing signal separator circuit 16 separates the synchronizing signals contained in the composite video signal produced from the video signal processing circuit 3 during playback, and supplies the separated synchronizing signals via the switch S2 to the memory controller 17, which controls write-in operations of the frame memory 11.

The succeeding nine frames (i.e. beginning at the fifth frame, and respectively designated as frames 1 through 9 in FIG. 3) are then written into the frame memory 11. Specifically, the playback video signal that is outputted from the video signal processing circuit 3 is converted to successive digital signal values by the A/D converter circuit 12, and transferred through the latch circuit 13 to the frame memory 11. In order to store the respective frames in the frame memory 11 such that a multi-image display will be produced from the data subsequently read out from the frame memory 11, the clock frequency setting circuit 15 is controlled by output signals from the multi/single image selector circuit 14 for producing an output clock signal that is obtained by frequency-dividing a fixed frequency clock signal by a factor n, where n is a natural number. Designating the number of images into which the multi-image display is to be divided (i.e. in this embodiment, 9) as X, the multi/single image selector circuit 14 produces the value n based on the relationship $X = n^2$, i.e. n is the square root of X, and is equal to 3 in this example. This frequency-divided clock signal from the clock frequency setting circuit 15 is supplied to the latch circuit 13 and frame memory 11, for controlling write-in of digital signal values to the frame memory 11. The latch circuit 13 executes thinning-out of successive digital signal values supplied from the A/D converter circuit 12, both in the horizontal and vertical display directions, by a factor 1/n. That is to say, one of every n successive digital signal values is transferred by the latch circuit 13 to the frame memory 11 and stored therein (step 102 in FIG. 2). During this operation the horizontal synchronizing signals in the playback video signal, separated from that video signal by the synchronizing signal separator circuit 16, are supplied to the system controller 6 and the memory controller 17. The memory controller 17 thereby controls write-in of the video signal data into the frame memory 11 by supplying successive address signals. This address control operation is synchronized with the thinning-out of successive digital signal values such as to produce thinning-out in the vertical display direction, i.e. such that only one in every n horizontal scanning lines of the playback video signal is written into the frame memory 11.

When a total of X frames (i.e. in this embodiment, the frames 1 to 9 in FIG. 3) have been stored in the frame memory 11, the system controller 6 issues a command signal for halting playback operation (step 103), and for setting switch S1 to the "b" position thereof and switch S2 to the "b" position. The system controller 6 also produces a command signal whereby the memory controller 17 sets the frame memory 11 in the read condition, and address signals are then successively produced from the memory controller 17 for repetitively executed read-out of the stored memory data. These are transferred through the D/A converter circuit 18 to be converted back to analog video signal form. At the time of write-in, the operation of the latch circuit 13 is controlled such that only video data components of the playback video signal, with synchronizing signal components omitted, are transferred to the frame memory 11. During read-out operation therefore these synchronizing signal components are re-inserted by being supplied from a reference synchronizing signal generating circuit 19 and inserted into the analog video signal produced from the D/A converter circuit 18, by the action of switch S3, at appropriate timings that are determined by a control signal from the system controller 6 which is applied to switch S3. A composite video signal for producing a static multi-image display made up of 9 miniature images is thereby produced from the output of switch S3 and supplied to the video monitor 4, to be displayed thereby (step 104 in FIG. 2).

The user now observes this display, and if the frame which it is required to print out (e.g. frame 3 in FIG. 3) is among the displayed images, then the user specifies that frame by actuating the keyboard of the frame designation number input section 20a to input to the system controller 6 a frame designation number D (i.e. a number which is in the range 1 to (X−1), or 1 to 9 in this case) which specifies the sequence position of the desired frame within the 9 sequentially generated frames which appear in the multi-image display (step 105a). The relationship between time-serial sequence positions of displayed frames and the display positions of the 9 frames of the multi-image display is assumed to be known beforehand by the user, or can be indicated on the display (step 105).

The system controller 6 is thereby notified that the desired frame is among the frames of the multi-image display, and the time-serial position of that desired frame within the multi-image display, and responds by issuing a "rewind" command signal (step 106) to the VTR circuits whereby the magnetic tape is moved in the reverse direction (while counting control pulses) by (N+9) frames, to the previous position which is prior to the playback position of the desired frame 3, e.g. the tape is moved by 13 frames for the example of FIG. 3. (step 107)). The system controller 6 then issues a command signal to begin playback operation. During this playback operation, control pulses that are produced from the preamplifier 9 and control pulse detection circuit 10 are counted by the system controller 6 (108), and when a count value of (N+D−1) is reached (step 109), write-in to the frame memory 11 of the succeeding frame (the desired frame) is started. In the example of FIG. 3, the position of desired frame 3 corresponds to a frame count value (N+D−1) of 6. When that count value is reached, then the data for the succeeding frame are written into the frame memory 11, i.e. the image data of the desired frame (number 3) are written into the frame memory 11.

In this case, the output clock signal from the clock frequency setting circuit 15 consists of the aforementioned fixed frequency clock signal, without executing frequency division of that clock signal by the factor n, and all of the horizontal scanning lines of the frame are written into the frame memory 11, so that no thinning-out of the frame data occurs, i.e. data for a full-size display image are stored in the frame memory 11 (step 110).

The contents of the frame memory 11 are thereafter repetitively read out, and transferred through the D/A converter circuit 18 to be converted to analog video signal form. Sync signals produced from the reference synchronizing signal generating circuit 19 (with switch S2 now set to its "b" position) are inserted by repetitive operation of the switch S3, and the resultant composite video signal is transferred through switch S1 to the video printer 21. In the video printer 21, the video signal is converted to suitable form for being supplied to a printer head, and the desired frame is then printed out (step 111).

If it is found that the desired frame is not present in the multi-image display appearing on the video monitor 4 (i.e. a NO decision in step 106), then the user can again operate the controls of the VTR to move the magnetic tape in the forward or reverse direction, by an amount that is judged to be appropriate, and the above operations then repeated (step 110).

In the above, for simplicity of description, it is assumed that movement of the the magnetic tape is halted immediately when the search switch 5 is actuated (step 101b), after rewind has been executed (step 101e), and when 9 frames have been written into the memory (steps 102, 103). This immediate halting of the magnetic tape is of course not possible in practice. However this practical problem can be solved in the following manner. Starting at the point of actuation of the frame search switch 5:

(a) When actuation is detected, the VTR is set in the "pause" mode, and counting of control pulses is restarted (i.e. from zero).

(b) When the period of the control pulses increases to a predetermined value, as measured by the system controller 6 (i.e. indicating that the magnetic tape is almost stationary), the control pulse count value n is stored in memory, and the VTR is set in the "forward playback" mode.

(c) When the period of the control pulses falls to the predetermined value, control pulse counting is restarted, and when the count reaches the value n, control pulse counting is restarted once more.

(d) When M pulses (i.e. 10 pulses in the example of FIG. 3) have been counted, the VTR is set in the "pause" mode, and counting of control pulses is restarted.

Steps (b) to (d) are then repeated but with the VTR being set in the "forward playback" mode, to then count N pulses (i.e. 4 pulses in FIG. 3) and then start write-in of the 9 successive frames. A similar procedure can be used when write-in of the 9 frames has been completed, to rewind the tape.

In practice, the control pulses may not coincide with the starting points of respective frames of the playback video signal. For example, each time point at which the control pulse count is incremented may differ by one field interval from the starting point of a frame. However this problem can be overcome by appropriate system design.

Although in the above description, counting of control pulses is described, it would also be possible to modify the embodiment such as to execute counting of frames, i.e. to detect the start of each even-numbered field (based on the number of equalizing pulses at the start of the vertical blanking interval of the field) and thereby generate frame pulses, and to count these instead of control pulses.

It can be understood from the above that this embodiment of the present invention enables a desired frame to be reliably printed out by a video printer apparatus. In addition, since print-out is executed by using the video data for one frame, obtained during normal playback operation of the VTR (rather than during the "still" playback mode), a high S/N ratio of the playback video signal is ensured, so that a high quality printed image can be obtained.

Figure 4:
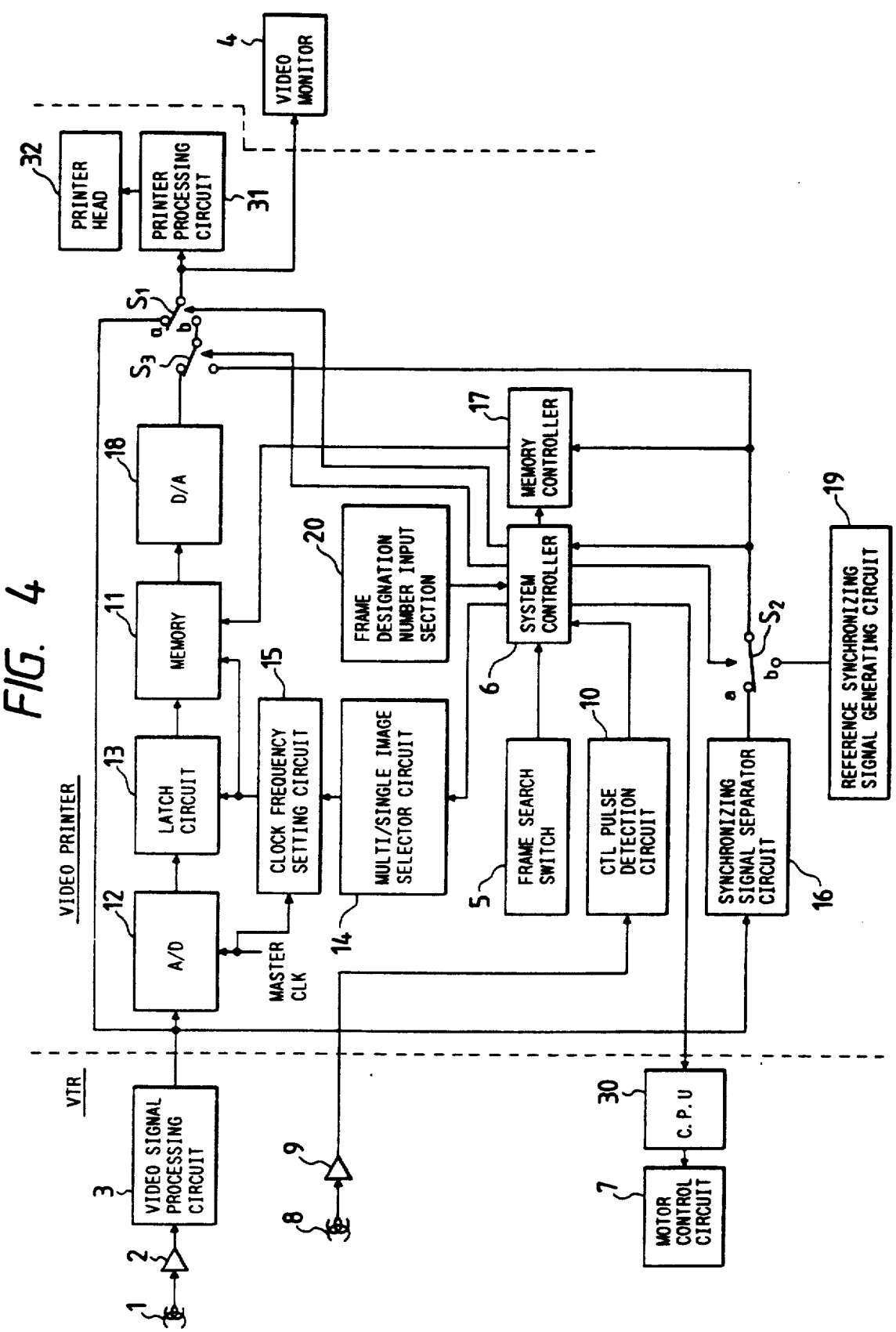
FIG. 4 is a system block diagram of a second embodiment of a video signal frame search apparatus according to the present invention, which is combined with a video printer and is a variation of the first embodiment.

FIG. 4 is a system block diagram of a second embodiment of a video signal frame search apparatus according to the present invention, in which circuit blocks and components that are identical to those of FIG. 1 are designated by corresponding reference numerals. In the first embodiment, the video signal frame search apparatus is incorporated into a VTR, with an output video signal from the VTR being supplied to a video printer 21. In the embodiment of FIG. 4 however, most of the circuit blocks of the video signal frame search apparatus are contained within the video printer apparatus. The VTR is further provided with a CPU 30, which receives command signals produced from the system controller 6 and utilizes these signals to control the capstan motor control circuit 7 and other parts of the VTR.

With this embodiment, when print-out is to be executed, the output signal from the switch S1 (i.e. the composite video signal derived by read-out of the contents of the frame memory 11) is converted by a printer processing circuit 31 to a suitable form for printing by a print head 32. At that time, successive horizontal scanning lines of the desired frame can be read out from the memory 11, one line at a time, at a suitable slow rate for supply to the printer head. The frame memory 11 therefore also functions as a buffer memory (frame memory) for the video printer apparatus, in addition to the multi-image display function described hereinabove.

Otherwise, this embodiment functions essentially in the same manner as the previous embodiment, so that further description will be omitted. This embodiment has the advantage that the frame memory 11 can be utilized during printing operation for supplying data to the printer processing circuit 31 and printer head 32 at a suitable low rate, i.e. it is not necessary to provide an additional frame memory for that purpose.

From the above, it can be understood that the basic operations executed by each of the first and second embodiments during a frame search operation can be summarized as follows:

1. Set the VTR in (forward) playback operation.
2. When frame search switch 5 is actuated, halt the playback operation, then start rewind (or reverse playback) operation and begin counting control pulses.
3. When a first predetermined number of control pulses have been counted, halt the rewind operation, begin forward playback operation of the VTR, and begin forward playback operation.
4. When a second predetermined number of control pulses have been counted, write into the frame memory 11 a succeeding fixed number of frames X (for producing a multi-image display).
5. Halt the playback operation, and repetitively read out the frame memory 11 to produce a multi-image display on the video monitor 4. Receive a frame designation number inputted by the user.
6. Start reverse operation, with counting of control pulses, and when a fixed number of control pulses which is greater than X have been counted, halt the rewind.
7. Start forward playback operation, and start counting of control pulses. When count value reaches a value determined based on the frame designation number, start write-in of the succeeding frame of the playback video signal into the frame memory 11.
8. Halt playback operation, repetitively read out the frame memory 11 contents, and output the resultant video signal.

Figure 7:
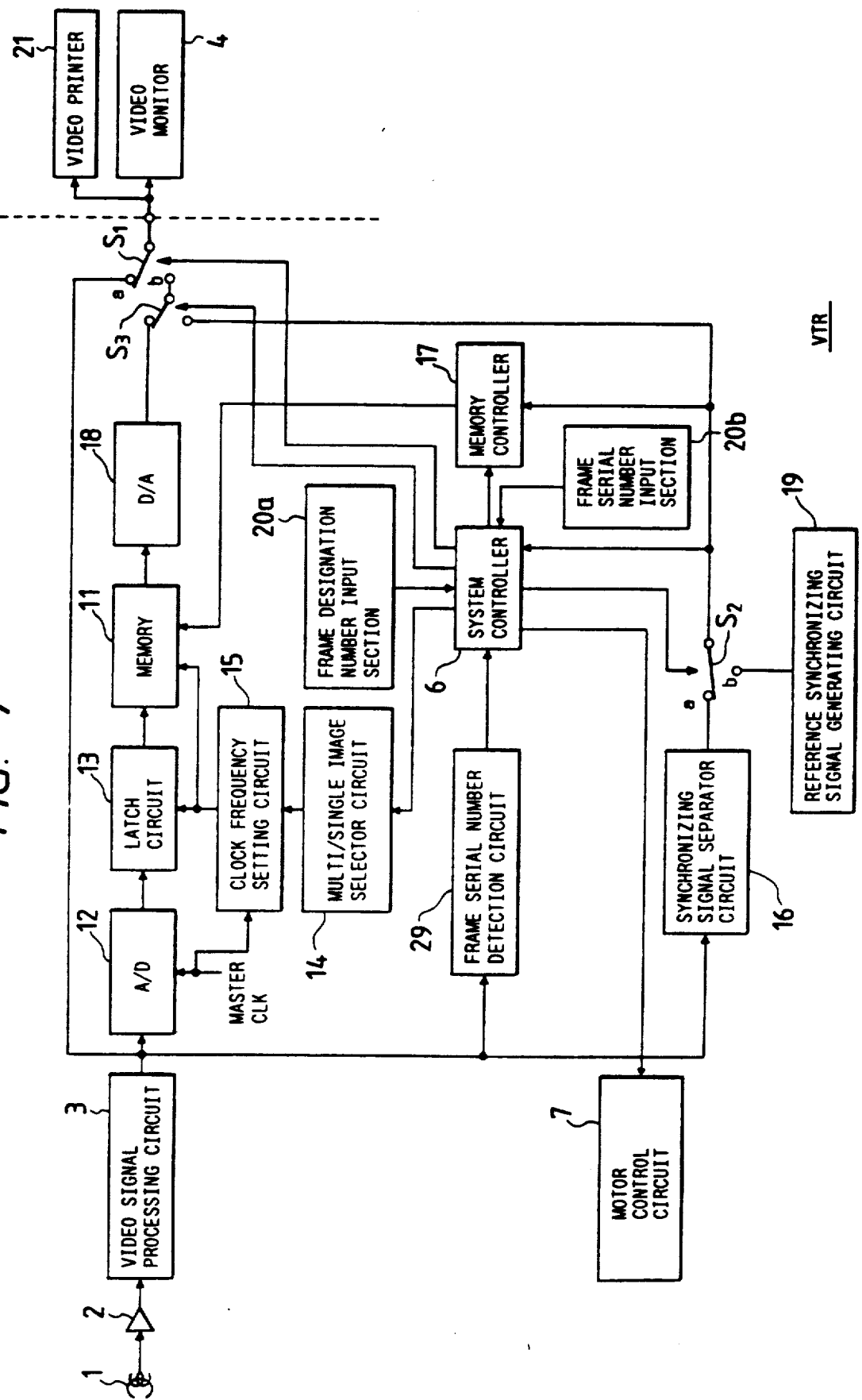
FIG. 7 is a system block diagram of a third embodiment of a video signal frame search apparatus according to the present invention, which is combined with a VTR apparatus.

A third embodiment of a video signal frame search apparatus according to the present invention will now be described, which has basic similarities to the first embodiment described above, but which is applicable to a VTR having a capability for recording frame serial numbers (sometimes referred to as "frame addresses") on a magnetic tape, for respective frames of a recorded video signal. At the time of playback, these frame serial numbers can be detected and utilized to identify specific frames of the playback video signal. FIG. 7 is a system block diagram of this embodiment, in which successive frame serial numbers, detected from a playback video signal of the VTR are compared with an input frame serial number that is specified by the user, and which is known to be close to the frame serial number of a desired frame which is to be printed. When the specified frame serial number is encountered, a multi-image display is produced on the video monitor 4, consisting of a display of a set of successive frames of the playback video signal which are respectively positioned adjacent to the frame having the specified frame serial number. In FIG. 7, numeral 20b denotes a frame serial number section, which is provided with a keyboard whereby the user can input a frame serial number. As for the preceding embodiments, the apparatus also includes a frame designation number input section 20a, having a keyboard whereby the user can input a frame designation number when a desired frame appears on the multi-image display as described hereinafter. When such a frame designation number is inputted, the the apparatus thereby computes the exact frame serial number of the desired frame, then moves the magnetic tape to a position at which the desired frame can be reproduced, and then sets the VTR in the forward playback mode. When a frame serial number that is obtained by playback from the magnetic tape coincides with the frame serial number of the desired frame, the video data of the corresponding frame are written into a frame memory, and subsequently repetitively read out to produce a video signal which is supplied to a video printer.

The operation of this embodiment will be described referring to the flow chart of FIG. 8 for the system controller 6, which controls the overall operation of the video signal frame search apparatus, and to the timing diagram of FIG. 9. In this embodiment, most of the components of the video signal frame search apparatus are contained within a VTR, as shown in FIG. 7, with an output signal from the apparatus being supplied to a printer processing circuit 21 and to a video monitor 4. It will be assumed that the user is aware of the frame serial number of a frame that is close to that of a desired frame which is to be printed, prior to beginning the frame search operation. When the apparatus is set in a search mode of operation, and the user then inputs the frame serial number which is believed close to that of the desired frame, (step 100 in FIG. 8), this frame serial number is transferred to the system controller 6, which then outputs a command signal whereby the VTR is set in the forward playback mode (step 101).

FIG. 9A illustrates one vertical blanking interval of the playback video signal of this embodiment, illustrating the position at which the frame serial number data are inserted. As shown, the frame serial number is inserted at a position subsequent to the vertical synchronizing pulses and equalizing pulses of that vertical blanking interval, and corresponds to the frame which immediately succeeds that vertical blanking interval. That is, the frame serial number data contained at the end of the final vertical blanking interval of the frame whose serial number is n consists of the serial number $(n+1)$, i.e. that of the succeeding frame.

The playback video signal from the video head 1 is transferred through the preamplifier 2 and video signal processing circuit 3 to the frame serial number detection circuit 29, which detects the successive frame serial numbers (step 102). The system controller 6 compares each detected frame serial number with the aforementioned inputted frame serial number that is close to the desired frame, which is fixedly supplied from the frame serial number input section 20b (step 103).

Detection of a frame serial number is executed as follows. During each vertical blanking interval of the playback video signal, a "count enable" signal shown in FIG. 9B is produced (at the L logic level) in synchronism with an output signal produced from the synchronizing signal separator circuit 16, beginning when a fixed number of equalizing pulses of that blanking interval have occurred. Counting of successive pulses in that vertical blanking interval (i.e. the equalizing pulses and vertical synchronizing pulses within that interval) by an internal counter of the system controller 6 is thereby initiated, as indicated in FIG. 9C. When the count value reaches a predetermined value, indicated as m in FIG. 9C, counting is terminated and an "address interrupt" signal is produced by the system controller 6 (at the H logic level) as shown in FIG. 9D. The data contained in that vertical blanking interval (in this example, the frame serial number of the $n^{th}$ frame) are then inputted to the system controller 6, to be compared with the inputted frame serial number from the frame serial number input section 20b.

If it is found in step 103 that (specified frame serial number)<(detected frame serial number), then the difference between these two quantities is converted into data representing an equivalent value of time duration, and the system controller 6 causes the CPU 30 to produce corresponding command signals whereby the capstan motor of the VTR drives the tape in the reverse direction (in the "rewind" mode) to reach a position at which playback of the frame specific specified by the frame serial number can be executed (step 104).

Conversely, if (specified frame serial number)>>(detected frame serial number), i.e.. the specified number is greater than the detected number by more than a predetermined amount, then the difference between these two quantities is converted into data representing an equivalent value of time duration, and the system controller 6 causes the CPU 30 to produce corresponding command signlas whereby the capstan motor of the VTR drives the tape in the forward direction (e.g. in the "fast-forward" mode) to reach a position at which the normal forward playback mode of the VTR can be entered, and playback of the frame specified by the frame serial number can be executed (step 104).

In this way, the magnetic tape is moved in the forward or the reverse direction to achieve a condition in which playback of the frame having the specified frame serial number can be executed, with this operation being based on executing a comparison between the specified frame serial number and detected frame serial number, by the system controller 6.

If (specified frame serial number)>(detected frame serial number), i.e. if the amount by which the specifiefd frame serial number exceeds the detected frame serial number is no greater than the predetermined amount, then the normal playback mode is established and continued until coincidence is detected between the specified frame serial number and the detected frame number.

Figure 8:
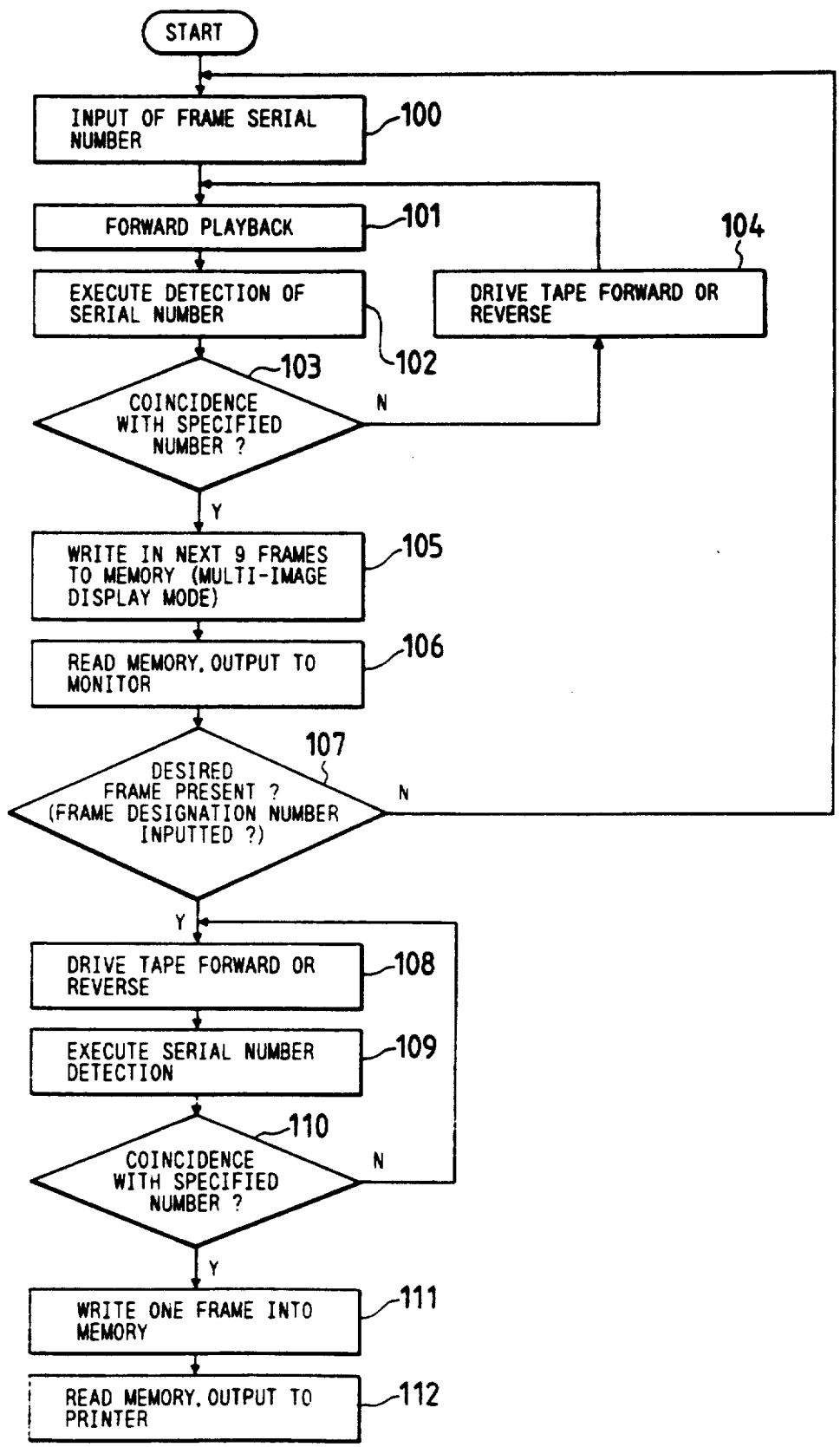
FIG. 8 is a flow chart for describing the operation of the embodiment of FIG. 7.
Figure 9:
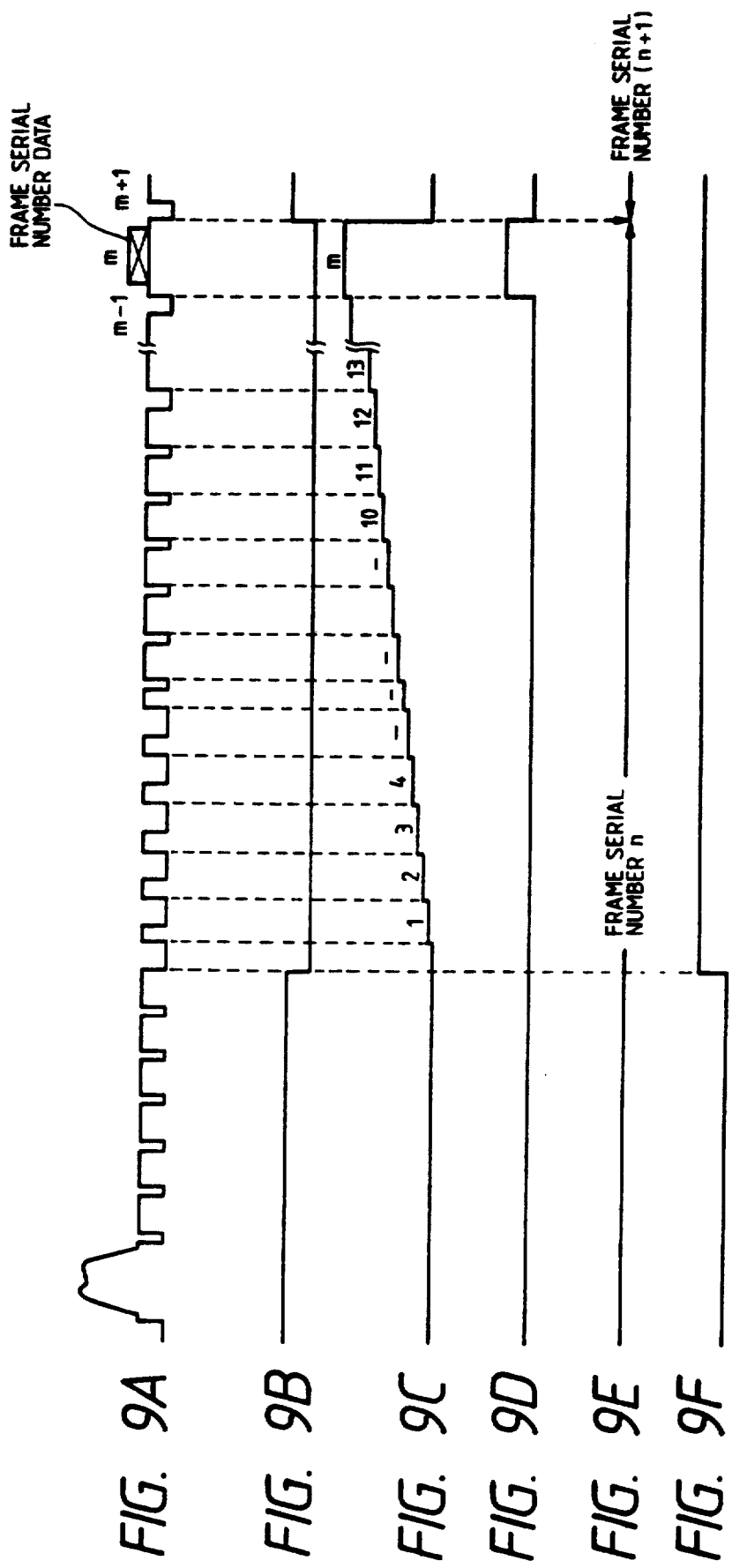
FIG. 9 is a timing diagram for describing the operation of the embodiment of FIG. 2, and for illustrating a position of frame serial number data inserted within a vertical blanking interval of a video signal.

It can thus be understood that the operation of step 103 of FIG. 8, although shown as a single step in order to simplify the diagram, actually consists of successive steps of:

(a) Comparing the detected frame serial number with the specified frame serial number;

(b) if the difference between them is greater than a predetermined amount, executing rapid drive of the magnetic tape in either the forward or reverse direction (in accordance with the sign of that difference), for a time duration determined by the magnitude of the difference (step 104), or, if the difference is no more than the predetermined amount, executing forward playback operation of the VTR;

(d) when coincidence is reached between the detected and specified frame serial numbers during this forward playback operation, (i.e. a YES decision in step 103), proceeding to step 105.

When frame serial number coincidence is detected, the data of an immediately succeeding set of frames (e.g. 9 frames in this example) are written into the frame memory 11 (step 105), a command is then sent by the system controller 6 to halt the capstan motor of the VTR, and the content of the frame memory 11 are read out to obtain a 9-image multi-image display on the video monitor 4. The user then judges whether the desired frame appears in the multi-image display (step 107). If the desired frame is displayed, then the user inputs a frame designation number (e.g. in the range from 1 to 9) which indicates the position of the desired frame in the sequence in which these 9 frames were played back from the magentic tape (step 109). That is to say, the first frame which was written into the frame memory 11 has a frame designation number of 1, while the last frame to be written in will have a frame designation number of 9. The correspondence between the frame designation numbers and the displayed set of frames will be apparent to the user from the positions of the 9 frames in the multi-image display, or the respective frame designation numbers can be displayed on the monitor.

When the user inputs a frame designation number, the system controller 6 combines that number with the frame serial number of the frame which immediately preceded the 9 frames of the multi-image display, to thereby obtain a search frame serial number. More specifically, designating the frame designation number of the desired frame as N, and the specified frame serial number as (M−1), the frames of the multi-image display extend from the frame serial numbers M to (M+9−1), i.e. to (M−8). Thus, the search frame serial number (i.e. the frame serial number of the frame which immediately precedes the desired frame) is obtained as (M+N−1). This is because, as is clear from FIG. 3, when the frame serial number of the $n^{th}$ frame is detected (at the end of the $n^{th}$ frame), write-in of the succeeding frame, i.e. the $(n+1)^{th}$ frame to memory can then be executed.

Capstan motor control is then executed to move the magnetic tape to a position prior to the playback position of the desired frame (step 109), then the VTR is set in the playback mode, with successive frame serial numbers being obtained from the magnetic tape. Thius is continued until coincidence is detected between a playback frame serial number and the search frame serial number (step 110). The succeeding frame of the playback video signal (i.e. the desired frame) is then written into the frame memory 11, in a single-image memory storage mode of operation (step 111). The memory data are thereafer read out in a continuously repetitive manner (step 112), to thereby obtain a video signal represenstating the desired frame from the output of the switch S2, which is supplied to the printer processing circuit 21. Synchronizing signals are inserted into the output signal from the D/A converter circuit 18 (i.e. during the blanking intervals), from the reference synchronizing signal generating circuit 19, by means of periodic actuations of switch S3 by control signals from the controller 6, since switch S1 is set to its "a" position at this time. The desired frame is then printed out by the video printer 21.

If it is found in step 107 that the desired frame does not appear in the multi-image display, then the user notifies the system controller 6 of this by appropriately actuating the frame designation number input section 20a. Operation then returns to step 100, in which the system waits for the user to input a new frame serial number that will be closer to that of the desired frame. The above operations are then repeated.

This embodiment provides similar advantages to the previous embodiment, i.e. enables a desired frame to be searched for, stored as data in a frame memory, and then repetitively read out from the memory to obtain a video signal which is supplied to a video printer apparatus for printing out the desired frame. As for the preceding embodiment, since the data representing the desired frame are obtained during normal playback operation of the VTR (rather than in the "still" playback mode), a high quality of printed image can be obtained.

Figure 10:
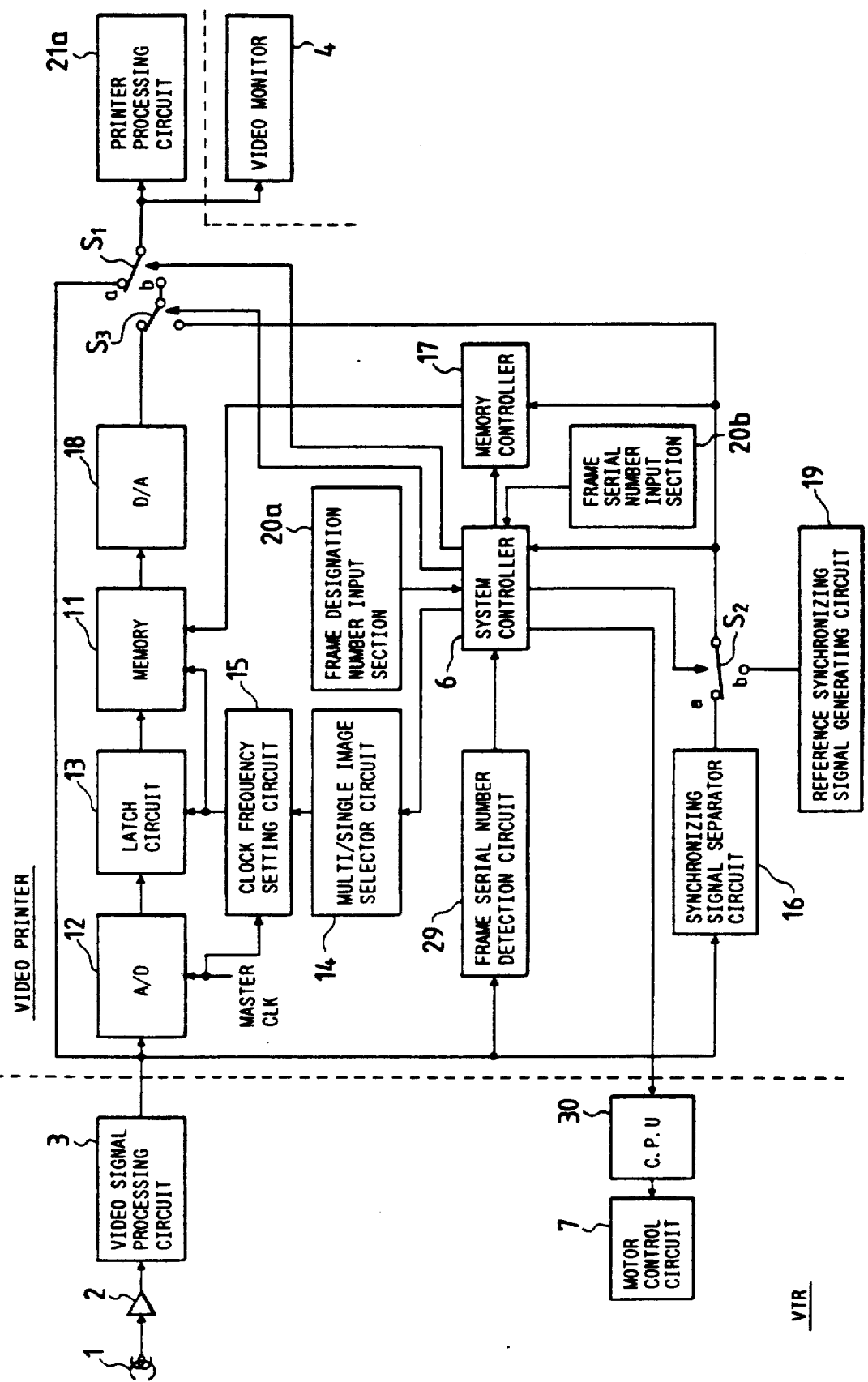
FIG. 10 is a system block diagram of a fourth embodiment of a video signal frame search apparatus according to the present invention, which is combined with a video printer and is a variation of the embodiment of FIG. 7.

FIG. 10 shows a fourth embodiment of a video signal frame search apparatus according to the present invention, which differs from the third embodiment described above in that most of the components of the video signal frame search apparatus are contained within the video printer apparatus rather than combined with a VTR. The frame memory 11 is used both for frame search operations as described above, and as a buffer memory during printing operation. The operation is essentially identical to that of the third embodiment, so that further description will be omitted.

In the above embodiments, "thinning-out" of data in the vertical (display) direction for storage in the frame memory, in a multi-image display storage mode of operation of the frame memory, is executed by performing memory write-in once in every n horizontal synchronizing intervals. However it should be noted that the invention is not limited to such an arrangement, and it would be equally possible to execute this "thinning-out" by suitable address control of the frame memory 11. That is to say, it can be arranged that a change in (vertical) address only occurs once in every n horizontal synchronizing intervals, as illustrated in FIG. 11. This will provide an identical effect to that described above. In this case, the data values of each of of the first through $n^{th}$ horizontal scanning lines will each be successively written into a single set of addresses of the frame memory, then the $(n+1)^{th}$ to $(n+2)^{th}$ horizontal scanning lines will be successively written into another set of addresses, and so on.

Furthermore in the embodiments described above, a set of X successive frames (where X is 9 in the above examples) are written into the frame memory when the specified frame serial number (i.e. specified by the user as being close to the frame serial number of the desired frame) is reached during playback operation of the VTR, and appear on the multi-image display. Designating the frame serial number of the specified frame as $(M-1)$, and the frame designation number of the desired frame as N, these frames will be written successively into the memory as illustrated in FIG. 12A, i.e. the frames with frame serial numbers M to $(M+X-1)$, with the frame serial number of the desired frame being $(M+N)$. However it would be equally possible to utilize a different arrangement for obtaining the multi-image display, whereby the set of X frames extend by a fixed number of frames prior to the specified frame and a fixed number of frames following the specified frame. This can be understood from FIG. 12B, in which the set of X frames that are written into the memory extend from the frame serial number $(M-b)$ to $(M+a)$, i.e. the frames of the multi-image display are arranged in that sequence. In that case, $(a+b)=(X-1)$. This way of deriving the multi-image display can be implemented by arranging that the necessary computations are executed by the system controller 6.

Figure 13:
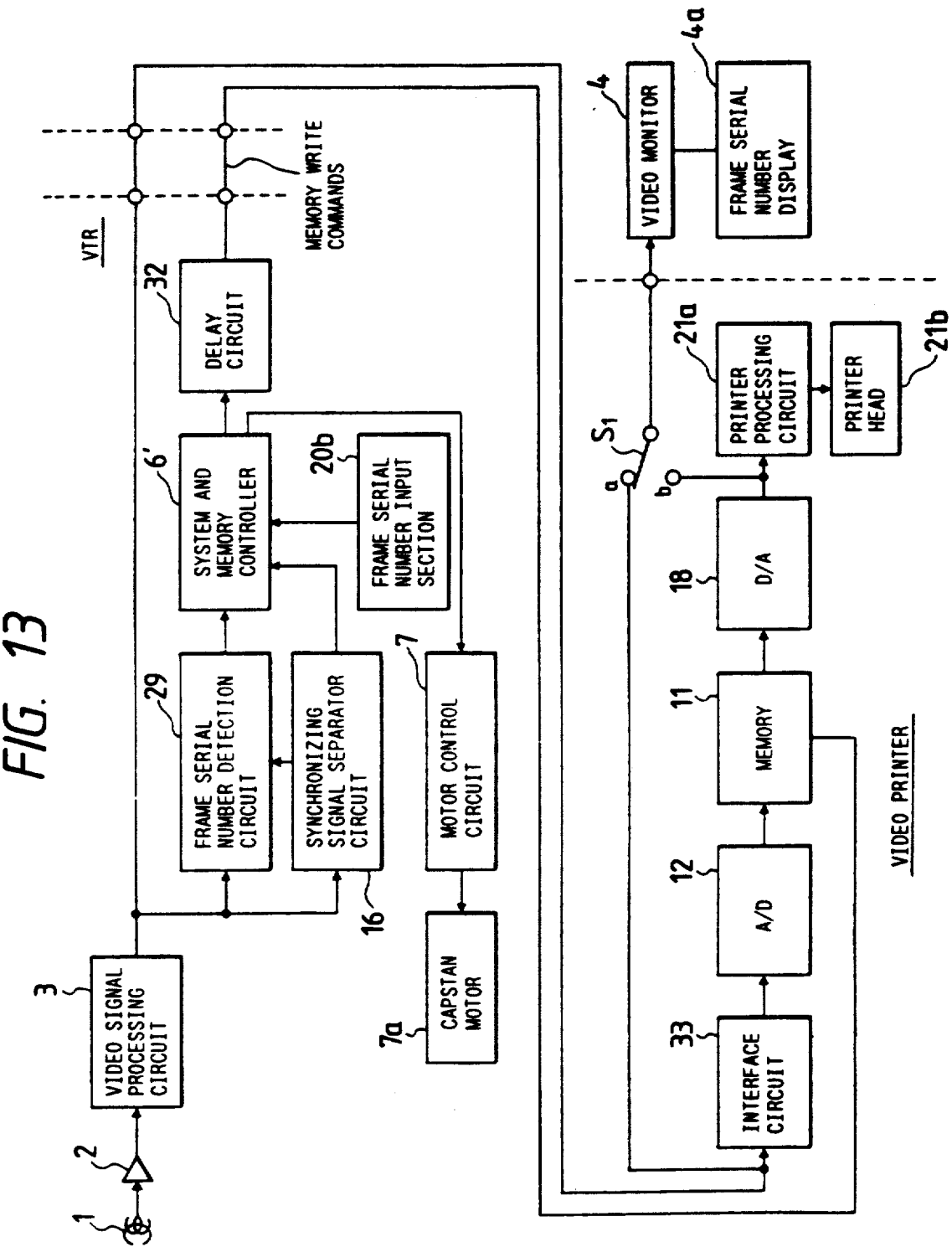
FIG. 13 is a system block diagram of a fifth embodiment of a video signal frame search apparatus according to the present invention, which is combined with a VTR apparatus.

A fifth embodiment of a video signal frame search apparatus according to the present invention will be described referring to the system block diagram of FIG. 13. As for the two preceding embodiments, this embodiment operates with a VTR having a capability for recording frame serial numbers on the magnetic tape, within the vertical blanking intervals as described hereinabove. As for these preceding embodiments, the frame serial numbers of frames of a playback video signal derived by a video head 1 of a VTR and outputted from a video signal processing circuit 3 are detected, and the frame serial numbers then supplied to a system controller 6'. Synchronizing signal components of the playback video signal are extracted by a synchronizing signal separator circuit 16, and supplied to the system controller 6'. A frame serial number input section 20b includes a keyboard (not shown in the drawing) whereby a user can input to the system controller 6' the frame serial number of a desired frame. Control signals and memory write command and timing signals for a frame memory 11 contained in a video printer, are generated by system controller 6'. The write command and timing signals are delayed by a fixed amount by a delay circuit 32.

In the drawing, only the video head 1, preamplifier 2, video signal processing circuit 3, capstan motor control circuit 7 and capstan motor 7 of the VTR are shown. Most of the components of the video signal frame search apparatus of this embodiment are combined with the VTR apparatus as indicated in FIG. 13.

Control signals from the system controller 6' are also supplied to a capstan motor control circuit 7 (and also to other parts of the VTR, not shown in the drawings), for driving a capstan motor 7a of the VTR. These control signals consist of signals for selectively setting the VTR in "fast forward", "rewind", and forward playback operation of the VTR A video printer apparatus includes an interface circuit 33, an A/D converter circuit 12, a frame memory 11, a D/A converter circuit 18, a printer processing circuit 21a and a printer head 21b, and a switch S1. The switch S1 can be manually set to an "a" position in which a playback video signal from the video signal processing circuit 3 of the VTR is transferred to a video monitor 4. The video monitor 4 is configured with circuits (not shown in the drawings) for extracting the frame serial numbers of the video signal supplied thereto, and is provided with a frame serial number display section 4a for displaying these frame serial numbers. The switch S1 can also be set to a "b" position, in which the contents of the frame memory 11 are read out line-by-line at a suitable rate for printing, and transferred through the D/A converter circuit 18 to the printer processing circuit 21a.

Although not shown in the drawing, read and write operations of the memory 11 are controlled by a memory controller within the video printer.

The delay circuit 32 is provided in order to enable the timing of write control signals applied to the frame memory 11 to be accurately synchronized with corresponding video data that are generated from the A/D converter circuit 12.

The operation of this embodiment is as follows. With switch S1 set to its "a" position, the user first operates the control switches (not shown in the drawings) of the VTR to move the magnetic tape to a position immediately prior to that at which read-out of a desired frame can begin. The VTR is then set in a "step-advance" playback mode in which stepping of the magnetic tape by successive frames of the playback video signal can be executed, such that each of successive frames is displayed as a stationary image by the video monitor 4 during a time interval which is of sufficient duration for the user to recognize successive frame serial numbers which are displayed by the frame serial number display section 4a. When the desired frame appears on the video monitor 4 in this condition, the user notes the frame serial number of the desired frame, and then inputs that frame serial number by means of the frame serial number input section 20b.

When this has been done, (assuming that the frame serial number input section 20b includes a latch capability, whereby the most recently inputted frame serial number is continuously supplied to the system controller 6'), the desired frame can thereafter be printed out by the video printer apparatus. Specifically, the system controller 6' first compares the specified frame serial number of the desired frame (been inputted by the frame serial number input section 20b as described above) with the currently detected value of frame serial number (supplied from the frame serial number detection circuit 29). Then, if (specified frame serial number—1)<(detected frame serial number), the difference between these two quantities is converted into data representing an equivalent value of time duration, and the system controller 6' causes the capstan motor control circuit 7 to produce corresponding command signals whereby the capstan motor of the VTR drives the tape in the reverse direction (in the "rewind" mode) to reach a position at which playback of the frame specified by the frame serial number can be executed. If (specified frame serial number)>>(detected frame serial number), then the difference between these two quantities is converted into data representing an equivalent value of time duration, and the system controller 6' causes the capstan motor control circuit 7 to produce corresponding command signals whereby the capstan motor of the VTR drives the tape in the forward direction (e.g. in the "fast-forward" mode) to reach a position at which the normal forward playback mode of the VTR can be entered, and playback of the desired frame can thereafter be executed.

When a condition is reached in which (specified frame serial number—1)>(detected frame serial number), i.e. if the amount by which the specified frame serial number exceeds the detected frame serial number is no greater than a predetermined amount, then the system controller 6' sets the VTR in the normal forward playback mode, and this is continued until frame serial number coincidence is detected.

When frame serial number coincidence is detected, i.e. (specified frame serial number—1)=(detected frame serial number), then the data of the immediately succeeding frame (i.e. the desired frame) are written into the frame memory 11. The data are then repetitively read out from the frame memory 11 at the normal video signal frame rate, such as to obtain a video signal representing the stored frame, from the D/A converter 18. At this time, switch S1 is set to its "b" position, so that the output from D/A converter 18 is displayed by the video monitor 4. The frame stored in the frame memory 11 is thereby displayed, so that the user can confirm that this is actually the desired frame. The frame is then printed out, (i.e. in response to the user actuating a "print" switch of the video printer, not shown in the drawings), by reading out successive lines of the frame stored in the memory 11 at the appropriate rate for operation of the printer head 21b.

It can be understood that with this embodiment, it is not necessary to provide a multi-image display memory storage capability, such as is utilized in the preceding embodiments.

Figure 14:
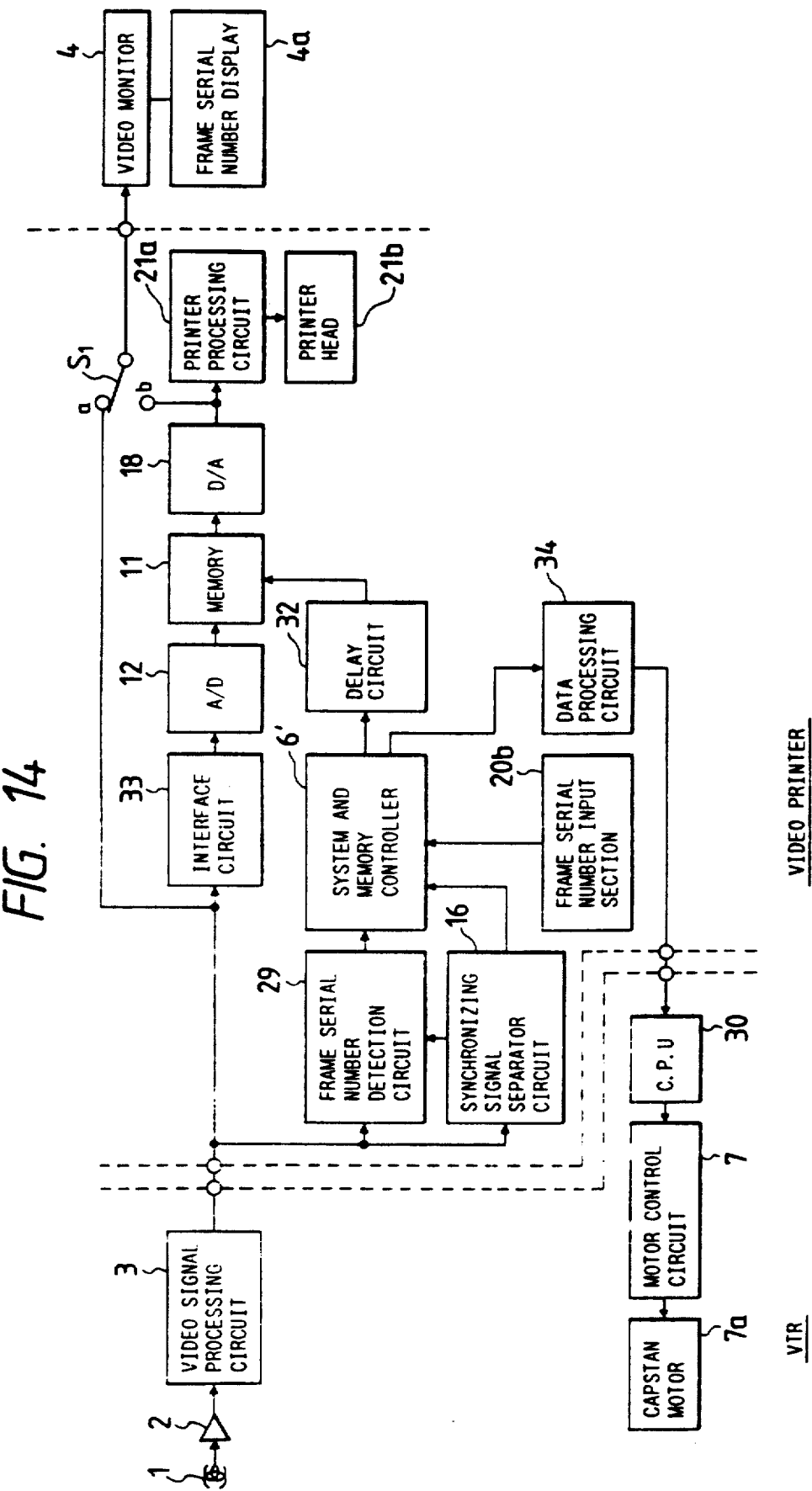
FIG. 14 is a system block diagram of a sixth embodiment of a video signal frame search apparatus according to the present invention, which is combined with a video printer and is a variation of the embodiment of FIG. 7.

In the above embodiment, the main components of the video signal frame search apparatus are contained within the VTR apparatus. FIG. 14 shows another similar embodiment in which these components of the video signal frame search apparatus are contained within the video printer apparatus. In FIG. 14, a data processing circuit 34 serves to convert control signals produced from the system controller 6' into serial form, for transfer to the VTR via a serial data line. In the VTR, a CPU 30 functions as a system controller, for receiving the control signals from the video printer apparatus, and producing corresponding control signals for the VTR, i.e. to selectively set the VTR in the "fast forward", "rewind" or forward playback modes.

The operation of this embodiment is essentially identical to that of the preceding embodiment, so that further description will be omitted.

Figure 15:
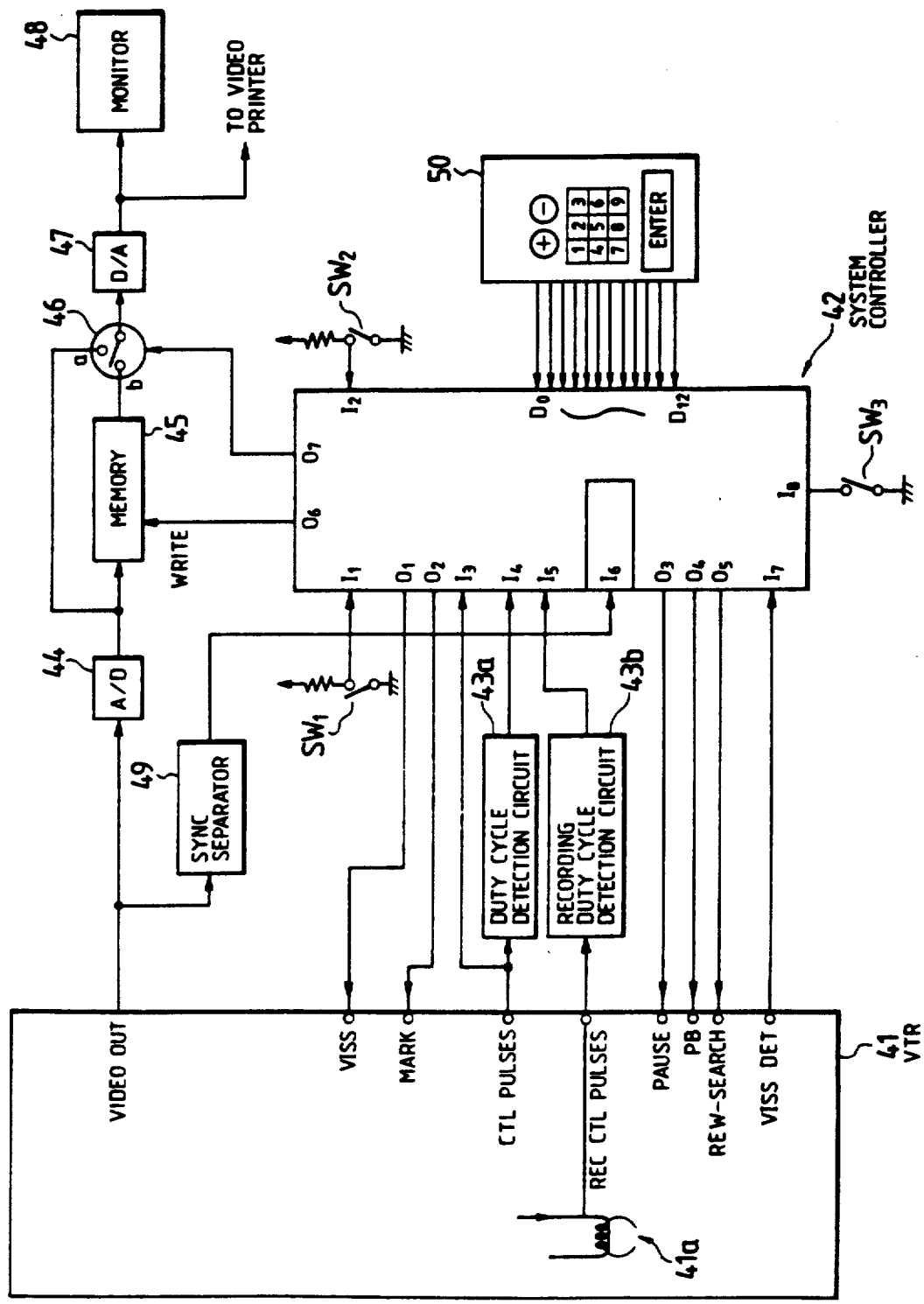
FIG. 15 is a system block diagram of a seventh embodiment of a video signal frame search apparatus, which is combined with a VTR.
Figure 25B:
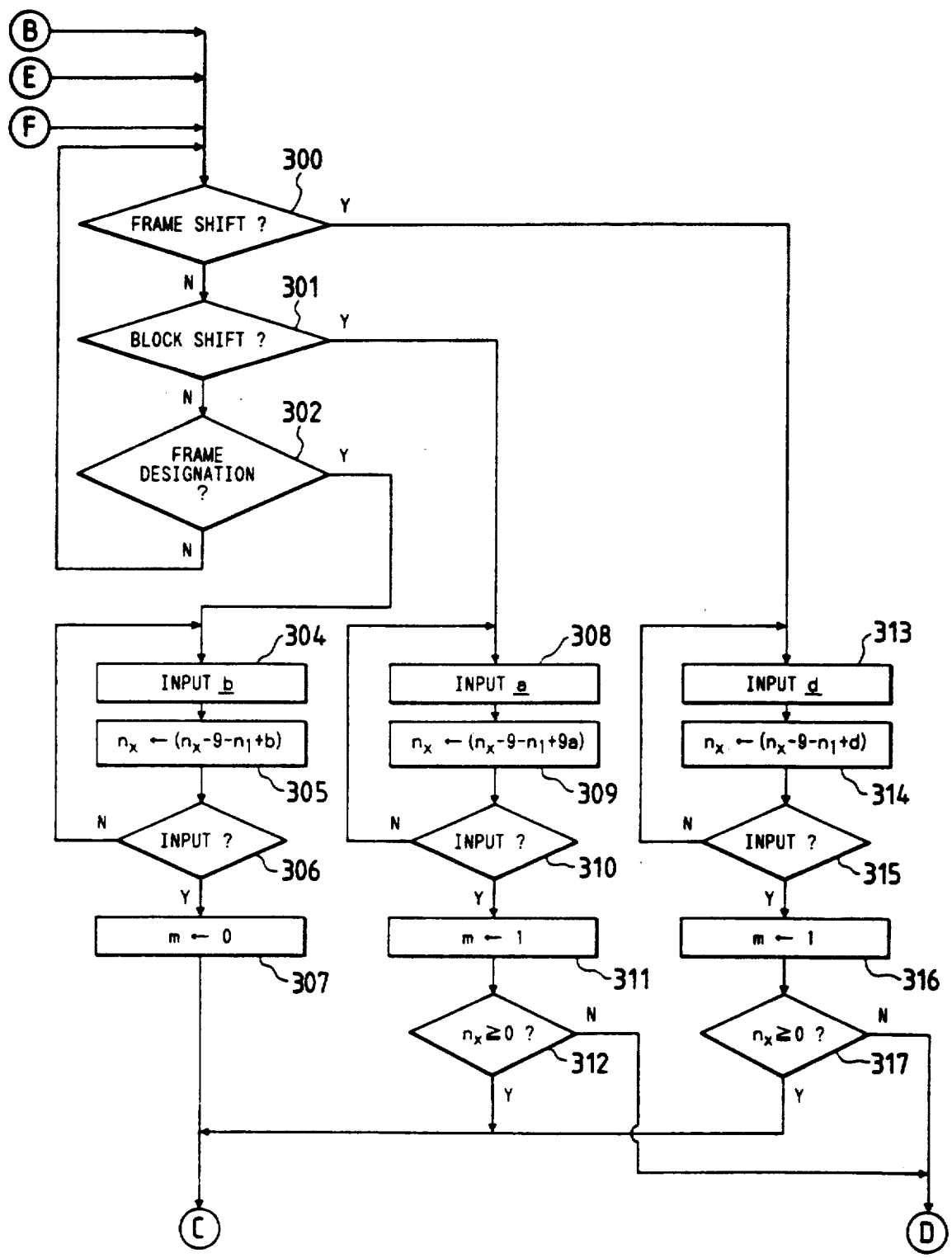
FIGS. 25A, B and C constitute a flow chart for describing the operation of the eighth embodiment.

A seventh embodiment of a video signal frame search apparatus according to the present invention will now be described. This embodiment is based upon a system controller which is connected to control a commercially available domestic-use VTR, by slightly modifying the VTR such as to enable control signals from the controller to function in a similar manner to manually operated switches, i.e. the switches used to set the VTR in the forward playback mode, rewind mode, etc. FIG. 15 is a system block diagram of this embodiment, FIGS. 16 and 17 are diagrams for describing a VISS index signal that is written on a magnetic tape with this embodiment, and FIG. 18 is a flow chart for describing the operations executed by the system controller. FIG. 19 is a conceptual diagram for assistance in describing the operation of the VTR during a frame search operation. The system controller 42 shown in FIG. 15 is a microcomputer, and can for example be implemented as the Mitsubishi Co. "one-chip microcomputer" integrated circuit, serial No. M50747. The VTR 1 can for example be the Victor Co. of Japan model No. HR-S 7000.

The VTR 1 is a helical-scan type of VTR. In addition to writing a video signal on successive tracks of a magnetic tape, a sound signal is recorded on one track which extends along one edge of the magnetic tape, while control pulses are recorded on a control track which extends along the opposite edge of the tape, as illustrated in FIG. 6 described hereinabove. During recording of a video signal, control pulses are recorded along the control track in synchronism with successive vertical scanning intervals of the video signal, with a period which is equal to two successive fields, i.e. equal to the frame period of the video signal. Thus, assuming a field frequency of 60 Hz with 2:1 field interlace, and hence a frame frequency of 30 Hz, the frequency of the control pulses will of course also be 30 Hz. The control pulses are recorded on the magnetic tape by a fixed magnetic head, designated as 41a in FIG. 15. The process of writing the control track during recording operation is illustrated in FIGS. 16A to 16F, in which FIG. 16A shows vertical synchronizing intervals of the video signal that is being recorded, while FIG. 16B shows the corresponding recording current waveform that is applied to a stationary magnetic head that records the control pulses. Upon playback, the playback voltage shown in FIG. 16C is obtained from the control track, i.e. a waveform having a period that is identical to the frame period of the playback signal. A control pulse signal is then derived from this, as shown in FIG. 16D. With a VHS standard VTR, the duty cycle of the control pulses (i.e. for the polarities shown in FIG. 16D, the ratio of an interval in which the control pulse signal is at the H level to the pulse period) is established as being at least 50%. However the actual value of the duty cycle is not used to convey information, i.e. only the time points of the leading edges of the pulses shown in FIG. 16D are utilized, for precise servo control of the phase of rotation of the capstan motor of the VTR. Thus since only these leading edges are utilized, it is possible to vary the timings of the falling edges of the control pulses without affecting the servo control operation. In the prior art, a method of recording an index signal (or "cue" signal) is used, whereby the entire width of the magnetic tape is used for writing the cue signal. By detecting this cue signal, it is possible to halt the VTR at a specific point during movement of the magnetic tape. However in recent years a new method of writing index signals on the magnetic tape has come into use, which utilizes the aforementioned duty cycle of the control pulses. This index signal (called a VISS signal) is written by re-recording certain control pulses during playback operation (without modifying the timings of the leading edges of these control pulses) such as to modify the duty cycle of these control pulses, and thereby define a region of the control track in which the duty cycle of the control pulses has predetermined values. Specifically, a control pulse period in which the duty cycle is 60±5% is defined as representing a logic "0" bit, while a control pulse period in which the duty cycle is 27.5±2.5% is defined as representing a logic "1" bit. A VISS index signal is defined as a train of 61±3 "1" state bits which is preceded by and followed by at least one "0" state bit, as illustrated in FIG. 17A. Such a VISS index signal is used in the prior art for indicating a "header" position on the magnetic tape, i.e. the start of a particular section of recorded material on the tape. With the present invention, an exact fixed number of "1" state bits is recorded as the index signal, e.g. exactly 61 bits, to enable precise positioning of the magnetic tape in units of frames. It would also be possible to utilize a smaller number of "1" state bits for this purpose, with the present invention.

In the following, it will be assumed that an index position on the magnetic tape is defined at the start of the VISS signal, i.e. when a transition from a control pulse duty cycle corresponding to a "0" bit to a duty cycle corresponding to a "1" bit occurs during (forward) playback operation. Once a VISS index signal has been written on the control track, the magnetic tape can thereafter be returned to the index position, and hence to the precise frame that begins at the index position, and movement of the tape then halted when the aforementioned "1" to "0" logic level transition (i.e. the duty cycle transition) of the index position is detected.

However when the VTR is operated in the rapid-rewind mode (generally simply referred to as the rewind mode, or "rewind-search" mode, and indicated in FIG. 15 as the REW-SEARCH mode), in which the magnetic tape is moved in reverse at a very high speed, it becomes impossible to reliably detect the duty cycle transition which marks the index position, if standard circuit elements are utilized. To overcome this problem, a signal which is available from commercially available models of VTR such as that mentioned above, called a VISS-DET signal, is utilized. This signal is derived by a specialized integrated circuit within the VTR, during rewind operation, by counting successive ones of the "1" state bits (i.e. 27.5% duty cycle periods) of the VISS signal during rewind operation, up to a total of 32 bits, i.e. with counting beginning from the rightmost "1" bit shown in FIG. 17A. When the count reaches 32, the VISS-DET signal is outputted from the VTR 41 as a pulse, which is supplied to the system controller 42 of the apparatus of the present invention, as described hereinafter. The system controller 42 then begins counting successive control pulses, up to a total of 29 pulses. The index position at the start of the VISS index signal is thereby determined when that count value of 29 is reached.

Although the control pulses are written in synchronism with the vertical synchronizing intervals the video signal during recording as described above, the timings at which the control pulses are detected from the output signal of the magnetic head which reads the control track may not precisely coincide with the the starting time points of respective frames, i.e. may differ by the duration of one field. For that reason, although numbers of successive frames of the playback video signal can be counted by counting the control pulses, it is preferable to begin counting actual frame pulses (derived from the vertical synchronizing signal component of the playback video signal) beginning from detection of an index position, when one or more frames are to be stored in a memory after a certain count value is attained, as will be made clear in the following embodiments.

In FIG. 15, the designations VISS, MARK, PAUSE, PB and REW-SEARCH indicate respective operating switches of the VTR, which are illustrated in FIG. 17B. In order to enable control signals from the system controller 42 to perform these switch functions, a simple interface circuit such as that shown in FIG. 17B is utilized, whereby a simple electronic switch element such as a transistor is connected across each of these switches of the VTR, while a corresponding control signal from the system controller 42 is applied to a control input of each electronic switch element. Such an interface circuit is applicable for example to the aforementioned Victor Co. VTR model. When the VISS and MARK switches are momentarily closed simultaneously during playback operation, a VISS index signal as described above is written onto the magnetic tape. When the REW-SEARCH switch is closed, the VTR 41 is set in the rewind mode.

Thus, during frame search operation, the playback, pause, and rewind modes, and writing of a VISS index signal, are all controlled by control signals from the system controller 42. The system controller 42 is provided with a set of output ports designated as O1, O2, . . . O5, and a set of input ports designated as I1, I2, . . . I7. During frame search operation, control signals are produced from these output ports, while control pulses (obtained from the control track of the magnetic tape) from the VTR 41 are applied directly to an input port I3 and also via a duty cycle detection circuit 43a to an input port I4 of the system controller 42.

The control pulse (CTL pulses) signal, and Rec CTL pulse signal are readily accessible within the VTR circuits. The CTL pulse signal consists of control pulses from the control track, generated during forward playback or rewind operation. The Rec CTL pulse signal consists of control pulses which appear at the control head of the VTR (i.e. which records control pulses on the control track) while rewriting of control pulse duty cycle to form a VISS index signal as described above is in progress.

The playback video signal from the VTR 41 is transferred through an A/D converter circuit 44, to be converted to digital data values which are written into a frame memory 45. When a switch 46 is set to the "b" position thereof, the contents of the frame memory 45 are read out, and transferred to a D/A converter circuit 47, to reconstitute an analog video signal. This is applied to a video monitor 48, and also to a video printer apparatus (not shown in the drawing). When the switch 46 is set to its "" position, the output data values from the A/D converter circuit 44 are transferred directly to the D/A converter circuit 47, so that the analog video signal is continuously supplied to the video monitor 48. The "write" operation timings of the frame memory 45 and the timings of changeover operations by the switch 46 are controlled by control signals from the output ports O6 and O7 of the system controller 42. The output video signal from the VTR 41 is also supplied to a synchronizing separator 49, which detects the synchronizing components of the video signal, and supplies frame pulses (i.e. synchronized with one in every two vertical blanking intervals of the video signal) to an internal counter of the system controller 42. Switches SW1 and SW2 are operable by the user, for applying input signals to the system controller 42 for controlling the frame search operation, as described in detail hereinafter. A keyboard 50 is operable by the user for inputting numeric values to the system controller 42.

The recording duty cycle detection circuit 43b is connected to receive the aforementioned Rec CTL pulse signal control head during recording of control pulses, and produces an output signal at the precise instant when an index position is defined on the magnetic tape, during recording of a VISS index signal. Specifically, (assuming that the index position is the duty cycle transition described above at the start of a VISS index signal) based on the timings of recording current waveforms that are applied to the magnetic head 41a during superimposition of the VISS index signal on the control pulses recorded on the control track, the recording duty cycle detection circuit 43b detects the point at which the duty cycle of the control pulses is changed from 60% (representing "0" state bits) to 27.5% (representing "1" state bits), and supplies a corresponding detection signal to the system controller 42.

In addition, when a VISS index signal is reached during forward playback operation of the VTR, the duty cycle detection circuit 43a detects a change from the 27.5% to the 60% duty cycle of successive control pulse periods, and produces a corresponding detection signal which is supplied to the system controller 42. The system controller 42 thereby detects the index position that is defined by the VISS index signal, i.e. the aforementioned transition between "0" and "1" state bits, during forward playback operation of the VTR. During rewind operation of the VTR 41 the index position is detected based on the VISS-DET index signal as described hereinabove.

The operation of this embodiment will first be described based on the operation of the system controller 42, referring to the flow chart of FIG. 18. The corresponding movements of the magnetic tape and the timings of manual switch actuations are conceptually illustrated in FIG. 19. Firstly, (assuming that the magnetic tape has been initially positioned such that the desired frame will appear during forward playback) when the apparatus is set in the search mode of operation by actuating a mode switch SW3, the VTR 41 is set in the forward playback mode (step 100). In this condition, the switch 46 is held set at its "a" position, to by-pass the frame memory 45, so that the playback video signal is displayed by the video monitor 48. 2 to 3 seconds are then allowed to elapse, to ensure that stable playback operation has been reached. Thereafter the user observes the display of the video monitor 48, and upon becoming aware that a point in the playback has been reached which is slightly before the position on the magnetic tape of a desired frame that is to be printed by the video printer apparatus, the user actuates the switch SW1. The system controller 42 responds to the resultant input signal from SW1 by producing control signals whereby a VISS index signal is recorded on the magnetic tape, to define an index position as described above (steps 101, 102). At the precise instant when the index position is recorded, the aforementioned detection signal from the recording duty cycle detection circuit 43b is supplied to the system controller 42, which responds by initiating counting of of frame pulses (supplied from the synchronizing separator 49) (step 103).

Subsequently, as playback proceeds, when the user observes that a position very close to the desired frame has been reached, switch SW2 is actuated (step 104). The system controller 42 responds to this actuation by issuing control signals whereby the frame of the playback signal that occurs immediately following the switch actuation is written into the frame memory 45 (step 105) The system controller 42 then sets the VTR 41 in the "pause" mode, to halt the magnetic tape, counting of the frame pulses is also halted, and the number of frame pulses that has been counted up to that point is stored as a count value A. The system controller 42 then sets the switch 46 to its "b" position, and begins repetitive read-out of the contents of the frame memory 45, to produce a video signal that is transferred to the video monitor 48 and thus display the stored frame as a static picture (step 106).

In general, the frame which is now displayed by the video monitor 48 will not be the desired frame, but will be close to that frame. The user then estimates the number of frames by which the displayed frame precedes or succeeds the desired frame, and inputs (using the keyboard 50) that number of frames as a correction frame number B.

If for example the user judges that the frame that is thus displayed by the video monitor 48 is recorded on the magnetic tape at a position which occurs approximately 3 frames after the desired frame, then the user would input a correction frame number of +3. On the other hand, if it is estimated that the displayed frame is recorded 2 frames before the desired frame, then the user would input a correction frame number of −2. The aforementioned count value A and the correction frame number B are then added together, and the sum is used as a search count value C, i.e. C=(A+B) (step 108).

The system controller 42 then sets the VTR 41 in the rewind mode (step 109), which is continued until the index position defined by the VISS index signal is reached, and the VTR 41 is then set in the pause mode, and thereafter halts (i.e. when a position on the magnetic tape has been reached which is slightly before the start of the recorded VISS index signal) (step 110). The system controller 42 now sets the VTR 41 in the forward playback mode (step 111), and commences counting of the frame pulses when it is detected (based on the output signal from the duty cycle detection circuit 43a) (step 112) that the index position has been reached (step 113). When the frame pulse count value reaches the search count value C (step 114), then the frame which immediately follows the point at which that count value is reached is written into the frame memory 45, and the VTR 41 is then set in the pause mode.

The system controller 42 then sets the switch 46 to its "b" position, and the frame that has been stored in the frame memory 45 is read out and transferred through the D/A converter circuit 47 to the video monitor 48, to be displayed as a static image (step 116). If the user judges that the displayed image corresponds to the desired frame (117), then further search operation is terminated, and the output video signal from the D/A converter circuit 47 representing the desired frame is transferred to the video printer apparatus, to be printed out.

If on the other hand, the user finds that the desired frame is not displayed at this time, then he notifies the system controller 42 of this fact, e.g. by actuating a predetermined key of the keyboard 50. The operation of the system controller 42 then returns to step 107, and the search operation is again repeated.

With the embodiment described above, the frame pulses that are produced from the synchronizing separator 49 are counted, beginning from the point at which the index position of the VISS index signal is detected during forward playback operation. However it would also be possible to configure the apparatus such that the control pulses that supplied from the duty cycle detection circuit 43a are counted, rather than the frame pulses.

It should also be noted that although in the above description the system controller 42 and the frame memory 45 etc,, constituting the video signal frame search apparatus,, are shown as a set of components which are external to the VTR 41, it would of course be equally possible to build these components into the VTR 41. Alternatively, it would be possible to build these components of the video signal frame search apparatus into the video printer apparatus (not shown in the drawings).

It would also be possible to implement the video signal frame search apparatus as an independent adaptor unit, which can be connected between the VTR 41 and the video printer apparatus.

It can be understood from the above that this embodiment can be directly applied to a VTR such as a currently available domestic-use VTR, with only very slight modifications to the VTR being required, if the VTR has a capability for accurately defining index positions, e.g. by recording VISS index signals on the magnetic tape.

As for the preceding embodiments, since video data for use in printing out a desired frame are obtained with the VTR operating in the normal forward playback mode, a high quality of printed image can be obtained. In addition, the embodiment enables a desired frame to be searched for in a very simple manner, while the circuit configuration can also be simple. This simplicity is based on the recording of an index signal at an arbitrary position on the magnetic tape which precedes the position of a desired frame, and thereafter using count values obtained using that index position as a reference point, to enable the user to precisely designate the position of the desired frame.

From the above, it can be understood that the operations executed by this embodiment under the control of the system controller 42 can be summarized as:

1. Set the VTR 41 in the forward playback mode.
2. When SW1 is actuated, write an index signal on the magnetic tape, to define an index position, and start counting of frame pulses.
3. When SW2 is actuated, write the succeeding frame of the playback video signal into the frame memory 45, then set the VTR in pause mode, halt counting of frame pulses to obtain a count value (A), and read out the memory contents to display that frame on the video monitor 48.
4. When a correction frame number (B) is inputted by the user, compute a search count value (C) as (A+B).
5. Set the system controller 42 into rewind operation, and continue until the index position is detected.
6. Halt after the index position has been passed, then set the VTR 41 in the forward playback mode, and when the index position is detected, start counting of frame pulses.
7. When the frame search count (C) is reached, start write-in of the succeeding frame of the playback video signal into the frame memory 45.
8. Set the VTR 41 in pause mode, and read out and display the frame memory 45 contents.

Another embodiment of a video signal frame search apparatus according to the present invention will be described, referring to FIG. 20, which can be coupled to a domestic-use helical-scan VTR having a VISS index signal recording capability, by utilizing a simple interface circuit whereby a system controller 52 can control the VTR during a frame search operation as for the preceding embodiment.

In this embodiment, one of two low-pass filters (LPFs) 54a and 54b is selected by a switch 55 for transferring the playback video signal to the A/D converter circuit 56, in accordance with whether the video signal is to be written into the frame memory 57 after analog/digital conversion, or is to by-pass the frame memory 57 and transferred through the D/A converter circuit 59 to the video monitor 60. A switch 58, controlled by the system controller 52, selects transfer of either video data read out from the frame memory 57 or the output from the A/D converter circuit 56 to the D/A converter circuit 59.

A memory control circuit 61 functions to control selection of addresses of the frame memory 57 during read and write operations, for producing a multi-image display or a single-image display on a video monitor 60. It will be assumed that a multi-image display formed as a 3×3 picture array is produced, i.e. having 9 images. During a memory write operation, a switch 67a is controlled by the system controller 52 such that the a memory control circuit 61 for the frame memory 57 receives frame pulses from a vertical synchronizing signal detection circuit 62, derived based on the vertical synchronizing signals of the playback video signal. The memory control circuit 66 also receives a clock signal CK that is produced from a PLL (phase locked loop) 64, generated during memory write-in operation by utilizing the horizontal synchronizing pulses of the playback video signal (derived by a horizontal synchronizing signal detection circuit 63) as a reference input of the PLL, and also receives a "horizontal pulse" signal Hd produced from the PLL 64, which is phase and frequency-locked to this reference input. Assuming that a color composite video signal is produced during playback, the frequency of the clock signal CK from the PLL 64 is 4f, where f is the chrominance subcarrier frequency. Although not shown in the drawing, the clock CK signal is also supplied to the A/D converter circuit 56, i.e. as a "master clock" to determine the sampling frequency of A/D conversion. In this way, generation of successive addresses by the memory control circuit 61 during memory write-in are synchronized with outputs of digital data values from the A/D converter circuit 56. In this way, successive addresses of regions in which respective frames (for a multi-image display) are stored are generated in synchronism with the frame pulses, while successive "horizontal" addresses (of picture element data values) are generated in synchronism with the clock signal CK. Generation of a series of addresses for the picture elements of a scanning line is initiated in synchronism with a pulse of the signal Hd.

During read-out from the frame memory 57, the switch 67b is changed over by a control signal from the system controller 52, so that a synthesized horizontal synchronizing signal produced from a timing signal generating circuit 65 (based on a quartz crystal oscillator) is supplied as a reference input to the PLL 64. Thus, the frequencies of the Hd and CK signals are determined by the output signal frequency from the timing signal generating circuit 65. The switch 67a is also changed over so that a signal having a frequency that is 1/N times that of the Hd signal is supplied from a 1/N frequency divider circuit 66 to the memory control circuit 61, in place of the frame pulses. The clock signal CK in this case is also applied as the master clock signal of the D/A converter circuit 59.

The system controller 52 also supplies control signals to the memory control circuit 61 and the switch 55 for executing changeover between single-picture display operation and multi-image display operation, and signals for controlling the switch 58 for changeover between supplying the playback video signal from the VTR 51 to the video monitor 60 and supplying the output data read out from the frame memory 57 to the video monitor 60.

The frame pulses from the vertical synchronizing signal detection circuit 62 are supplied to the input port 16 of the system controller 52 to be counted, as in the case of the preceding embodiment.

FIGS. 21A to D, 22 and 23 illustrate memory read and write operations of the frame memory 57, while FIG. 24 shows a multi-image display formed of 9 images, designated as F1 to F9, which correspond to respective frames. Memory addresses for the frame memory 57 are sequentially generated by the memory control circuit 61 during both read and write operations, based on counting pulses of the signal Hd, and synchronized with the clock signal CK. One frame consists of two successive fields of the playback video signal from the VTR 51, with these fields being successively written into or read out from the frame memory 57. The memory read and write operations are as follows:

1. Write and Read Operations for Single Picture Display

In this case, the frequency of the clock signal CK is set as 4f, where f is as defined hereinabove. Identical operation timing values are used during both memory read and memory write operations. Addresses for respective picture elements are successively generated from the memory control circuit 61 in synchronism with the CK write clock signal, during each of successive horizontal scanning lines of the playback video signal (synchronized with the Hd signal).

2. Write and Read Operations for Multi-Picture Display

Referring to FIGS. 21A to D and 22, the write clock CK frequency is made (4/3) f, i.e. the frequency of the clock signal which determines the rate at which successive data samples are written into the frame memory 57), while one in every three horizontal scanning lines of the video signal is selected. The sampling frequency of the A/D converter circuit 56 is held at 4f. The selection of horizontal scanning lines is controlled by a write timing signal, shown in FIG. 21D, which is generated as one pulse for every three pulses of the Hd signal. In this way, the playback video signal data are written into successive addresses of the frame memory 57 with "thinning-out" by a factor of ⅓ in both the horizontal and vertical display directions.

The sequence in which the data are written into the frame memory 57 is illustrated in FIG. 22. As shown, when writing-in of a set of 9 successive frames of the playback video signal begins, then data for the first field of a first frame are written into a region $a_1$ (within a section of the memory that is reserved for first fields of respective frames) of the frame memory 57, then the second field of the first frame are written into a memory region $b_1$ (within a section of the memory that is reserved for the second fields of respective frames). Next, the first field of the second frame are written into a region $a_2$, then the second field of the second frame are written into a region $b_2$, and so on for the remaining frames.

In this way, the memory is divided into a first region in which all of the first fields of the frames are stored, and a second region in which all of the second fields of the frames are stored.

The above has been described for the case of 9-image (i.e. 3×3) multi-image display operation. However in general, for the case of a m×n multi-image display, where m and n are arbitrary integers, similar effects can be achieved by making the frequency of the write clock signal CK equal to the (1/m) times the sampling frequency of the A/D converter which supplies successive data values to be written in the memory, and by selecting one in every n horizontal scanning lines of the data to be written in at that write clock frequency.

Read-out of 9-image multi-image display data from the frame memory 57 is executed as follows. The frequency of the read clock (i.e. CK) is set to 4f. The sequence of memory read-out is illustrated in FIG. 23. The data are read out in the sequence: first line of region $a_1$, first line of region $a_2$, first line of region $a_3$, second line of region $a_1$, second line of region $a_2$, second line of region $a_2$, second line of region $a_1$ second line of region $a_2$, second line of region $a_3$, . . . , first line of region $a_4$, first line of region $a_5$, . . . final line of region $B_9$. In this way, the multi-image display format shown in FIG. 24 is produced by the video monitor 60.

The operation of this embodiment will be described referring to the flow chart for the system controller 52, shown in FIGS. 25A, 25B and 25C, and FIGS. 26A and 26B which are conceptual diagrams for describing the operations of the VTR during a frame search.

Before the search mode is initiated, by actuating a switch S3 which is coupled to the system controller, the user executes manual actuations of the control switches of the VTR 51 is necessary, to move the magnetic tape to a playback position which is slightly before that of a desired frame that is to be printed by the video printer apparatus (not shown in the drawings). When the search mode is entered, the VTR 51 is set in the forward playback mode, with switch 58 directly transferring the playback video signal to be displayed by the monitor 60. When it is observed from the display that a point close to the desired frame has been reached, the user actuates the switch S1 (steps 100 to 103 in the flow chart). The frame which occurs immediately following the point at which the switch is actuated is then written into the frame memory 57 (as a single picture), and the system controller 52 then sets the VTR 51 in the pause condition. The frame stored in the frame memory 57 is then read out and displayed on the video monitor 60 (steps 104a to 106)

If the user judges that the frame that is now displayed is sufficiently close to the desired frame, then he actuates switch S2 (i.e. thereby designating that the search operation is to be continued) and the system controller 52 responds by issuing control signals whereby the VTR 51 rewinds the magnetic tape by a predetermined amount, then pauses, then begins forward playback operation. After this playback has continued for 2 to 3 seconds (so that servo control of the VTR capstan motor has stabilized, so that accurate frame pulses can be obtained), control signals from the system controller 52 cause a VISS index signal to be written on the magnetic tape as described hereinabove, to define an index position (steps 200 to 205a).

When the system controller 52 detects that the transition (i.e. a change between duty cycle values of the control pulses which corresponding to "0" and "1" state bits respectively) marking the index position has been recorded on the magnetic tape, as indicated by the output signal from the recording duty cycle detection circuit 53b as described for the previous embodiment, counting of frame pulses by the system controller 52 is initiated. After a fixed number of frame pulses have been counted (and without halting the count), video signal data of 9 successive frames begin to be written into the frame memory 57 (steps 206a to 207). When the frame pulse count value reaches another predetermined value, the write-in operation is halted, and thereafter the VTR 51 is set in the pause mode, and the contents of the frame memory 57 are read out and transferred to the video monitor 60 to produce a multi-image display of 9 pictures. Counting of frame pulses is then halted, and the total count value (designated as $\{n_x\}$) is stored (steps 208 to 211).

The user then observes the multi-image display, to decide whether the desired frame is among the displayed frames (steps 300 to 302). At this point, there are three possibilities, i.e.

(a) the desired frame appears on the multi-image display, (b) the desired frame does not appear on the multi-image display, but the user judges that the desired frame is within a few frames from the start or end of the displayed block of 9 frames, or (c) the desired frame does not appear on the multi-image display, the user judges that the desired frame is within several tens of frames from the start or end of the displayed block of 9 frames.

In the case of result (a) above, the user inputs the number 3 from the keyboard, and the system controller 52 responds to this input by proceeding with processing to find and output the desired frame. In the case of result (b), the user inputs the number 2 from the keyboard, and the system controller 52 responds to this input by executing a frame shift operation, as described hereinafter. In the case of result (c), the user inputs the number 1 from the keyboard, and the system controller 52 responds to this input by executing a block shift operation, described hereinafter.

In case (a) above, after inputting the number 3, the user then inputs a frame designation number which specifies the position of the desired frame in the multi-image display (e.g. actuates a corresponding one of the keyboard keys, from one to nine, in accordance with the multi-image display format of FIG. 10). This number, which will be referred to as b, is then combined with the count value $\{n_x\}$, to obtain a new value of search frame number $\{n_x\}$, and the flag m is set to the "0" state. (steps 304 to 307). Flag m is the control flag whereby a single frame mode (m=0) or multi-frame mode (m=1) is selected at write-in operation.

A series of steps 400 to 409 is then executed. The VTR 51 is first set in a rewind mode, until the index position defined by the VISS index signal is detected, whereupon the VTR 51 is set in the pause state. Forward playback operation of the VTR is then started, and when the index position is again detected, counting of frame pulses is started. When the count reaches the value $\{n_x\}$, if the m flag is in the "0" state, then the frame which immediately follows that point is written into the frame memory 57. The frame stored in the frame memory 57 (i.e. the desired frame) is then read out (steps 400 to 409). Since the output video signal from the D/A converter circuit 59 is supplied to the video printer apparatus as well as to the video monitor 60, the desired frame can now be printed out, e.g. by manual activation of the video printer apparatus. This completes the frame search operation.

If it is found in step 211 that the desired frame does not appear on the multi-image display, then the user can specify either a block shift operation or a frame shift operation to be executed, as described above, where "block" designates a set of nine consecutive frames. If the user specifies a frame shift operation, he then inputs (as a positive or negative number which is designated in the following as d) a number and direction of frames by which the magnetic tape is to be moved by this frame shift operation (step 313), and a new value for the frame search value $\{n_x\}$ is then computed based on this input number (step 314). A decision is then made as to the sign of the new value of $\{n_x\}$, and the flag m is set to "1" (300, 316, 317). Operation then proceeds to a set of steps 500a to 510, if $\{n_x\}<0$, and to steps 400 to 409a if $\{n_x\}>0$.

If a block shift is specified, the user then inputs a positive or negative integer (designated in the following as a) representing the number of blocks which are to be moved, and the direction of the shift (step 308). A new frame pulse count value $\{n_x\}$ is computed by the system controller 52, based on the inputted number of blocks, the flag m is set to "1". A decision is then made as to the sign of the new value of $\{n_x\}$, and the flag m is set to "1" (301, 308 to 312). Operation then proceeds to steps 500a to 510, if $\{n_x\}<0$, and to steps 400 to 409a if $\{n_x\}>0$.

After step 312 or 317, the VTR 51 is set in the rewind mode (step 400 or 500a), which is maintained until the index position of the VISS index signal is detected. The VTR 51 operation is then set in the pause state, then in the forward playback mode, and when the index position is again detected, counting of frame pulses is started. When the new count value $\{n_x\}$ is reached, the succeeding nine frames are written into the frame memory 57 (step 406 or 506), and the VTR 51 set in the pause mode. In step 406, the writing in of 9 frames (rather than a single frame) is executed if, as in this case, the flag m is set to "1". The memory is then read out, to produce a multi-image display on the video monitor 60 (steps 400 to 409a, if $\{n_x\} > 0$, or 500a to 510 if $\{n_x\} < 0$). Operation then returns to the judgement steps 300 to 302, i.e. the user again judges whether or not the desired frame appears on the display.

It can be understood from the above that, if the m flag is in the "0" state during the operations described above, then at step 409, the system is in a condition in which a single frame (i.e. the desired frame) is being displayed by the video monitor 60 and can be printed out by the video printer apparatus. If however the m flag is in the "1" state, then at step 409, the system is in a condition in which a set of 9 frames are being displayed, to enable the user to specify whether the desired frame is among these and the position of the desired frame within that set, or if not, the required number frames or blocks of frames by which the magnetic tape must be shifted (and the direction of that shift) in order to display the desired frame.

The above process will be described from a different aspect, based on the movements of the magnetic tape, referring to FIGS. 26A, 26B. With this embodiment, measurement of amounts of magnetic tape movement is based upon counting numbers of control pulses and frame pulses. To avoid confusion, a value which is a count of control pulses will be shown within brackets ( ), and a value which is a count of frame pulses will be shown within braces { }. The process can be divided into four basic sets of operations, as follows:

Operating Sequence 1. (Steps 100 to 106 of the flow chart)

Figure 26A:
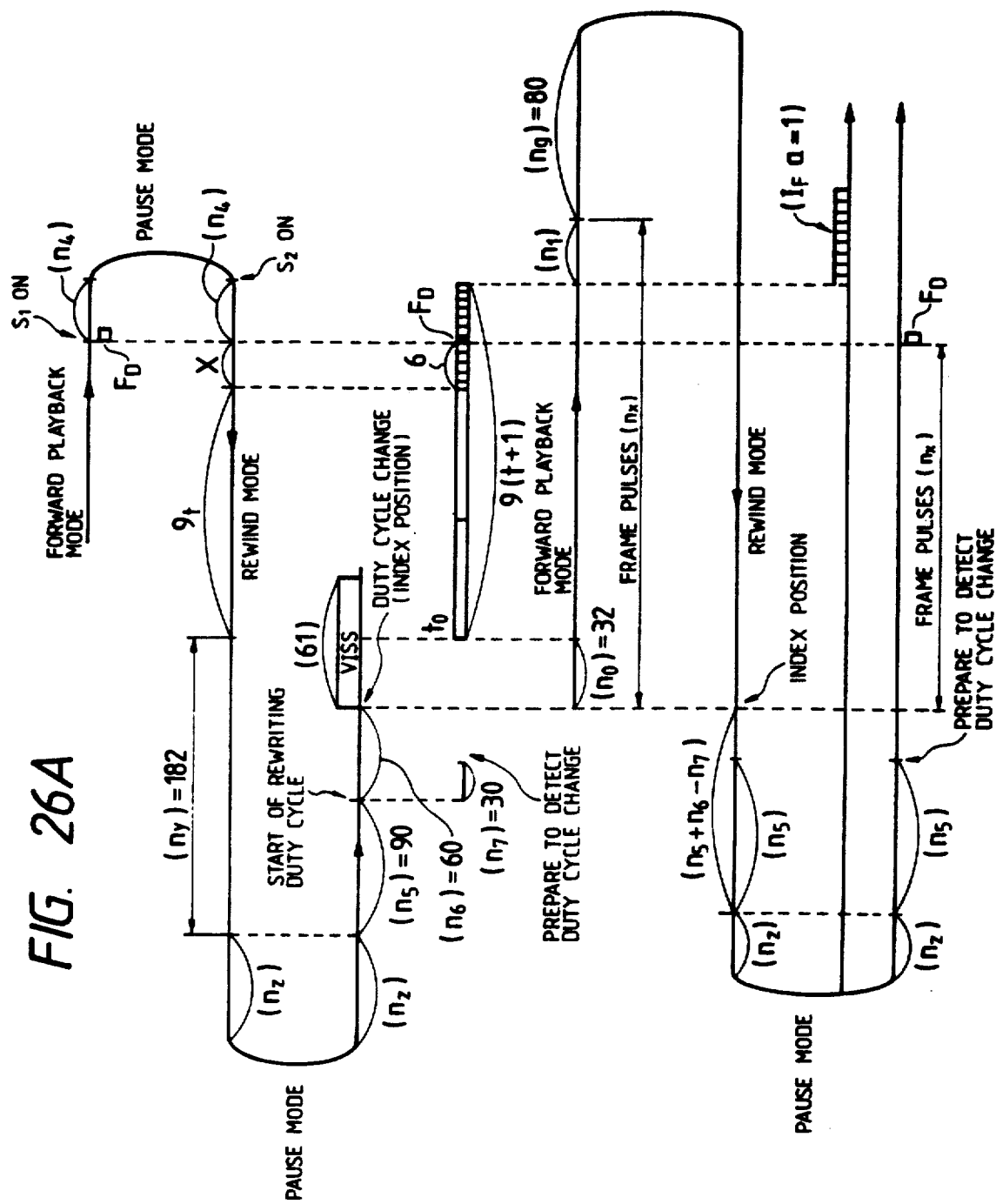

Referring to the top portion of FIG. 26A, when switch S1 is actuated with the system set in the frame search mode and the VTR 51 operating in the forward playback mode, video signal data for the frame which immediately follows the point of switch actuation are written into the frame memory 57, and counting of control pulses by the system controller 52 is then started. The VTR 51 is then set in the pause mode, and when it is detected that movement of the magnetic tape has effectively halted, the final control pulse count is stored, as a value $(n_4)$. The condition of the magnetic tape having effectively halted is detected as a condition in which the time that elapses between two successive control pulses exceeds a predetermined maximum value. This is the condition at step 106 of the flow chart, with a single-picture display being produced on the monitor.

Operation Sequence 2. (Steps 200 to 203 of the flow chart)

When the user actuates switch S2, the VTR 51 is set in the rewind mode, and counting of control pulses is started. When this count reaches a value of $(n_4+X+9t+n_y)$, where X and $n_y$ are fixed predetermined count values and t is a fixed predetermined integer, the counter is reset to zero, the VTR 51 is set in the pause mode, counting of control pulses is restarted, and the final count value obtained when the magnetic tape halts is stored, as a value $(n_z)$. The value X is preferably set as 4 or 5, in order to ensure that the desired frame will appear approximately as the 5$^{th}$ from within a 9-frame multi-image display that is subsequently produced. In this example, the value of $(n_y)$ is set as 182.

Operating Sequence 3. (Steps 204 to 211 of the flow chart)

The VTR 51 is set in the playback mode, and counting of control pulses is started. When a value $(n_z+n_5)$ is reached, (where $n_5$ is a predetermined count value, which in this example is 90), rewriting of duty cycle of successive control pulses (i.e. to a duty cycle of 60%, corresponding to the "0" state) on the magnetic tape is started, to prepare for writing the VISS signal. The value of $(n_5)$ should be large enough to ensure that servo control of the capstan motor of the VTR 51 has reached a stable condition, so that the control pulses are being accurately derived. At the point when rewriting of the control pulse duty cycle begins, counting of the control pulses is restarted, and when the count reaches a value $(n_7)$, which in this example is 30, the system controller 52 is set in a condition in which it is enabled to detect a change in duty cycle of the control pulses (corresponding to the index position). In addition, when a total of $(n_6)$ control pulses have been counted from the start of recording successive 60% duty cycle periods, where $(n_6)$ is 60 in this example, the writing of the 27.5% duty cycle of the VISS signal, i.e. corresponding to the 61 consecutive "1" state bits shown in FIG. 17A, is started. When the system controller 52 detects the start of this writing of the 27.5% duty cycle, i.e. the index position, as indicated by the output from the recording duty cycle detection circuit 53b in FIG. 20, then counting of frame pulses of the playback video signal is started.

After a fixed number $\{n_o\}$ of frame pulses has been counted, which in this example is 32, thereby defining a time point $t_o$, writing of the playback video signal data into the frame memory 57 is started, and is continued until a total of $9(t+1)$ frame pulses have been counted from the time point $t_0$. Writing into the frame memory 57 is then terminated After a fixed number $\{n_1\}$ of frame pulses have been counted, beginning from the termination of memory write-in, counting of frame pulses is terminated, and the total number of frame pulses that has been counted (beginning from the point of index position detection) is stored as the frame pulse count value $\{n_x\}$. Counting of control pulses is then started. Up to this point, superimposing of the 60% duty cycle condition (i.e. representing "0" state bits) on the control pulses on the magnetic tape has been continuously executed, from the end of the 61 consecutive 27.5% duty cycle periods (representing "1" state bits) which constitute the VISS signal. This duty cycle superimposing operation is now terminated when the count of control pulses reaches a fixed value, which in this example is 80. The VTR 51 is then set in the pause mode, (with the stored contents of the VTR 51 being read out to produce the multi-image display). This point corresponds to step 211 in the flow chart of FIG. 25A.

The value $\{n_1\}$ mentioned above serves as a correction value, for correcting any time difference between the control pulses and the frame pulses, and can for example be equal to one. This count value $(n_g)$ is established in order to prevent problems from occurring in the event that a VISS signal has previously been written into the portion of the magnetic tape which immediately follows the portion from which the video signal data (for a multi-image display) was written into the frame memory 57. That is to say, such a previously written VISS signal might be detected erroneously as indicating an index position, if a block shift operation (described hereinafter) is executed. In this example, the value of $(n_g)$ is set at 80.

Operating Sequence 4. (Steps 302 to 307, 400 to 409 of the flow chart)

At this point, the contents of the frame memory 57 are being read out to produce a static multi-image display of 9 frames. The respective image positions of the 9-picture display produced on the video monitor 60 are assigned beforehand with respective numbers, from 1 to 9, corresponding to the frame sequence as illustrated in FIG. 24. If it is judged that the desired frame is within that multi-image display, then the user first actuates the "3" key of the keyboard, thereby indicating to the system controller 52 a "Yes" decision for step 302, then inputs a frame designation number b (i.e. a positive integer in the range 1 to 9) to specify the position of the desired frame in the sequence of 9 frames displayed by the video monitor 60. The value of $\{n_x\}$ is then updated to $\{n_x-9-n_1+b\}$, and the VTR 51 is set in the rewind mode, to move the tape rapidly in the reverse direction. When the index position is detected (as described hereinabove for the preceding embodiment), counting of control pulses is started. When the count reaches a value of $(n_5+n_6-n_7)$, then counting of control pulses is restarted from zero, and the VTR 51 is set in the pause mode. When it is confirmed that VTR operation has halted, the control pulse count obtained at that point is stored as a value $(n_z)$.

The VTR 51 is then set in the forward playback mode, counting of control pulses is again started, and when a count of $(n_z+n_5)$ is reached, the system controller 52 is enabled to detect the index position defined by the VISS index signal. When the index position is detected, counting of frame pulses is started, with the flag m set to "0". When the frame pulse count reaches the aforementioned updated value $\{n_x\}$, the immediately succeeding frame of the playback video signal (i.e. the frame that has been specified by the user inputting the frame designation number) is written into the frame memory 57. The memory contents are then read out, to be transferred to the video printer apparatus.

Operating Sequence 5. (Steps 300, 313 to 317, or 301, 308 to 312)

If it is judged that the desired frame is not present in the multi-image display that is produced in step 409 described above, then the user specifies either a block shift operation or a frame shift operation as described above, then inputs a (positive or negative) number indicating the number of frames or a number of blocks by which the shift is to be executed, and the shift direction. The number of frames thus specified for a frame shift operation is designated as d, and the number of blocks specified for a block shift operation is designated as a. If a block shift operation is specified, then $\{n_x\}$ is updated to the value $\{\{n_x\}-9-n_1+9.a\}$. If a frame shift operation is specified, then $\{n_x\}$ is updated to the value $\{\{n_x\}-9-n_1+d\}$.

If it is now found that the new value of $\{n_x\}$ is greater than or equal to zero (in step 312 or 317), indicating that the position to which a shift is to be made is subsequent to the index position on the magnetic tape, then steps 400 to 409 are executed. In this case, as for the case of the Operation Sequence 4 described above, the VTR 51 is set in the rewind mode, and when the index position is detected, counting of control pulses is started. Whent the count reaches a value $(n_5+n_6-n_7)$, the count is restarted and the VTR 51 is set in the pause mode. Thereafter, operations proceed as described for Operation Sequence 4, until the point at which the index position of the VISS index signal is detected during forward playback. In this case, the m flag is in the "1" state, indicating that write-in of frames to produce a multi-image display is to be executed. Counting of frame pulses is started, and when the count value $\{n_x\}$ is reached, the succeeding 9 frames are written into the frame memory 57. The VTR 51 is subsequently set in the pause mode, and the memory contents are read out to produce a multi-image display on the video monitor 60.

If on the other hand it is found in step 312 or 317 that $n_x<0$, indicating the the desired frame is positioned prior to the index position on the magnetic tape, then steps 500a to 510 are executed. This is illustrated in FIG. 26B. In this case, after the magnetic tape has been halted and the multi-image display produced, the VTR 51 is set in the rewind mode, and when the index position is detected, counting of control pulses is started. When a fixed number of control pulses $(Y_o)$ equal to $(9t+n_y)$ is reached, where 9t and $n_y$ are as defined hereinabove, the VTR 51 is set in the pause mode. Counting of control pulses is restarted, and terminated when it is detected that the magnetic tape has halted, the resultant count value being stored as $(n_z)$. The VTR 51 is then set in the forward playback mode, counting of control pulses is restarted, and when the count reaches a value $(n_z+n_5)$, rewriting of the duty cycle of the control pulses on the magnetic tape (i.e. to the 60% duty cycle condition, representing the logic "0" state) is started. This is continued for a count of $(n_6)$ control pulses, then the VISS index signal is written by setting the control pulse duty cycle to 27.5% as described hereinabove, with an index position being defined at the start of this VISS index signal. Counting of frame pulses is then started, beginning from this index position, and when the frame pulse count reaches $(9t+n_o+n_x)$, write-in of the 9 succeeding frames into the frame memory 57 is started (step 506). The VTR 51 is set in the pause state thereafter, and the frame memory 57 contents are read out to produce a multi-image display on the video monitor 60. The user then judges whether or not the desired frame appears on the multi-image display, i.e. operation returns to the decision steps 300 to 302. Subsequent operations are based on the new index position as a reference position on the magnetic tape.

With the above embodiment, counting from the index position to obtain the time point to begin writing of a frames into the frame memory 57 is executed using frame pulses, which are produced from the vertical synchronizing signal detection circuit 62, although other count values are obtained using the control pulses. This is made necessary by the fact that although the index position (i.e. the duty cycle changeover at the start of the VISS signal) is defined by control pulses, the control pulses may be time-displaced with respect to the frame pulses (e.g. by one field). However other embodiments of the invention could be envisaged, in which all count values are based on the control pulses.

Furthermore the embodiment has been described for the case in which the components of the video signal frame search apparatus are combined with the VTR 51. However it would be equally possible to implement the video signal frame search apparatus as an adaptor unit, which is interposed between the VTR and the video printer apparatus.

It has been found in practice that the above embodiment enables a desired frame to be usually located within the first multi-image display that is produced, so that it will normally not be necessary to execute a frame shift operation or a block shift operation. Hence, the apparatus is simple and rapid to utilize.

Figure 27A:
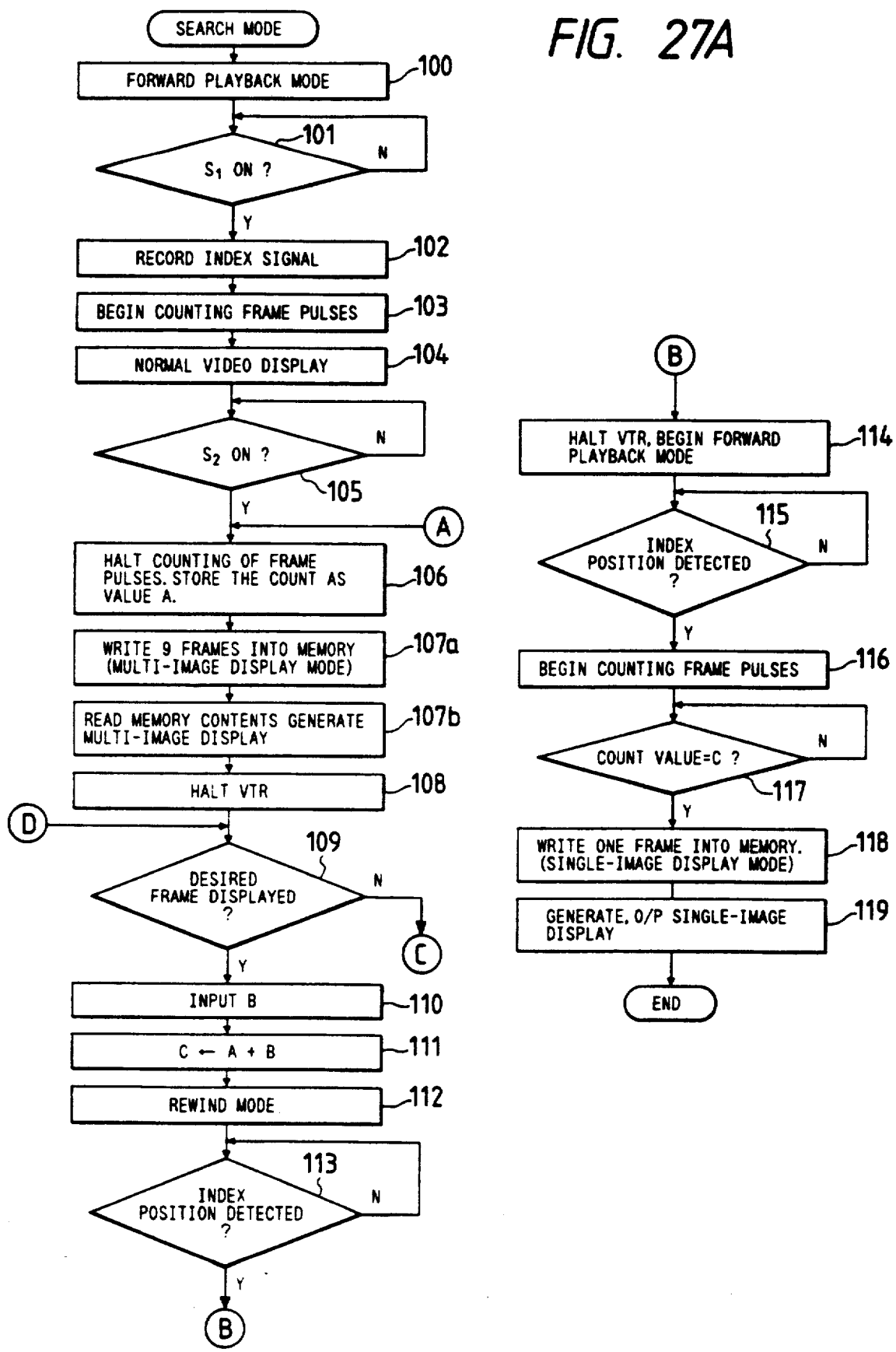
FIGS. 27A and 27B constitute a flow chart for describing the operation of a ninth embodiment of the invention, having the configuration shown in FIG. 20.
Figure 27B:
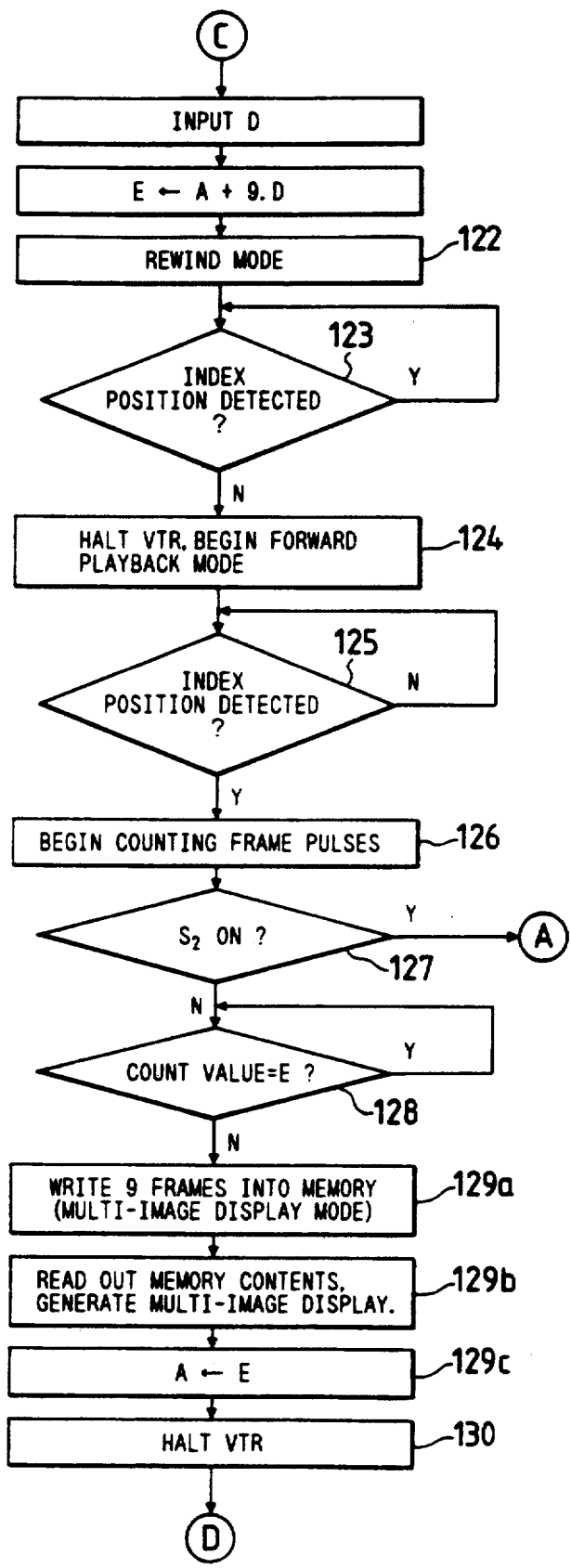
Figure 28A:
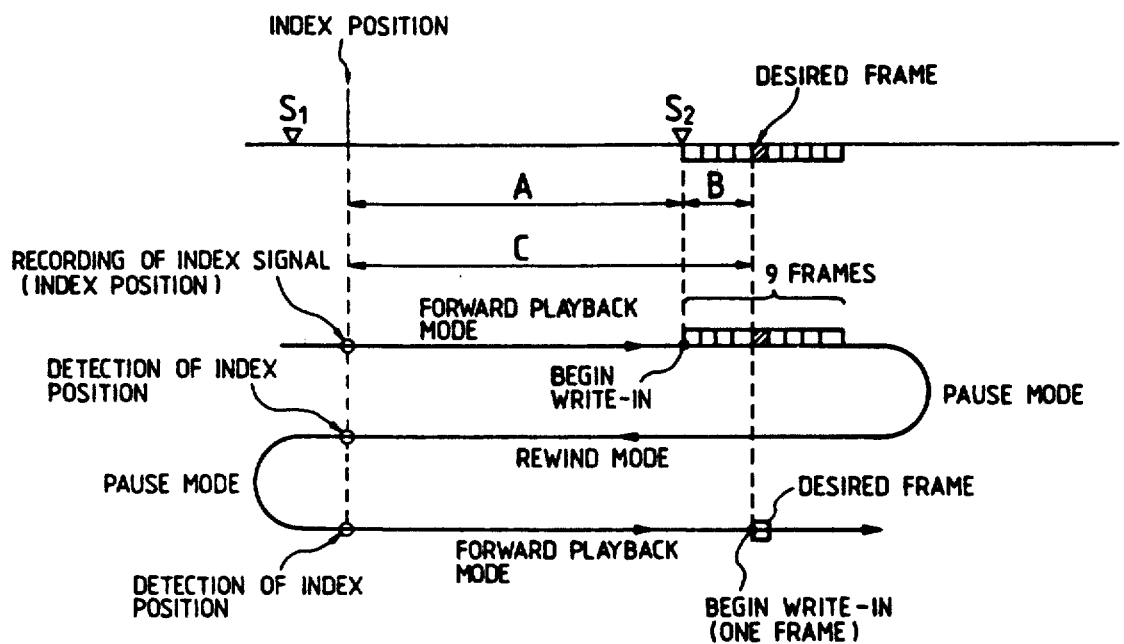
FIGS. 28A and 28B are conceptual diagrams for describing control of magnetic tape movement by the VTR, with the ninth embodiment.

Another embodiment of a video signal frame search apparatus according to the present invention will be described, whose physical configuration can be identical to of the preceding embodiment, but in which the control operations executed by the controller are basically different from those of the preceding embodiment. This embodiment will be described referring to FIG. 20 and also to the flow chart of FIGS. 27A, 27B which shows the basic control operations executed by the system controller 52, and to FIGS. 28A and 28B which illustrate the movements of the magnetic tape in the VTR 51.

The user first manually operates the VTR 51 to move the magnetic tape to a position that is known to be prior to that of a desired frame which is to be printed. The apparatus is then set in the frame search mode, and the VTR 51 is thereby set into forward playback operation. In this condition, the switch 55 and switch 58 are set by the system controller 52 such that the playback video signal from the VTR 51 is supplied to the video monitor 60 to be displayed. After playback operation begins, the user actuates the switch S1. The system controller 52 responds to this switch actuation by causing a VISS index signal to be recorded on the magnetic tape of the VTR 51 (by rewriting the control pulses with predetermined values of duty cycle as described hereinabove), to thereby define an index position on the magnetic tape at the point of changeover between the 60% duty cycle and 27.5% duty cycle of the control pulses (step 102) Counting of frame pulses from the vertical synchronizing signal detection circuit 62 by the system controller 52 is started at the instant when this index position is recorded on the magnetic tape (step 103). The user then observes the video monitor 60, and when the desired frame appears on the display, the user actuates the search switch S2. In practice, the instant of switch actuation will in generally differ by a number of frame intervals from the actual point in time at which the desired frame appears on the display. At the instant of switch actuation, counting of the frame pulses is halted, and the count value attained (designated as A) is stored (step 106a, 106b). Nine successive frames of the playback video signal which occur immediately following the instant of actuating switch S2 are then written into the frame memory 57. The contents of the frame memory 57 are then read out, converted to an analog video signal, and displayed on the video monitor 60 as a stationary multi-image display of 9 frames. The display format of these frames in the multi-image display is as shown in FIG. 24 (step 107a, 107b). The VTR 51 is then set in the pause mode.

If it is found that the desired frame appears in the multi-image display (step 109), then the user inputs (using the keyboard 50) a number (designated as B) in the range 1 to 9 which specifies the position of the desired frame in the set of 9 frames appearing on the multi-image display (step 110). The value B is used as a frame correction number. The count value A and the frame correction number B are then added together, to obtain a search count value C (step 111).

The VTR 51 is then set in the rewind mode (step 112), and when the index position is detected the VTR 51 is set in the pause mode (step 113, 114). The VTR 51 is then again set in the forward playback mode (step 115), and counting of frame pulses is started. When the count value that is reached coincides with the search count value C (step 117), the frame which occurs in the playback video signal immediately following that time point is written into the frame memory 57, with only a single frame being written in (step 118). The memory contents are then repetitively read out to produce a corresponding video signal representing the desired frame, which is supplied to the video monitor 60 and also to the video printer apparatus (step 119). The desired frame can now be printed out.

Figure 28B:
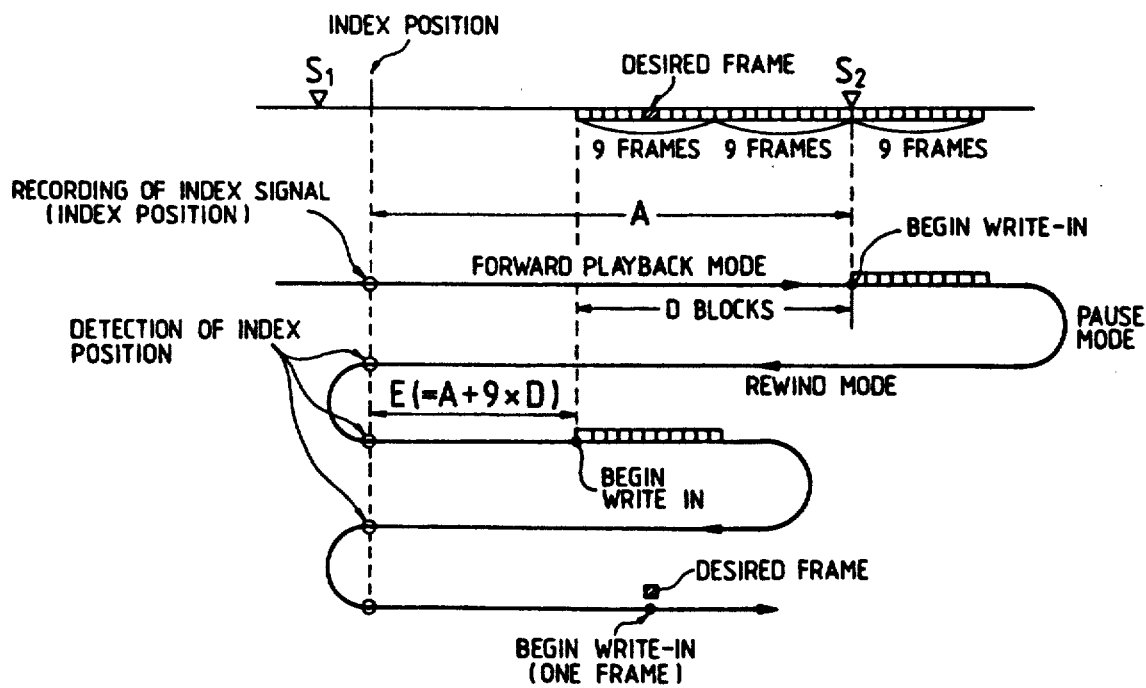

If on the other hand it is found in step 109 that the desired frame does not appear in the multi-image display, then operation of the system controller 52 moves to step 120, and the series of operations shown in FIG. 28B are executed. Firstly, the user inputs a number D which represents a number of blocks of 9 frames by which the magnetic tape is to be shifted, with the sign of D indicating the direction in which the block shift is to be made (step 120). This number is multiplied by 9 to obtain a frame correction value, and this value 9D is added to the count value A to obtain a search count value E (step 121). In the example of FIG. 28B, the value of D is assumed to be −2, i.e. the user has judged that the magnetic tape must be moved in the reverse direction by 18 frames in order to reach a position at which playback of the desired frame becomes possible. Thus in this case, the value E is obtained by subtracting 18 from the count value A (i.e. in step 121).

The VTR 51 is then set in the rewind mode (step 122), and when the index position is detected, the VTR 51 is set in the pause mode, and then in the forward playback mode (step 123, 124). When the index position is now once more detected, counting of frame pulses is started (step 125, 126).

With the VTR 51 operating in the forward playback mode at this time, so that a video (moving) picture is being displayed by the video monitor 60, there are two possible courses of action, as indicated by step 127. That is, the user may observe the desired frame appearing on the display, and actuate switch S2 at that point, causing the operation to return to steps 106a, 106b described above, whereupon the preceding operations are repeated, using the new value of A that is obtained in step 106b. Alternatively, if the user does not actuate switch S2, then when the count value E is reached (step 128), write-in of the succeeding 9 frames to the frame memory 57 is executed (step 129a). The memory contents are then repetitively read out and displayed as a multi-image display by the video monitor 60 (step 129b).

The value E is then set as the new value of A, and the VTR 51 is set in the pause mode (step 129c, 130). Operation then returns to step 109, in which the user judges whether or not the desired frame is within the set of 9 frames that appear as the multi-image display. If the desired frame does not appear, then the steps 120 to 130 are repeated.

It can thus be understood from the above that this embodiment enables a desired frame to be rapidly searched for, to be then transferred to a video printer apparatus and printed out.

With the above embodiment, the user observes the monitor display during VTR playback operation until a desired frame appears, then actuates a search switch. Thus, since the timing of the switch actuation will usually be delayed by several frames with respect to the actual time point at which the desired frame appears on the display, it will not generally be possible for the user to actuate the search switch such that the desired frame appears within the resultant multi-image display, at the first attempt (i.e. when steps 100 through 109 are first executed). In practice, it will usually be necessary for the user to repeat the search operations several times, to find the desired frame. Another embodiment will be described which provides an improvement in this respect. The embodiment has the configuration shown in FIG. 20, and will be described referring to the flow chart of FIGS. 29A, 29B and the VTR operation diagram of FIG. 30, in which additional steps 201a and 201b are added to those of FIGS. 27A, 27B.

With this embodiment, after the user has operated the VTR 51 to set the magnetic tape at a playback position which is prior to that of the desired frame, the user actuates the mode switch S3 to establish the search mode, whereupon VTR 51 is set in the forward playback mode (step 100). When the user then actuates switch S1, an index position is written on the control track, as a VISS index signal. Counting of frame pulses is started at the instant when the index position is written (step 103), while in addition, write-in of successive frames to the frame memory 57 is started at that time point (step 201a). Subsequently, when the user observes the desired frame on the display, switch S2 is actuated (step 105), whereupon counting of the frame pulses is halted and the resultant count value is stored as the value A, and write-in of frames to the frame memory 57 is halted (step 201b).

The last 9 frames to be written into the frame memory 57 are then repetitively read out, and displayed on the video monitor 60 as a multi-image display, with the VTR 51 set in the pause mode (step 107b). The subsequent operation is identical to that of the preceding embodiment, so that further description will be omitted.

With this embodiment, since the last 9 frames that are played back from the magnetic tape immediately prior to the switch S2 being actuated are displayed as the multi-image display, there is an increased probability that the desired frame will appear on the multi-image display, by comparison with the preceding embodiment. Thus, the average time required for the user to complete a search procedure can be substantially increased.

With this embodiment, since it is necessary when the switch S2 is actuated to thereafter display the last 9 frames of the playback video signal, it is necessary to update the contents of the frame memory each time that a new frame is written into the memory (or to execute address control to achieve the same effect). That is to say, the first 9 frames are successively written into memory regions 1 to 9, the contents of memory regions 2 to 9 are then transferred to memory regions 1 to 8 respectively and a new frame is then written into memory region 9, and so on.

In the above description of embodiments of the present invention, it has been assumed that when a set of frames for producing a multi-image display are written into the frame memory 57, successive fields of respective frames are written into two sets of memory addresses (as described above referring to FIGS. 22, 23), with the first field of each frame being written into one set of addresses ($a_1$, $a_2$, ...) and the second field of each written into the other set of addresses ($b_1$, $b_2$, ...), i.e. with the address sequence being of the form 1, 2, 3, ... 9. At the time of memory readout, the addresses are generated in the same sequence, i.e. first the addresses $a_1$, ($b_1$), $a_2$, ($b_2$), and so on. However this is may not be the most efficient method of executing memory write and read operations for the multi-image display. Another method will be described referring to FIGS. 33A to 33C. Here, the first and second fields (each designated as $F_1$) of the first one of a set of 9 frames have been written into a pair of addresses $a_5$ and $b_5$ respectively, the first and second fields (each designated as $F_2$) of the second frame of the set of 9 frames have been written into the addresses $a_6$ and $b_6$ respectively, the first and second fields (each designated as $F_3$) of the third frame have been written into the addresses $a_7$ and $b_7$ respectively, ... and the first and second fields (each designated as $F_9$) of the ninth frame have been written into the addresses $a_4$ and $b_4$ respectively. Thus, write-in is executed using the address sequence 5, 6, 7, 8, 9, 1, 2, 3, 4. Subsequently, at the time of read-out of the frame memory 57, read-out begins at the next address in the address sequence after address $b_4$, i.e. at address $a_5$. The first lines from addresses $a_5$, $a_6$, $a_7$ are then read to obtain the first line of one field of the multi-image display, and so on.

It should be noted that if after writing into the frame memory 57 using the address sequence described above, read-out were to be executed using the address sequence, 1, 2, 3, ... 9, i.e. beginning with the first lines stored in $a_1$, $a_2$, $a_3$ to obtain the first line of a field of the multi-image display, and so on, then the resultant arrangement of the frames on the multi-image display would be as shown in FIG. 33B, which does not correspond to the time-serial arrangement of the 9 frames. However by reading out the memory using the address sequence $a_5$ ($b_5$), $a_6$ ($b_6$), $a_7$($b_7$), ... $a_4$ ($b_4$) as described above, the correct multi-image display format shown in FIG. 33C is obtained on the monitor. This method of writing and reading the frame memory 57 can simplify memory read and write control operations.

Figure 32:
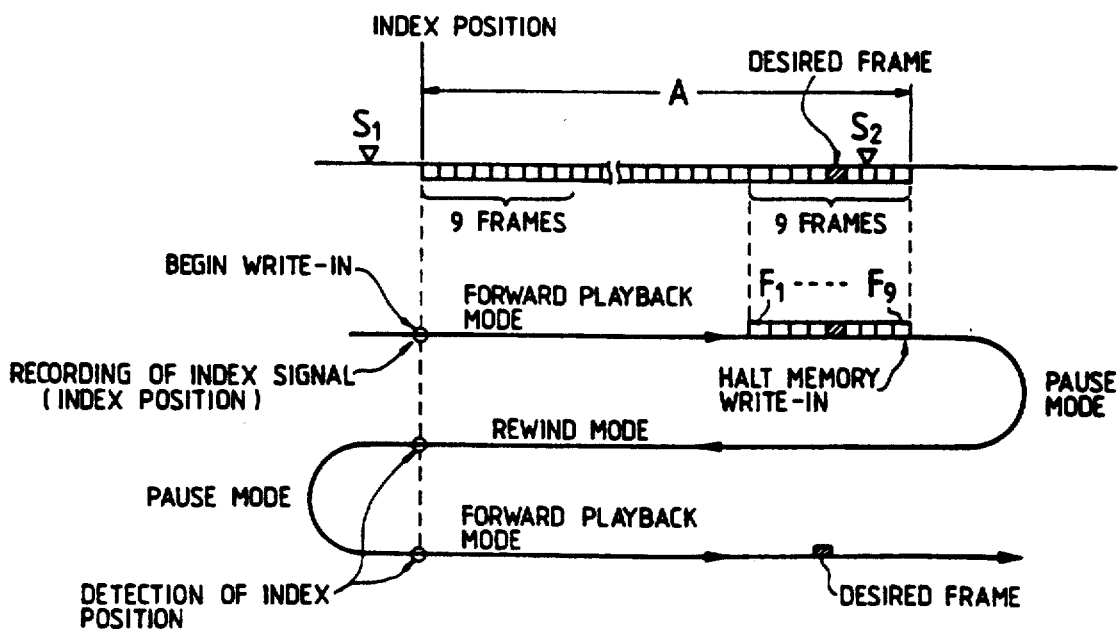
FIG. 32 is a conceptual diagram for describing control of magnetic tape movement by the VTR, with the eleventh embodiment.
Figure 31B:
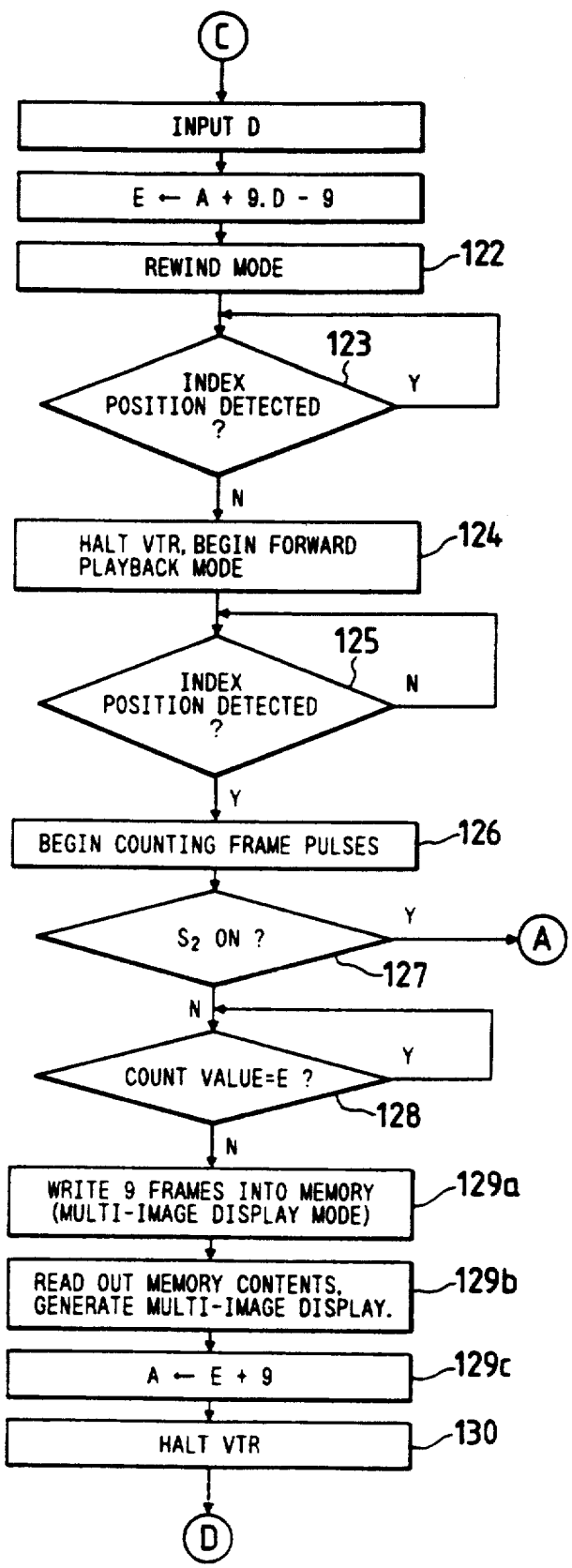

Another embodiment will be described referring to FIGS. 31A, 31B and 32. This also has the physical configuration shown in FIG. 20, and differs from the preceding embodiment in that a step 105b is added following the step 105. This step 105b serves to ensure that the count value A that is obtained will be an integral multiple of the number of pictures of the multi-image display, e.g. a multiple of 9. As with the preceding embodiment, when the switch S1 is actuated and a VISS index signal then superimposed on the control track of the magnetic tape, counting of frame pulses (and write-in of frames to the frame memory 57, in the multi-image display write-in mode) is started at the point when the index position of the VISS index signal is recorded. However with the embodiment of FIGS. 31A, 31B, When the switch S2 is subsequently actuated, counting of frame pulses is continued until a count value that is an integral multiple of 9 is reached. The resultant count is then stored as the value A. The subsequent operation is identical to that of the preceding embodiment.

Since in this case the count A must be a multiple of 9, memory write-in can be executed after the index position is recorded, by first writing in 9 successive frames to the frame memory 57 (e.g. to the addresses $a_1$ (b(1) to $a_9$ ($b_9$), then successively replacing these by the next 9 frames of the playback video signal, and so on. Memory write control operations can thus be substantially simplified, by comparison with the preceding embodiment. Specifically, it is not necessary to execute an operation of shifting of memory region contents prior to each write-in of a new frame, as is required with the preceding embodiment, since it becomes possible to simply repetititively write each set of 9 successive frames into a set of 9 memory regions.

With the preceding embodiments, a VISS index signal which defines an index position is recorded on the magnetic tape in response to actuation of the switch S1, and multi-image display data write-in to the frame memory 57 is subsequently initiated when the switch S2 is actuated. Thus is it necessary for the user to actuate each of two switches during a search procedure. An embodiment will now be described whereby it is only necessary for the user to actuate a single switch, referring to FIGS. 34A, 34B and 35A, 35B. The operation is as follows. Assuming the magnetic tape to have been previously moved to a position prior to the position for playback of a desired frame, when the search mode is entered, the VTR 51 is set in the forward playback mode (step 100, with the playback video signal appearing (as a single-picture display) on the video monitor 60. When switch S1 is actuated (step 202), a VISS index signal defining an index position is recorded on the magnetic tape as described previously (step 102). Counting of frame pulses is started at that point, and when the count reaches a predetermined value, the succeeding 9 frames are written into the frame memory 57, the memory contents are read out to provide an multi-image display of these frames, and the VTR 51 is set in the pause mode (step 151, 201a to 108). If the desired frame appears in the multi-image display, then steps 110 to 119 are executed as described for the preceding embodiment, to store and then read out the desired frame from the frame memory 57.

However if the desired frame does not appear on the multi-image display in step 109, then the user inputs a correction value D which is a positive or negative number representing a number of blocks of 9 frames by which the magnetic tape is to be moved. A decision is then made (step 203) as to whether or not the value A+9.D is less than zero. If it is not less than zero, then a value E is set as A+9.D. The VTR 51 is then set in the rewind mode, and when the index position is detected, the VTR 51 is set in the pause mode, and then in the forward playback mode (step 123, 124). When the index position is now once more detected, counting of frame pulses is started (step 125, 126).

When the frame pulse count reaches the value E (step 128), write-in to the frame memory 57 (in the multi-image display mode) is executed for 9 successive frames (step 129a). The contents of the frame memory 57 are then read out to obtain a multi-image display, and the VTR 51 is then set in the pause mode (step 130). Operation then returns to step 109, in which the user decides whether the desired frame appears in the multi-image display.

Figure 35A:
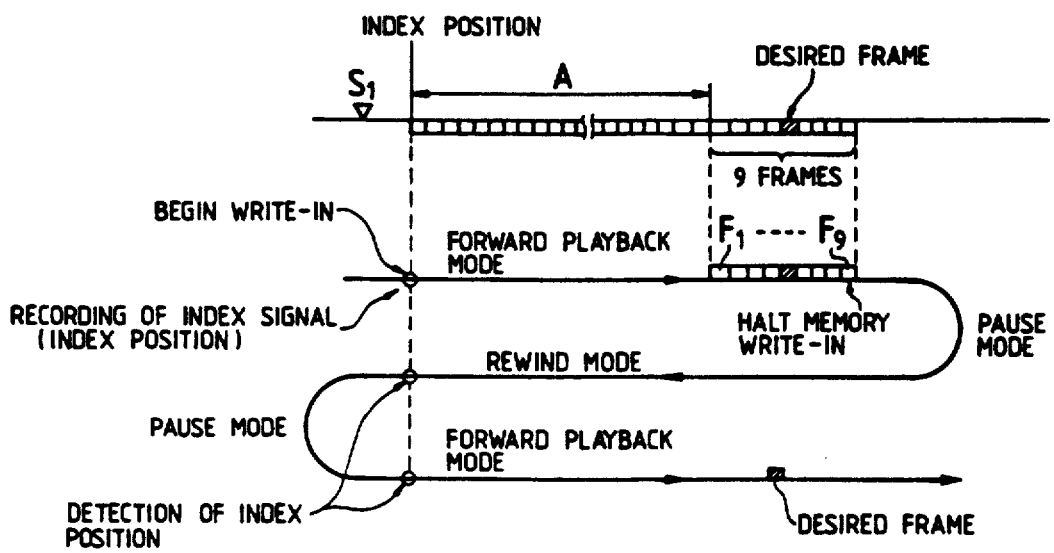
FIGS. 35A and 35B are conceptual diagrams for describing control of magnetic tape movement by the VTR, with the twelfth embodiment.
Figure 35B:
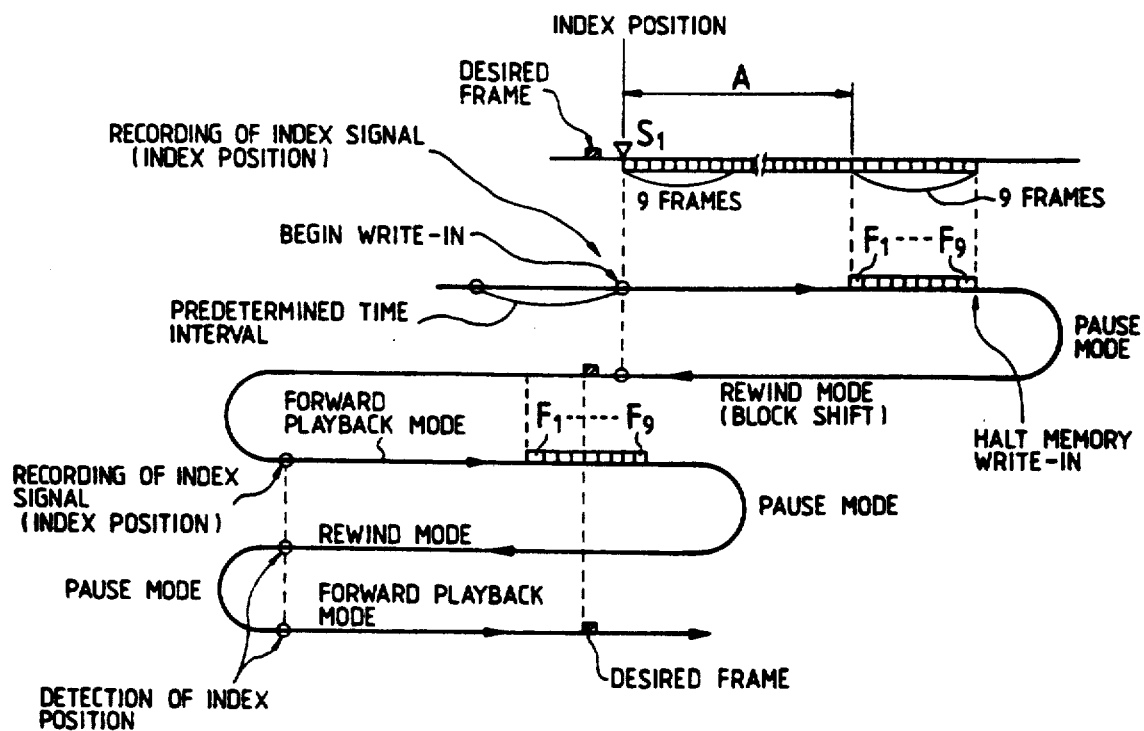

If on the other hand it is found in step 203 that the value of (A+9.D) is less than zero, (indicating that the position of the desired frame is prior to the index position) then operation proceeds to step 203b in which the value of E is set as −(A+9.D), then to step 204a. The sequence then executed is illustrated in FIG. 35B. The VTR 51 is first set in the rewind mode, until the index position is detected (step 204b, whereupon counting of control pulses is started (step 204c). When a control pulse count of (E+n₁) is reached, where n₁ is a predetermined fixed integer, the VTR 51 is set in the pause mode and counting of control pulses is restarted. When halting of the VTR 51 is confirmed, the control pulse count is stored as the value n₂. The VTR 51 is then set in the forward playback mode and counting of control pulses is restarted (step 205). When the count value reaches n₂, a VISS index signal is recorded on the magnetic tape to define an index position (step, and counting of control pulses is then restarted (step 207). When the count reaches the value n₁, the succeeding 9 frames are written into the frame memory 57, i.e. operation returns to step 118. The multi-image display is then produced, with the VTR 51 in the pause mode, for the user to judge whether the desired frame appears in the multi-image display, as described previously.

With this embodiment, recording of an index signal on the magnetic tape and subsequent storing of a set of frames into the frame memory 57 are both executed in response to actuation of a single switch. In addition, if a desired frame is found by the user to be positioned prior to the point at which the index position was recorded, then it is only necessary for the user to input a correction value, whereupon a new index position is recorded on the magnetic tape, without further switch actuations by the user being necessary.

Figure 36:
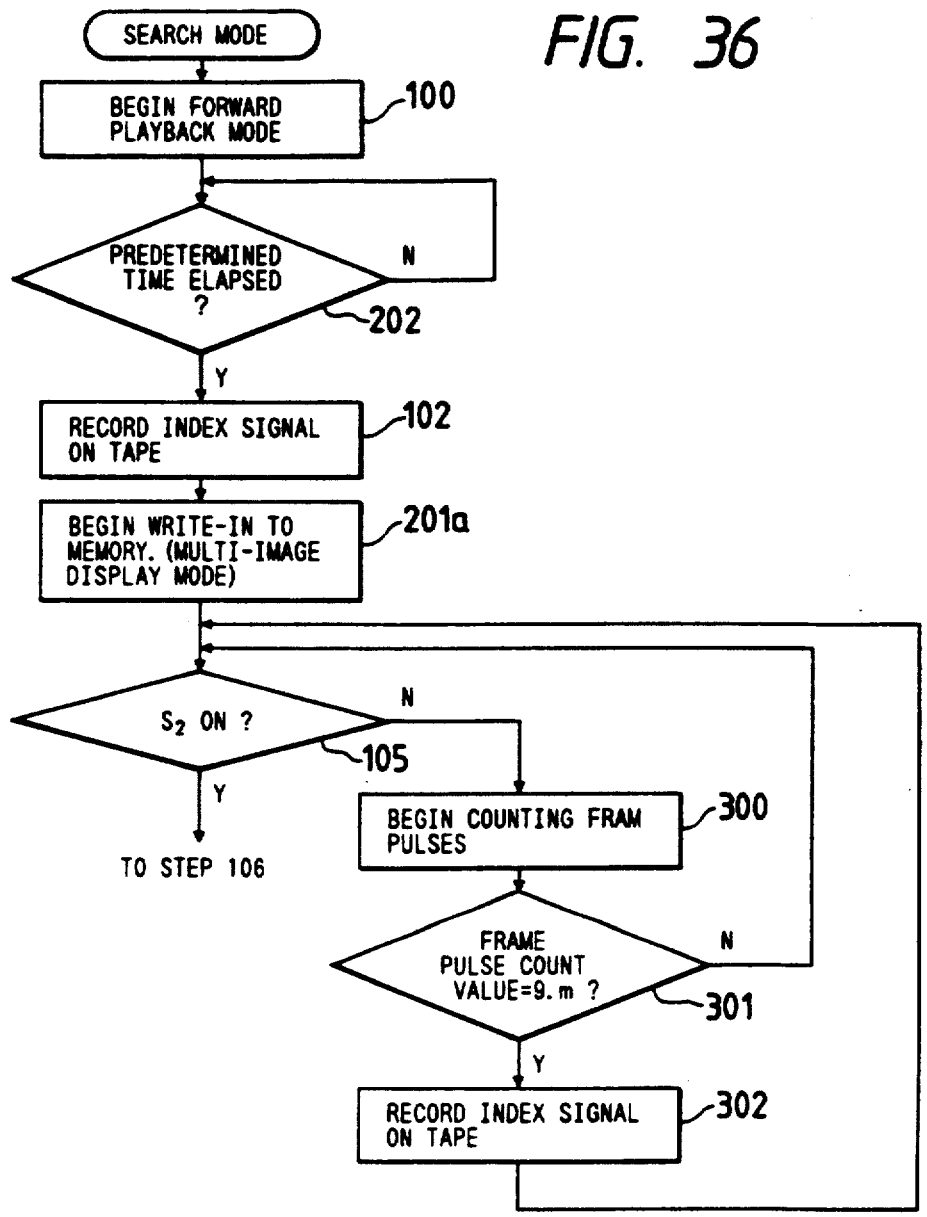
FIG. 36 is a partial flow chart for describing the operation of a thirteenth embodiment of the invention.
Figure 37:
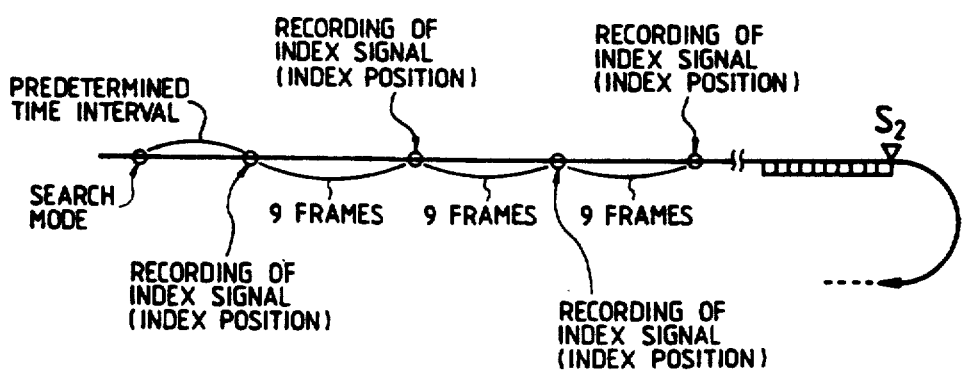
FIG. 37 is a partial conceptual diagram for illustrating magnetic tape control with the thirteenth embodiment of the invention.

With each of the above embodiments in which two switches S1 and S2 are utilized, for recording an index position and for halting the magnetic tape at a search position respectively, the speed of a search operation is strongly affected by the time which elapses between recording of the VISS index signal index position and the point at which the search switch S2 is actuated. An embodiment will be described referring to FIGS. 36 and 37 whereby successive VISS index signal index positions are defined on the magnetic tape, once in each of a fixed number of frame pulses, where that number is an integral multiple of the number of frames of the multi-image display (i.e. a multiple of 9). For brevity of description, only an initial part of the flow diagram of this embodiment is shown in FIG. 36, while the corresponding initial operations of the VTR 51 are illustrated in the partial conceptual diagram of FIG. 37. The remaining portions of the flow chart of this embodiment are identical to those of the tenth embodiment shown in FIG. 29A, 29B (i.e. from step 106 thereof), and further description of that portion will therefore be omitted. However it will be apparent that the principles of this embodiment could be applied to other embodiments, in order to minimize an amount of time that is required for movement of the magnetic tape in the reverse direction until an index position is detected. The physical configuration is identical to that shown in FIG. 20.

The operation is as follows. After the search mode has been entered, and the VTR 51 set in the playback mode, then after a predetermined time interval has elapsed (sufficiently long to ensure that the VTR operation has stabilized), a VISS index signal is recorded on the magnetic tape, in response to control signals from the system controller (step 102). At the point when an index position is defined on the tape by the VISS index signal, counting of frame pulses is during this time the playback video signal is being displayed by the video monitor 60. In addition, write-in to the frame memory 57 of successive frames of the playback video signal (in the multi-image display write-in mode) is started at the point when the index position is recorded (step 201a). Thereafter, the system controller 52 checks to detect whether the switch S2 has been actuated (step 105). If S2 has not been actuated, then counting of frame pulses is started. Counting of control pulses is continued (steps 300, 301). Designating the aforementioned integral multiple as m, and assuming that the multi-image display consists of 9 frames, when a control pulse count of 9.0 m is reached, a new VISS index signal is written on the magnetic tape (step 302, and then counting of control pulses is restarted.

Figure 29A:
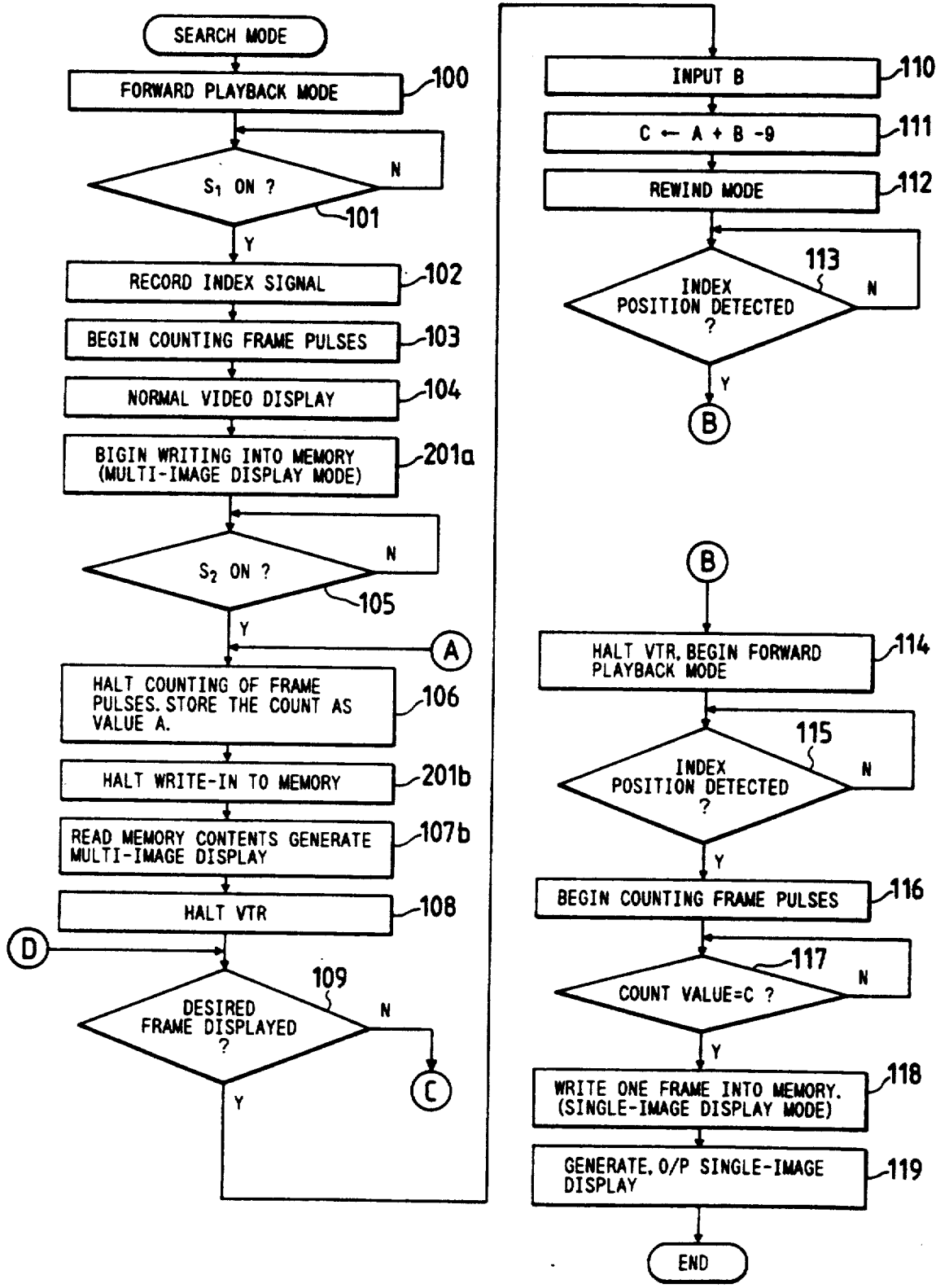
FIGS. 29A and 29B constitute a flow chart for describing the operation of a tenth embodiment of the invention, having the configuration shown in FIG. 20.
Figure 29B:
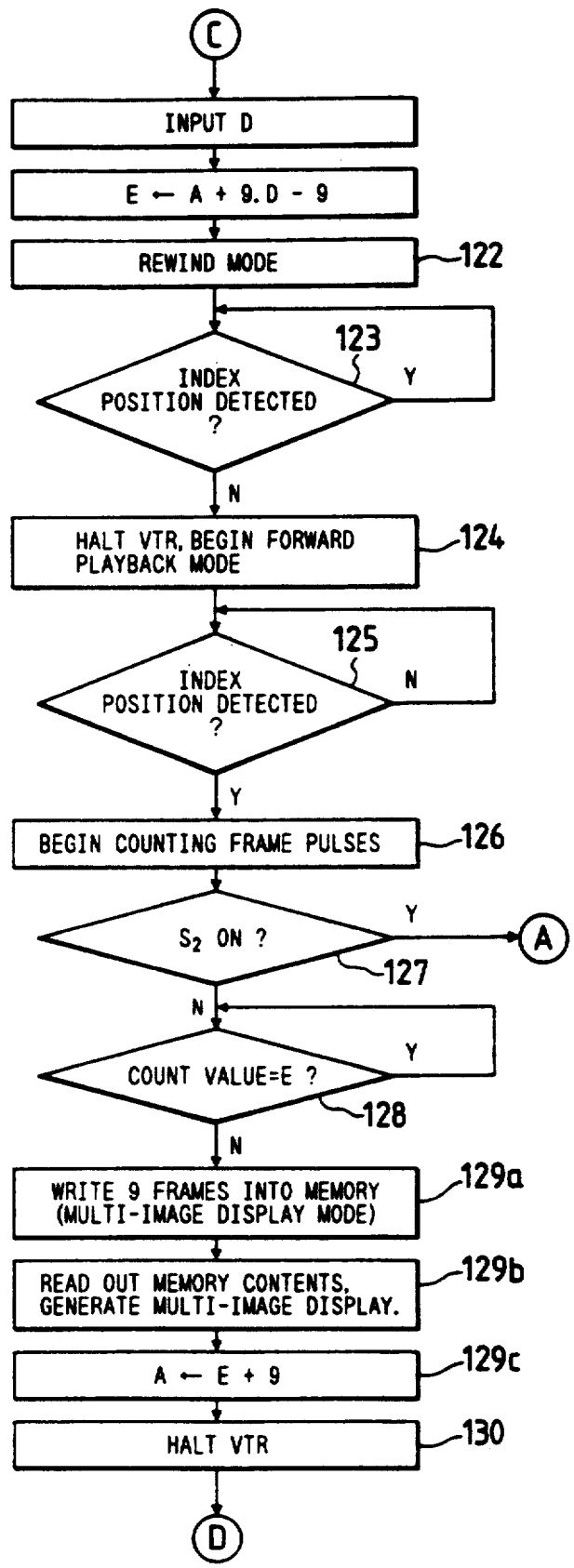
Figure 30:
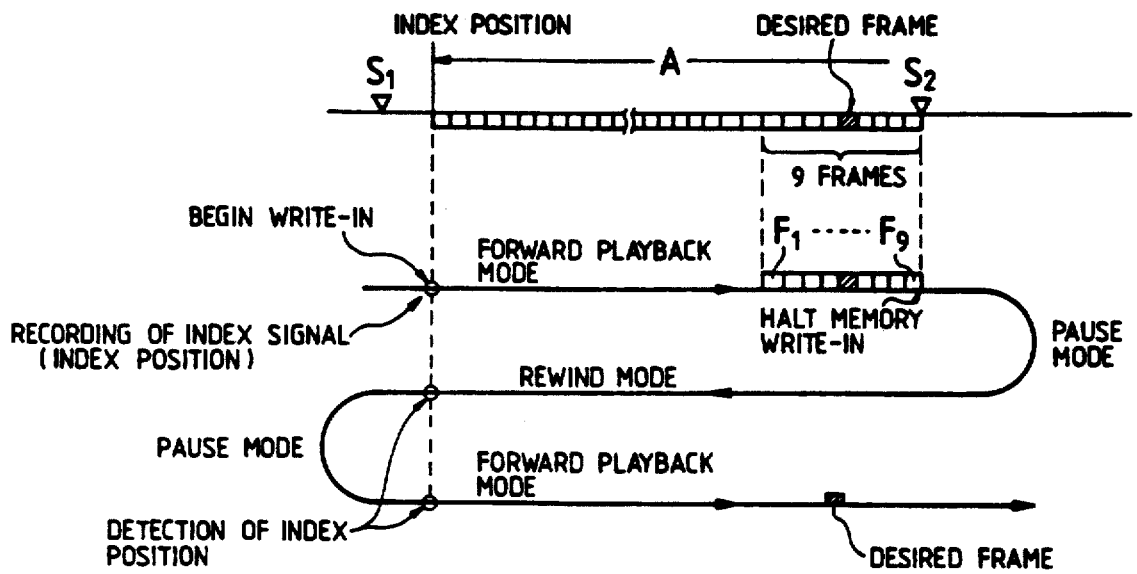
FIG. 30 is a conceptual diagram for describing control of magnetic tape movement by the VTR, with the tenth embodiment.

If switch S2 has been actuated, then operation proceeds to the step 106 shown in FIG. 29A.

In this way, it is ensured that the time between the occurrence of the desired frame during playback and the time at which a VISS index signal was previously recorded on the magnetic tape can be minimized. The time required to execute a frame search procedure can thereby be substantially reduced.

Although not described in the above, it would be possible to modify any of the embodiments in various ways, for example by arranging to display on the video monitor 60 a number of blocks or a number of frames that have been inputted by the user through the keyboard to designated a block shift or frame shift operation, or causing a selected frame on the multi-image display (i.e. which has been selected by the user, by inputting a frame designation number, as the desired frame) to flash on and off repetitively.

What is claimed is:

1. A video signal frame search apparatus operable for controlling a video tape recorder to select a desired one of a plurality of successive video signal frames recorded on a magnetic tape, said video tape recorder comprising means for recording index signals on said magnetic tape to define respective index positions, said apparatus comprising:

memory means;

control circuit means coupled to said memory means and to said video tape recorder, for controlling read and write operations of said memory means and for controlling movement of said magnetic tape by said video tape recorder, and comprising means for measuring amounts of movement of said magnetic tape in a forward playback direction and in a reverse direction, in units of frames, and means for detecting index positions defined by said index signals;

externally operable input means for inputting data to said control circuit means; and first and second externally operable switches, coupled to respective inputs of said control circuit means;

in which said control circuit means is operable for executing a frame search operation by successively:

(a) controlling said video tape recorder to set said magnetic tape in said forward playback direction of movement, while supplying a playback video signal from said video tape recorder to video monitor means;

(b) in response to actuation of said first switch, controlling said video tape recorder to record an index signal defining an index position;

(c) in response to a subsequent actuation of said second switch, executing write-in of one frame of said playback video signal into said memory means, then controlling said video tape recorder to halt movement of said magnetic tape, and storing a measurement value representing an amount of movement of said magnetic tape which has occurred from an instant of recording said index position to said actuation of the second switch;

(d) executing read-out of said frame from said memory means, to display said frame by said video monitor means;

(e) in response to input of a correction value from said external input means, representing an amount of position displacement of said desired frame, computing a search value as the sum of said correction value and said measurement value (f) controlling said video tape recorder for reverse movement of said magnetic tape until said index position is detected, then for forward playback movement; and (g) when said forward playback movement reaches an amount corresponding to said search value, executing write-in of one frame of said playback video signal into said memory means, as said desired frame;

wherein said index signal is recorded by modifying a duty cycle of control pulses which are recorded on a control track of said magnetic tape, and said index position is defined by a change in said duty cycle.

2. A video signal frame search apparatus operable for controlling a video tape recorder to select a desired one of a plurality of successive video signal frames recorded on a magnetic tape, said video tape recorder comprising means for recording index signals on said magnetic tape to define respective index positions, said apparatus comprising:

memory means;

control circuit means coupled to said memory means and to said video tape recorder, for controlling read and write operations of said memory means and for controlling movement of said magnetic tape by said video tape recorder, and comprising means for measuring amounts of movement of said magnetic tape in a forward playback direction and in a reverse direction, in units of frames, and means for detecting index positions defined by said index signals;

externally operable input means for inputting data to said control circuit means; and first and second externally operable switches, coupled to respective inputs of said control circuit means;

in which said control circuit means is operable for executing a frame search operation by successively:

(a) controlling said video tape recorder to set said magnetic tape in said forward playback direction of movement, while supplying a playback video signal from said video tape recorder to video monitor means;

(b) in response to actuation of said first switch, executing write-in of one frame of said playback video signal into said memory means, then controlling said video tape recorder to halt movement of said magnetic tape;

(c) executing read-out of said frame from said memory means, to display said frame by said video monitor means;

(d) in response to action of said second switch, controlling said video tape recorder to move said magnetic tape in the reverse direction by a first fixed amount, then halt said magnetic tape and move said magnetic tape in the forward direction;

(e) when an amount of forward movement reaches a second fixed value, controlling said video tape recorder to record an index position as an index signal on said magnetic tape;

(f) when a subsequent amount of forward movement of said magnetic tape as measured from an instant of recording said index position reaches a third fixed value, writing X successive frames into said memory means, where X is a fixed integer, then controlling said video tape recorder to halt said magnetic tape;

(g) executing read-out of said X frames from said memory means, to display said X frames simultaneously by said video monitor means; and (h) in response to an input signal from said input means indicating that said desired frame is within said X frames, and an inputted frame designation number indicating a position of said desired frame within said X frames, controlling said video tape recorder for reverse movement of said magnetic tape until said index position is detected, then for forward movement of said magnetic tape until a movement amount as measured from an instant of detection of said index position reaches a value computed based upon said frame designation number, then executing write-in of one frame into said memory means as said desired frame;

wherein said index signal is recorded by modifying a duty cycle of control pulses which are recorded on a control track of said magnetic tape, and said index position is defined by a change in said duty cycle.

3. An apparatus according to claim 2, and further wherein said control circuit means operates during said step (h) in response to an input signal from said input means indicating that said desired frame is not within said X frames and to input of a shift number indicating an amount of magnetic tape displacement required for selecting said desired frame, for successively:

(i) controlling said video tape recorder to move said magnetic tape in the reverse direction until said index position is detected, then to move said magnetic tape forward by an amount which is the sum of said displacement number and a fixed value, as measured from an instant of detection of said index position;

(j) executing write-in of X consecutive frames of said playback video signal, then controlling said video tape recorder to halt said magnetic tape; and (k) repeating said steps (g) and (h).

4. A video signal frame search apparatus operable for controlling a video tape recorder to select a desired one of a plurality of successive video signal frames recorded on a magnetic tape, said video tape recorder comprising means for recording index signals on said magnetic tape to define respective index positions, said apparatus comprising:

memory means;

control circuit means coupled to said memory means and to said video tape recorder, for controlling read and write operations of said memory means and for controlling movement of said magnetic tape by said video tape recorder, and comprising means for measuring amounts of movement of said magnetic tape in a forward playback direction and in a reverse direction, in units of frames, and means for detecting index positions defined by said index signals;

externally operable input means for inputting data to said control circuit means; and first and second externally operable switches, coupled to respective inputs of said control circuit means;

in which said control circuit means is operable for executing a frame search operation by successively:

(a) controlling said video tape recorder to set said magnetic tape in said forward playback direction of movement, while supplying a playback video signal from said video tape recorder to video monitor means;

(b) in response to actuation of said first switch, controlling said video tape recorder to record an index signal defining an index position;

(c) in response to a subsequent actuation of said second switch, executing write-in of X consecutive frames of said playback video signal into said memory means, where X is a fixed integer, then controlling said video tape recorder to halt movement of said magnetic tape, and storing a measurement value representing an amount of movement of said magnetic tape which has occurred from an instant of recording said index position to said actuation of the second switch;

(d) executing read-out of said X frames from said memory means, to display said X frames simultaneously by said video monitor means;

(e) in response to input of a frame designation number from said external input means, representing a position of said desired frame within said X consecutive frames, compute a search value as the sum of said frame designation number and said measurement value;

(f) controlling said video tape recorder for reverse movement of said magnetic tape until said index position is detected, then for forward playback movement; and (g) when said forward playback movement reaches an amount corresponding to said search value, as measured from a time point of detection of said index position, execute write-in of one frame of said playback video signal into said memory means, as said desired frame;

wherein said index signal is recorded by modifying a duty cycle of control pulses which are recorded on a control track of said magnetic tape, and said index position is defined by a change in said duty cycle.

5. A video signal frame search apparatus operable for controlling a video tape recorder to select a desired one of a plurality of successive video signal frames recorded on a magnetic tape, said video tape recorder comprising means for recording index signals on said magnetic tape to define respective index positions, said apparatus comprising:

memory means;

control circuit means coupled to said memory means and to said video tape recorder, for controlling read and write operations of said memory means and for controlling movement of said magnetic tape by said video tape recorder, and comprising means for measuring amounts of movement of said magnetic tape in a forward playback direction and in a reverse direction, in units of frames, and means for detecting index positions defined by said index signals;

externally operable input means for inputting data to said control circuit means; and first and second externally operable switches, coupled to respective inputs of said control circuit means;

in which said control circuit means is operable for executing a frame search operation by successively:

(a) controlling said video tape recorder to set said magnetic tape in said forward playback direction of movement, while supplying a playback video signal from said video tape recorder to video monitor means;

(b) in response to actuation of said first switch, controlling said video tape recorder to record an index position as an index signal, and executing write-in of successive frames of said playback video signal to said memory means;

(c) in response to a subsequent actuation of said second switch, halting write-in of frames to said memory means, then controlling said video tape recorder to halt movement of said magnetic tape, and storing a measurement value representing an amount of movement of said magnetic tape which has occurred from an instant of recording said index position to said actuation of the second switch;

(d) executing read-out from said memory means of a set of X frames which had been successively written therein up to said actuation of said second switch, to display said X frames simultaneously by said video monitor means;

(e) in response to input of a frame designation number from said external input means, representing a position of said desired frame within said X consecutive frames, compute a search value as the sum of said frame designation number and said measurement value, minus said fixed integer X;

(f) controlling said video tape recorder for reverse movement of said magnetic tape until said index position is detected, then for forward playback movement; and (g) when said forward playback movement reaches an amount corresponding to said search value, as measured from a time point of detection of said index position, executing write-in of one frame of said playback video signal into said memory means, as said desired frame;

wherein said index signal is recorded by modifying a duty cycle of control pulses which are recorded on a control track of said magnetic tape, and said index position is defined by a change in said duty cycle.

6. A video signal frame search apparatus operable for controlling a video tape recorder to select a desired one of a plurality of successive video signal frames recorded on a magnetic tape, said video tape recorder comprising means for recording index signals on said magnetic tape to define respective index positions, said apparatus comprising;

memory means;

control circuit means coupled to said memory means and to said video tape recorder, for controlling read and write operations of said memory means and for controlling movement of said magnetic tape by said video tape recorder, and comprising means for measuring amounts of movement of said magnetic tape in a forward playback direction and in a reverse direction, in units of frames, and means for detecting index positions defined by said index signals;

externally operable input means for inputting data to said control circuit means; and first and second externally operable switches, coupled to respective inputs of said control circuit means;

in which said control circuit means is operable for executing a frame search operation by successively:

(a) controlling said video tape recorder to set said magnetic tape in said forward playback direction of movement, while supplying a playback video signal from said video tape recorder to video monitor means;

(b) in response to actuation of said first switch, controlling said video tape recorder to record an index position as an index signal, and executing write-in of successive sets of X consecutive frames of said playback video signal to said memory means, where X is a fixed integer;

(c) in response to a subsequent actuation of said second switch, halting write-in of frames to said memory means upon completion of write-in of a final set of X frames, then controlling said video tape recorder to halt movement of said magnetic tape, and storing a measurement value representing an amount of movement of said magnetic tape which has occurred from an instant of recording said index position up to said halting of memory write-in;

(d) executing read-out from said memory means of said final set of X frames, to display said final set of X frames simultaneously by said video monitor means;

(e) in response to input of a frame designation number from said external input means, representing a position of said desired frame within said final set of X frames, computing a search value as the sum of said frame designation number and said measurement value, minus said fixed integer X;

(f) controlling said video tape recorder for reverse movement of said magnetic tape until said index position is detected, then for forward playback movement; and (g) when said forward playback movement reaches an amount corresponding to said search value, as measured from a time point of detection of said index position, executing write-in of one frame of said playback video signal into said memory means, as said desired frame;

wherein said index signal is recorded by modifying a duty cycle of control pulses which are recorded on a control track of said magnetic tape, and said index position is defined by a change in said duty cycle.

7. A video signal frame search apparatus operable for controlling a video tape recorder to select a desired one of a plurality of successive video signal frames recorded on a magnetic tape, said video tape recorder comprising means for recording index signals on said magnetic tape to define respective index positions, said apparatus comprising:

memory means;

control circuit means coupled to said memory means and to said video tape recorder, for controlling read and write operations of said memory means and for controlling movement of said magnetic tape by said video tape recorder, and comprising means for measuring amounts of movement of said magnetic tape in a forward playback direction and in a reverse direction, in units of frames, and means for detecting index positions defined by said index signals;

externally operable input means for inputting data to said control circuit means; and an externally operable switch, coupled to an input of said control circuit means;

in which said control circuit means is operable for executing a frame search operation by successively:

(a) controlling said video tape recorder to set said magnetic tape in said forward playback direction of movement, while supplying a playback video signal from said video tape recorder to video monitor means;

(b) in response to actuation of said switch, controlling said video tape recorder to record an index position as an index signal, and executing write-in of successive sets of X consecutive frames of said playback video signal to said memory means, where X is a fixed integer;

(c) when an amount of forward movement of said magnetic tape attains a fixed value, as measured from a time point of recording said index position, halting said write-in of frames to said memory means upon completion of write-in of a final set of X frames, then controlling said video tape recorder to halt movement of said magnetic tape;

(d) executing read-out from said memory means of said final set of X frames, to display said final set of X frames simultaneously by said video monitor means;

(e) in response to input of a frame designation number from said external input means, representing a position of a desired frame within said final set of X frames, computing a search value as the sum of said frame designation number and said fixed value;

(f) controlling said video tape recorder for reverse movement of said magnetic tape until said index position is detected, then for forward playback movement; and (g) when said forward playback movement reaches an amount corresponding to said search value, as measured from a time point of detection of said index position, executing write-in of one frame of said playback video signal into said memory means, as said desired frame;

wherein said index signal is recorded by modifying a duty cycle of control pulses which are recorded on a control track of said magnetic tape, and said index position is defined by a change in said duty cycle.

8. A video signal frame search apparatus operable for controlling a video tape recorder to select a desired one of a plurality of successive video signal frames recorded on a magnetic tape, said video tape recorder comprising means for recording index signals on said magnetic tape to define respective index positions, said apparatus comprising;

memory means;

control circuit means coupled to said video tape recorder, for controlling read and write operations of said memory means and for controlling movement of said magnetic tape by said video tape recorder, and comprising means for measuring amounts of movement of said magnetic tape in a forward playback direction and in a reverse direction, in units of frames, and means for detecting index positions defined by said index signals;

externally operable input means for inputting data to said control circuit means; and a first externally operable switch coupled to said control circuit means, operable for selectively setting said apparatus in a frame search mode and a normal playback mode of operation, and a second externally operable switch, coupled to an input of said control circuit means;

in which said control circuit means is operable for executing a frame search operation when set in said search mode by successively:

(a) controlling said video tape recorder to set said magnetic tape in said forward playback direction of movement, while supplying a playback video signal from said video tape recorder to video monitor means, and to successively record index positions defined by respective index signals each time that said magnetic tape has moved by a fixed amount which is equal to a fixed integral number of frames multiplied by a fixed integer (m), and executing write-in of successive frames of said playback video signal to said memory means;

(b) in response to a subsequent actuation of said second switch, halting said write-in of frames to said memory means, then controlling said video tape recorder to halt movement of said magnetic tape, and storing a measurement value representing an amount of movement of said magnetic tape which has occurred from an instant of recording a final one of said index positions prior to said actuation of the second switch;

(c) executing read-out from said memory means of a set of X frames which had been successively written therein up to said actuation of said second switch, to display said X frames simultaneously by said video monitor means;

(d) in response to input of a frame designation number from said external input means, representing a position of a desired frame within said X consecutive frames, computing a search value as the sum of said frame designation number and said measurement value, minus said fixed integer X;

(e) controlling said video tape recorder for reverse movement of said magnetic tape until said index position is detected, then for forward playback movement; and (f) when said forward playback movement reaches an amount corresponding to said search value, as measured from a time point of detection of said index position, executing write-in of one frame of said playback video signal into said memory means, as said desired frame;

wherein said index signal is recorded by modifying a duty cycle of control pulses which are recorded on a control track of said magnetic tape, and said index position is defined by a change in said duty cycle.

9. A video signal frame search apparatus according to any of claims 1 through 8, in which said video tape recorder produces an output signal consisting of a train of said control pulses, during magnetic tape movement in said forward playback and reverse directions, wherein said means for measuring amounts of movement comprise means for counting said control pulses and wherein said amounts of movement are obtained by said counting means as respective number of control pulses.

10. A video signal frame search apparatus according to any of claims 1 through 8, in which said control circuit means further comprises means for detecting starting points of successive frames of said playback video signal and for producing frame pulses corresponding to these starting points, during magnetic tape movement at least in said forward playback direction, wherein said means for measuring amounts of movement comprise means for counting said frame pulses and wherein said amounts of movement are obtained by said counting means as respective numbers of frame pulses.

* * * * *